(12) United States Patent
Henderson et al.

(10) Patent No.: US 10,696,568 B2
(45) Date of Patent: Jun. 30, 2020

(54) APPARATUS AND METHOD FOR WATER TREATMENT

(71) Applicant: Greenthread Limited, Aberdeenshire (GB)

(72) Inventors: Andrew Henderson, Aberdeenshire (GB); Brian Nutley, Aberdeenshire (GB); Kim Nutley, Aberdeenshire (GB); Ross Clarke, Aberdeenshire (GB)

(73) Assignee: Greenthread Limited, Aberdeenshire (GB)

(*) Notice: Subject to any disclaimer, the term of this patent is extended or adjusted under 35 U.S.C. 154(b) by 477 days.

(21) Appl. No.: 15/501,998

(22) PCT Filed: Aug. 6, 2015

(86) PCT No.: PCT/GB2015/052283
§ 371 (c)(1),
(2) Date: Feb. 6, 2017

(87) PCT Pub. No.: WO2016/020692
PCT Pub. Date: Feb. 11, 2016

(65) Prior Publication Data
US 2017/0225971 A1    Aug. 10, 2017

(30) Foreign Application Priority Data

Aug. 6, 2014 (GB) .................................. 1413963.8
Nov. 20, 2014 (GB) .................................. 1420680.9
(Continued)

(51) Int. Cl.
C02F 1/32        (2006.01)
B01F 3/04        (2006.01)
(Continued)

(52) U.S. Cl.
CPC .......... *C02F 1/325* (2013.01); *B01F 3/04503* (2013.01); *B01F 3/04985* (2013.01);
(Continued)

(58) Field of Classification Search
CPC .......... B01F 5/04; B01F 5/0057; B01F 5/042; B01F 5/0473; B01F 5/048; B01F 5/0619;
(Continued)

(56) References Cited

U.S. PATENT DOCUMENTS 6,309,611 B1 * 10/2001 Tabatabaie-Raissi ........................
B01D 53/885
210/748.14
8,282,879 B2 * 10/2012 Tanaka .................... C01B 13/11
204/157.15
(Continued)

*Primary Examiner* — Cameron J Allen
(74) *Attorney, Agent, or Firm* — The Kubiak Law Firm, PLLC

(57) ABSTRACT

The invention provides an injector device for a water treatment apparatus, and a method of use. The injector device comprises a first coupling for fluid connection to a source of liquid to be treated; and a second coupling for fluid connection to at least one liquid treatment vessel arranged to expose liquid in the vessel to ultraviolet radiation in an advanced oxidation process reaction. The device comprises at least one injection port for injecting at least one gas into a liquid flowing through the injector device. The injector device is at least partially formed from a material that is transmissive to ultraviolet radiation. In another aspect, a water treatment apparatus defines a plurality of parallel flow streams between the inlet of the apparatus and the at least one liquid treatment vessel. The injector device comprises an injection port for each of the plurality of parallel flow streams.

21 Claims, 38 Drawing Sheets

(30) Foreign Application Priority Data

Nov. 21, 2014 (GB) .................................. 1420763.3
Jun. 12, 2015 (GB) .................................. 1510365.8

(51) Int. Cl.
| | | |
|---|---|---|
| B01F 13/00 | (2006.01) | |
| B01F 5/00 | (2006.01) | |
| B01F 5/04 | (2006.01) | |
| B01F 5/06 | (2006.01) | |
| C02F 1/78 | (2006.01) | |

(52) U.S. Cl.
CPC .............. *B01F 5/0057* (2013.01); *B01F 5/04* (2013.01); *B01F 5/048* (2013.01); *B01F 5/0421* (2013.01); *B01F 5/0473* (2013.01); *B01F 5/06* (2013.01); *B01F 5/0619* (2013.01); *B01F 13/0006* (2013.01); *B01F 2003/04886* (2013.01); *C02F 1/78* (2013.01); *C02F 2201/3223* (2013.01); *C02F 2201/3227* (2013.01); *C02F 2201/3228* (2013.01); *C02F 2305/023* (2013.01); *C02F 2305/10* (2013.01)

(58) Field of Classification Search
CPC .............. B01F 13/0006; B01F 3/04503; B01F 3/04985; B01F 5/06; B01F 2003/04886; C02F 1/325; C02F 2201/3223; C02F 1/78; C02F 2201/3227; C02F 2201/3228; C02F 2305/023; C02F 2305/10
See application file for complete search history.

(56) References Cited

U.S. PATENT DOCUMENTS

2006/0283810 A1* 12/2006 Ciccone Pe Dee ..... C02F 1/325
  210/748.12
2008/0008632 A1* 1/2008 Engelhard ............... C01B 13/10
  422/186.3

* cited by examiner

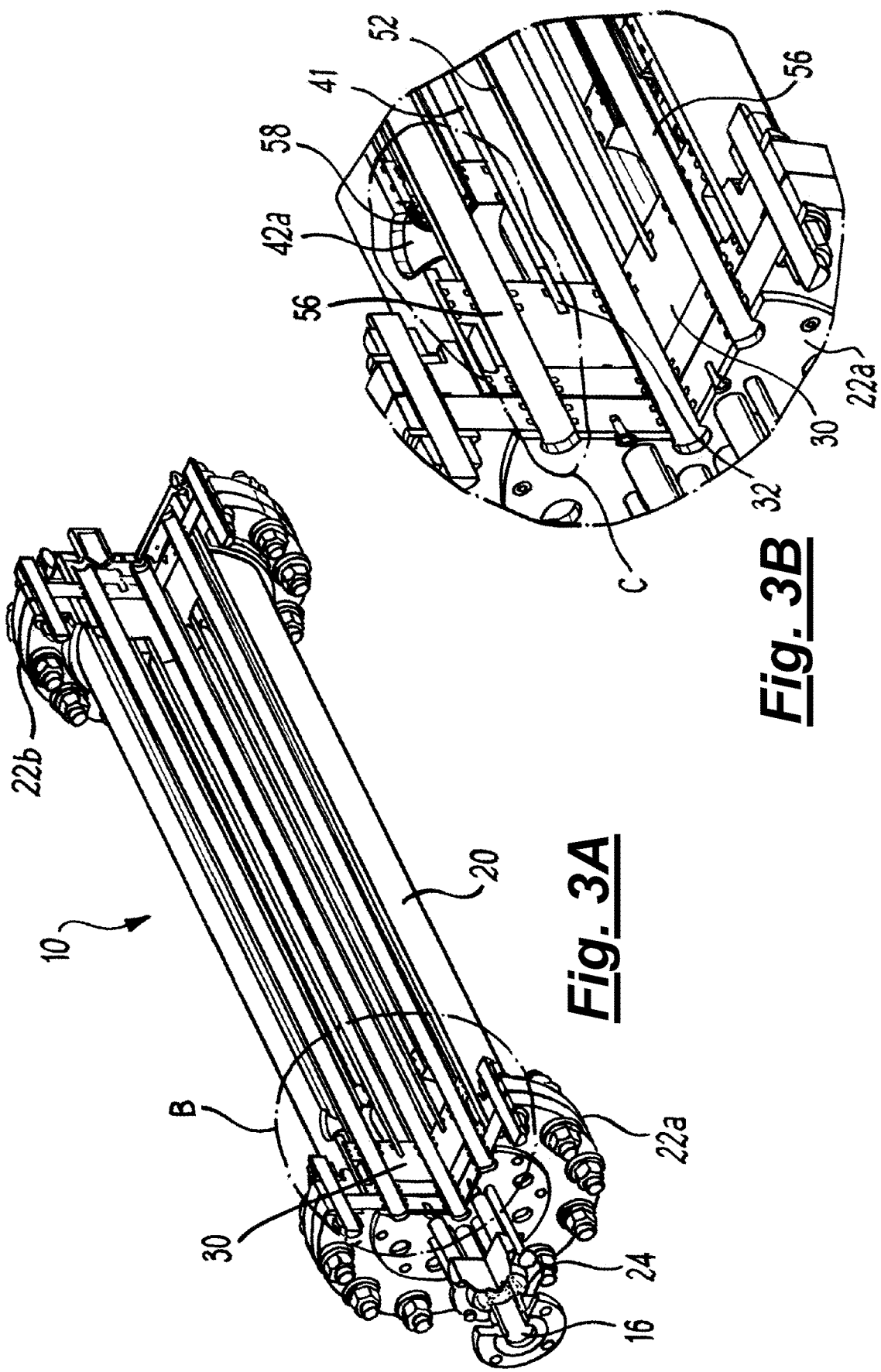

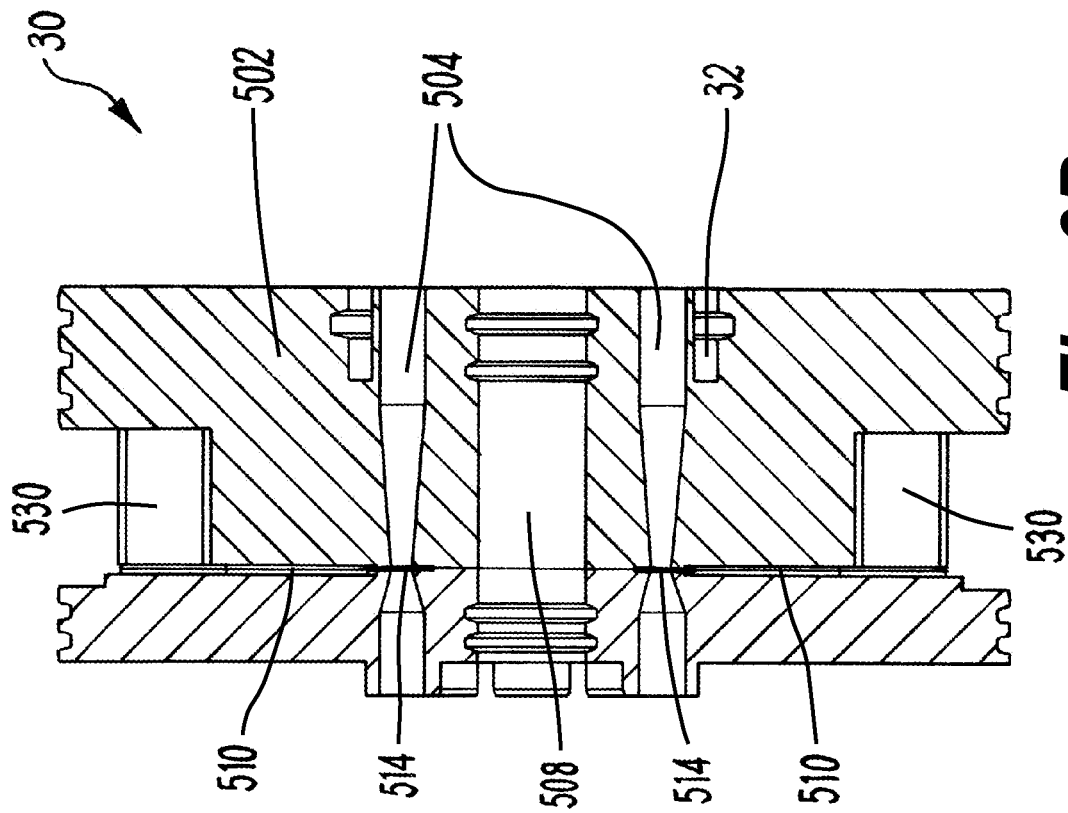
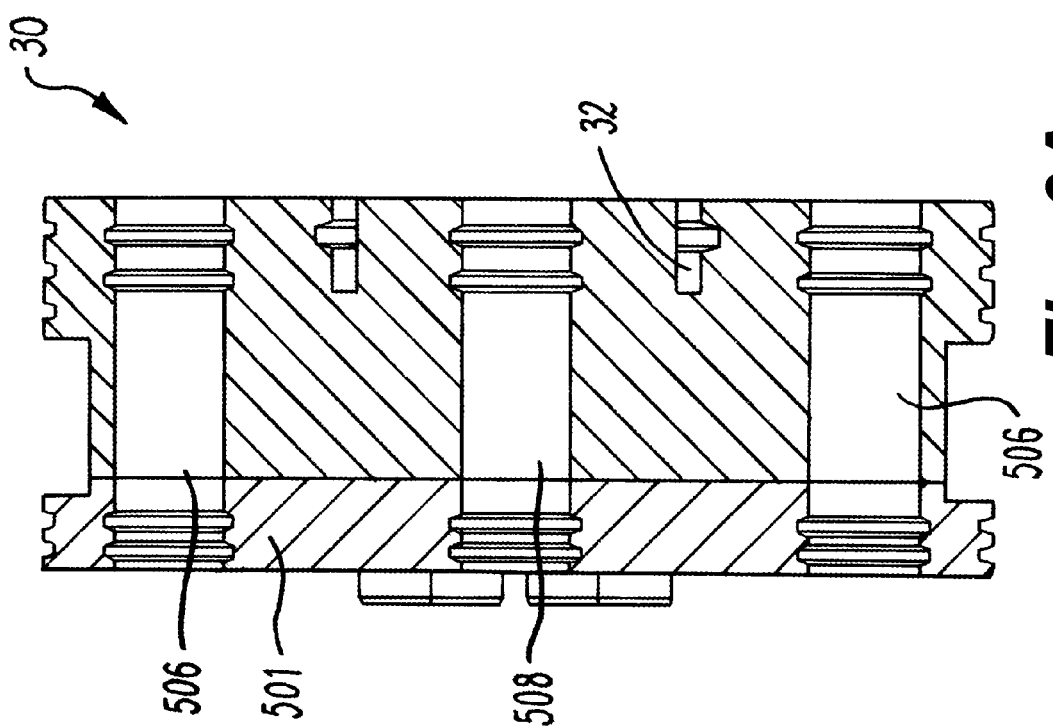

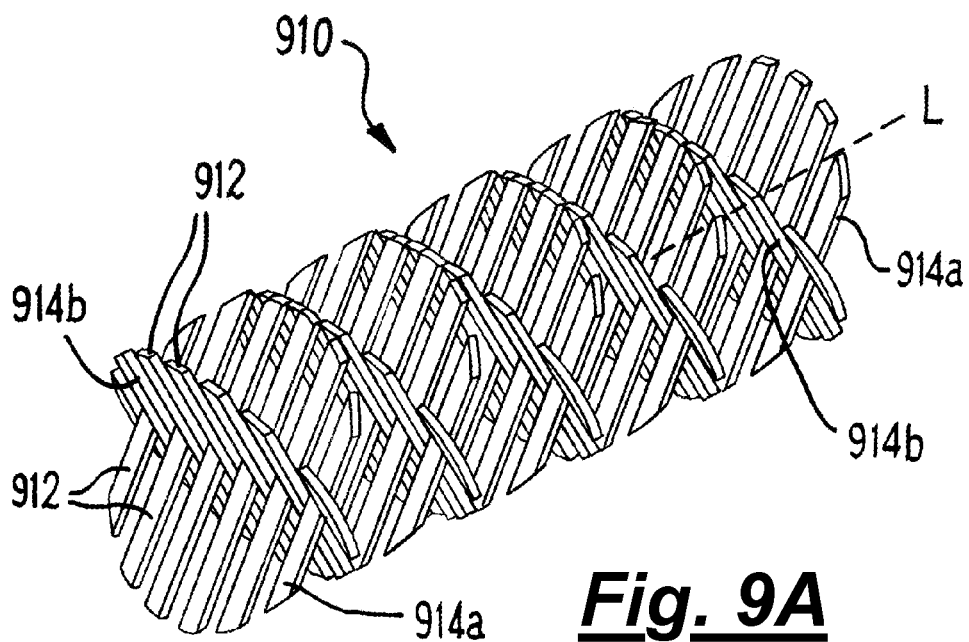
Fig. 9A
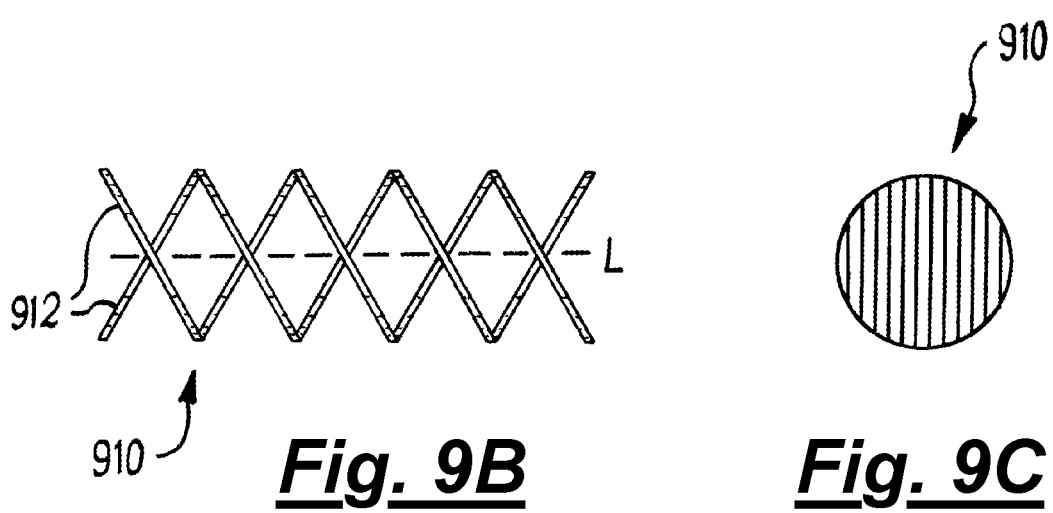
Fig. 9B
Fig. 9C

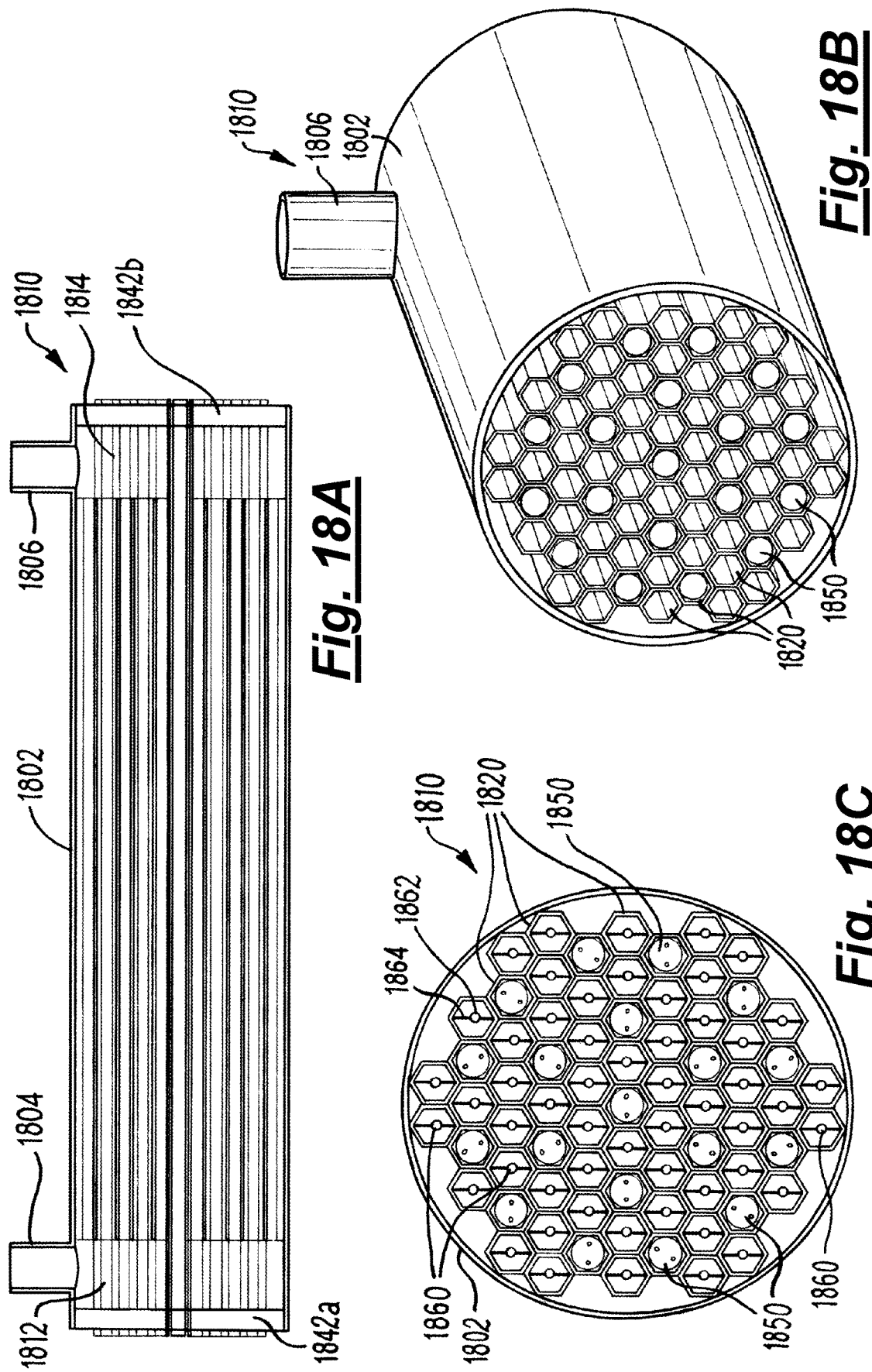

APPARATUS AND METHOD FOR WATER TREATMENT

The present invention relates to apparatus for the treatment of water and methods of use, and in particular to apparatus for the treatment of water by photocatalytic oxidation, and related methods.

In one aspect, the invention relates to a flow inlet apparatus for a water treatment apparatus and a method of use, and in another, the invention relates to a novel injector for a water treatment apparatus and a method of use. Additional aspects of the invention relate to injection diffusers for water treatment apparatus and methods of use.

BACKGROUND TO THE INVENTION

Industrial wastewaters are generated as a by-product from industrial operations which include (but are not limited to) chemical manufacturing or processing, food and beverage production and the oil and gas industry. In the field of industrial or wastewater treatment, it is known to use advanced oxidation processes (AOPs) to treat water or waste water through interactions with reactive oxygen species such as hydroxyl radicals (•OH). Advanced oxidation processes are useful for a number of reasons, including the high reactivity of hydroxyl radicals and their applicability in oxidising a range of organic and inorganic contaminants; their ability to treat organic compounds directly when in an aqueous phase; and the absence of additional hazardous substances or waste streams.

One example application is in the treatment of produced water in the oil and gas industry. Produced water is a wastewater by-product from hydrocarbon extraction, and it must be separated from the oil and gas fractions of the produced fluid. The separated water will contain low but measurable amounts of organic and inorganic contaminants that have the potential to harm the environment and so the water must be treated. Another hydrocarbon industry application is the treatment of wastewater from hydraulic fracturing operations.

Examples of advanced oxidation processes include those in which oxygen ($O_2$), ozone ($O_3$), hydrogen peroxide ($H_2O_2$) and/or ultraviolet (UV) radiation are used to generate hydroxyl radicals in the reaction process, either alone or in combination with one another. Some advanced oxidation techniques use metal oxide catalysts such as titanium dioxide ($TiO_2$) or aluminium oxide ($Al_2O_3$) in order to lower activation energies, lower ozone consumption, and/or ultimately to enhance reaction parameters such as the rate of reduction in Total Organic Content (or Total Organic Carbon) (TOC). Advanced oxidation processes have been engineered for batch treatment of liquids and continuous online treatment within flow systems.

A range of different factors are known to impact on the efficiency of an advanced oxidation process, and there is generally a demand to improve upon the efficiency of existing systems, process time, and the ability to handle a range of flow rates and contaminants.

GB 2,404,189 describes a process and apparatus for the treatment of produced water from the hydrocarbon production industry, which uses a combination of ozone and UV radiation to reduce hydrocarbon and organic matter within the water. A Venturi ozone injector is used to introduce and dissolve ozone into the produced water flow stream which is subsequently exposed to UV radiation.

WO 2012/056249 discloses a fluid treatment apparatus for an advanced oxidation process. The apparatus comprises a primary flow line connecting an inlet and an outlet of the apparatus and an ozone-injecting device. A reactor vessel includes a UV light source for treating the ozone-enriched fluid. A secondary flow line is arranged in parallel to the primary flow line to provide variation of a fluid flow rate within the apparatus.

While the approaches described in GB 2,404,189 and WO 2012/056249 are useful in certain applications to the treatment of produced water, there remains a commercial need to provide water treatment apparatus and processes which have improved efficacy, economy, reliability and/or flexibility of application.

SUMMARY OF THE INVENTION

It is amongst the aims and objects of the invention to provide a water treatment apparatus or method which obviates or mitigates one or more drawbacks or disadvantages of the prior art.

An aim of at least one aspect of the invention is to provide a water treatment apparatus and method of use which improves the efficiency, effectiveness, or capacity of an advanced oxidation process reaction.

A further aim of at least one aspect of the invention is to provide a water treatment apparatus and method of use which provides improved gas injection configurations and/or control.

A further aim of at least one aspect of the invention is to provide a water treatment apparatus and method of use which improves the effectiveness of UV radiation at one or more treatment locations.

Additional aims and objects of the invention will become apparent from reading the following description.

According to a first aspect of the invention, there is provided a water treatment apparatus comprising:
an inlet configured to be connected to a source of liquid to be treated;
at least one liquid treatment vessel arranged to expose liquid in the vessel to ultraviolet radiation in an advanced oxidation process reaction;
an injector device for injecting at least one gas into a liquid flowing between the inlet and the at least one liquid treatment vessel;
wherein the injector device defines a plurality of parallel flow streams between the inlet of the apparatus and the at least one liquid treatment vessel;
and wherein the injector device comprises an injection port for each of the plurality of parallel flow streams.

In the context of this specification, references to "parallel" when applied to flow systems should be interpreted as meaning arrangements which provide at least one alternative flow path over a part of the flow system, flow equipment, or flow regime between two particular points. Parallel flow systems need not be parallel in a geometrical sense, but are analogous to circuits with components arranged in parallel. References to parallel flow paths, flow components, flow equipment, flow streams, or flow regimes should be similarly interpreted.

The apparatus may comprise at least one source of ultraviolet radiation, which may be configured to emit UV radiation at a single UV wavelength, or may be configured to emit UV radiation at multiple UV wavelengths. The UV wavelengths may be discrete wavelengths, or the source may comprise a wideband UV source. The emitted UV radiation may comprise a wavelength or wavelengths in the range of 100 nm to 400 nm, and may comprise the UVC radiation range. Preferably the emitted UV radiation includes at least one wavelength selected from 185 nm and 253.7 nm.

According to a second aspect of the invention, there is provided an injector device for a water treatment apparatus, the injector device comprising:

a first coupling for fluid connection to a source of liquid to be treated; and a second coupling for fluid connection to at least one liquid treatment vessel arranged to expose liquid in the vessel to ultraviolet radiation in an advanced oxidation process reaction;

wherein the injector device defines a plurality of parallel flow streams between the inlet of the apparatus and the at least one liquid treatment vessel;

and wherein the injector device comprises an injection port for each of the plurality of parallel flow streams.

The injection ports may comprise Venturi injection ports.

Preferably, the at least one liquid treatment vessel is at least one liquid treatment flow conduit, and the at least one liquid treatment flow conduit is arranged to expose liquid in the conduit to ultraviolet radiation in an advanced oxidation process reaction.

The water treatment apparatus may comprise a flow inlet manifold, which may define the inlet to the apparatus, and/or which may define a plurality of outlets to the at least one liquid treatment vessel.

The injector device may be disposed between the flow inlet manifold and the at least one liquid treatment vessel. Preferably, the flow inlet manifold comprises an outlet for each of the plurality of parallel flow streams defined by the injector device.

In an embodiment of the invention, the injector device is at least partially formed from a material that is transmissive to ultraviolet radiation. Preferably, the injector device provides a transmission path between at least one source of ultraviolet radiation and at least one injection port.

In the context of this specification, the term "transmissive" is used to describe the capability of the material to transmit though, or allow propagation of, radiation through the material. It does not necessarily imply that the material is the source of radiation emission, and in fact the described embodiments all comprise a separate UV source, from which the UV radiation is emitted. The UV transmissivity of a so-called "transmissive" material is preferably high, so that significant proportions (and preferably substantially all) of the UV radiation are propagated through the material to the target location. Preferred embodiments may therefore comprise injector device is at least partially formed from a material that is transparent, or substantially transparent, to ultraviolet radiation.

It has been appreciated by the inventors that there is a considerable benefit in the efficacy of an advanced oxidation process where the ultraviolet radiation is incident on the liquid to be treated close to or at the injection point of a gas.

The injector device may comprise a plurality of injection paths between a source of at least one gas to be injected and the plurality of injection ports. The apparatus may comprise a longitudinal axis. At least one injection path may be substantially radially oriented with respect to a longitudinal axis of the apparatus.

Embodiments of the second aspect of the invention may include one or more features of the first aspect of the invention or its embodiments, or vice versa.

According to a third aspect of the invention, there is provided a water treatment apparatus comprising:

an inlet configured to be connected to a source of liquid to be treated;

at least one liquid treatment vessel arranged to expose liquid in the vessel to ultraviolet radiation in an advanced oxidation process reaction;

an injector device for injecting at least one gas into a liquid flowing between the inlet and the at least one liquid treatment vessel;

wherein the injector device is at least partially formed from a material that is transmissive to ultraviolet radiation.

The injector device may therefore have a component which is formed from a UV transmissive material.

Embodiments of the third aspect of the invention may include one or more features of the first or second aspects of the invention or their embodiments, or vice versa.

According to a fourth aspect of the invention, there is provided an injector device for a water treatment apparatus, the injector device comprising:

a first coupling for fluid connection to a source of liquid to be treated; and a second coupling for fluid connection to at least one liquid treatment vessel arranged to expose liquid in the vessel to ultraviolet radiation in an advanced oxidation process reaction;

wherein the injector device is at least partially formed from a material that is transmissive to ultraviolet radiation.

Preferably, the injector device provides a transmission path between at least one source of ultraviolet radiation and at least one injection port.

It has been appreciated by the inventors that there is a considerable benefit in the efficacy of an advanced oxidation process where the ultraviolet radiation is incident on the liquid to be treated close to or at the injection point of a gas.

The injector device may comprise a plurality of injection paths between a source of at least one gas to be injected and the plurality of injection ports. The apparatus may comprise a longitudinal axis. At least one injection path may be substantially radially oriented with respect to a longitudinal axis of the apparatus.

Embodiments of the fourth aspect of the invention may include one or more features of the first to third aspects of the invention or their embodiments, or vice versa.

According to a fifth aspect of the invention, there is provided a water treatment apparatus comprising:

an inlet configured to be connected to a source of liquid to be treated;

at least one liquid treatment vessel arranged to expose liquid in the vessel to ultraviolet radiation in an advanced oxidation process reaction;

an injector device for injecting at least one gas into a liquid flowing between the inlet and the at least one liquid treatment vessel;

wherein the injector device comprises a synthetic fused silica (SFS) material.

Embodiments of the fifth aspect of the invention may include one or more features of the first to fourth aspects of the invention or their embodiments, or vice versa.

According to a sixth aspect of the invention, there is provided an injector device for a water treatment apparatus, the injector device comprising:

a first coupling for fluid connection to a source of liquid to be treated; and a second coupling for fluid connection to at least one liquid treatment vessel arranged to expose liquid in the vessel to ultraviolet radiation in an advanced oxidation process reaction;

wherein the injector device comprises a synthetic fused silica (SFS) material.

Embodiments of the sixth aspect of the invention may include one or more features of the first to fourth aspects of the invention or their embodiments, or vice versa.

According to a seventh aspect of the invention, there is provided a water treatment apparatus comprising:
an inlet configured to be connected to a source of liquid to be treated;
at least one liquid treatment vessel arranged to expose liquid in the vessel to ultraviolet radiation in an advanced oxidation process reaction;
an injector device for injecting at least one gas into a liquid flowing between the inlet and the at least one liquid treatment vessel;
wherein the injection device comprises at least one injection path between a source of injection gas and an injection port;
wherein the apparatus comprises at least one gas chamber located upstream of the at least one injection path;
and wherein the at least one gas chamber is arranged to expose gas in the chamber to ultraviolet radiation.

Embodiments of the seventh aspect of the invention may include one or more features of the first to sixth aspects of the invention or their embodiments, or vice versa.

According to an eighth aspect of the invention, there is provided an injector device for a water treatment apparatus, the injector device comprising:
a first coupling for fluid connection to a source of liquid to be treated; and
a second coupling for fluid connection to at least one liquid treatment vessel arranged to expose liquid in the vessel to ultraviolet radiation in an advanced oxidation process reaction;
wherein the injection device comprises at least one injection path between a source of injection gas and an injection port;
wherein the injection device comprises a cavity defining at least one gas chamber located upstream of the at least one injection path;
and wherein the at least one gas chamber is arranged to expose gas in the chamber to ultraviolet radiation.

Embodiments of the eighth aspect of the invention may include one or more features of the first to seventh aspects of the invention or their embodiments, or vice versa.

According to a ninth aspect of the invention, there is provided a water treatment system comprising:
a water treatment apparatus comprising a flow inlet manifold having an inlet connected to a source of liquid to be treated, such that liquid to be treated flows into the flow inlet manifold through the inlet, and a plurality of outlets connected to at least one liquid treatment flow vessel;
at least one detector located upstream of the water treatment apparatus and configured to measure at least one parameter of a liquid to be treated;
wherein the flow inlet manifold comprises a plurality of controllable valves disposed in the plurality of outlets;
and wherein the valves are operable to control the flow of liquid to be treated through the flow inlet manifold and to the liquid treatment vessel in response to a signal from the at least one detector.

Preferably, the apparatus comprises an injector device disposed between the flow inlet manifold and the at least one liquid treatment vessel. The injector device preferably defines a plurality of parallel flow streams between the inlet of the apparatus and the at least one liquid treatment vessel. The injector device may comprise an injection port for each of the plurality of parallel flow streams.

Preferably, the flow inlet manifold comprises an outlet for each of the plurality of parallel flow streams defined by the injector device. The valves may therefore be operable to control the flow of liquid to be treated through the plurality of parallel flow streams in response to a signal from the at least one detector.

Embodiments of the ninth aspect of the invention may include one or more features of the first to eighth aspects of the invention or their embodiments, or vice versa.

According to a tenth aspect of the invention there is provided a water treatment apparatus comprising:
an inlet configured to be connected to a source of liquid to be treated;
at least one liquid treatment vessel arranged to expose liquid in the vessel to ultraviolet radiation in an advanced oxidation process reaction;
a flow path defined between the inlet and the at least one liquid treatment vessel;
a source of ultraviolet radiation; and
a radiation guide formed from a material that is transmissive to ultraviolet radiation;
wherein the radiation guide extends into the flow path towards the inlet and away from the vessel, and transmits ultraviolet radiation to a liquid flowing in the flow path upstream of the vessel.

Embodiments of the tenth aspect of the invention may include one or more features of the first to ninth aspects of the invention or their embodiments, or vice versa.

According to an eleventh aspect of the invention, there is provided a water treatment apparatus comprising:
a water treatment apparatus comprising:
an inlet configured to be connected to a source of liquid to be treated;
at least one liquid treatment vessel arranged to expose liquid in the vessel to ultraviolet radiation in an advanced oxidation process reaction;
a flow path defined between the inlet and the at least one liquid treatment vessel; and an injector device for injecting at least one gas into a liquid flowing in the water treatment apparatus,
wherein the apparatus further comprises an injection diffuser disposed in the flow path downstream of the injector device; and wherein the injection diffuser is operable to be adjusted to change at least one geometrical feature or dimension of the diffuser.

Embodiments of the eleventh aspect of the invention may include one or more features of the first to tenth aspects of the invention or their embodiments, or vice versa.

According to a twelfth aspect of the invention, there is provided a water treatment apparatus comprising:
a water treatment apparatus comprising:
an inlet configured to be connected to a source of liquid to be treated;
at least one liquid treatment vessel arranged to expose liquid in the vessel to ultraviolet radiation in an advanced oxidation process reaction;
a flow path defined between the inlet and the at least one liquid treatment vessel; and an injector device for injecting at least one gas into a liquid flowing in the water treatment apparatus; and
a source of ultraviolet radiation;
wherein the apparatus further comprises an injection diffuser disposed in the flow path downstream of the injector device; and wherein the injection diffuser is exposed to ultraviolet radiation from the source.

Embodiments of the twelfth aspect of the invention may include one or more features of the first to eleventh aspects of the invention or their embodiments, or vice versa.

According to a thirteenth aspect of the invention, there is provided a water treatment apparatus comprising:
a water treatment apparatus comprising:
an inlet configured to be connected to a source of liquid to be treated;
at least one liquid treatment vessel arranged to expose liquid in the vessel to ultraviolet radiation in an advanced oxidation process reaction;
a flow path defined between the inlet and the at least one liquid treatment vessel; and an injector device for injecting at least one gas into a liquid flowing in the water treatment apparatus,
wherein the apparatus further comprises an injection diffuser disposed in flow path downstream of the injector device;
wherein the injection diffuser comprises at least one surface comprising a photocatalyst material.

Embodiments of the thirteenth aspect of the invention may include one or more features of the first to twelfth aspects of the invention or their embodiments, or vice versa.

According to a further aspect of the invention, there is provided a water treatment system comprising a plurality of water treatment apparatus according to any previous aspect of the invention.

The water treatment system may comprise a separation vessel, which may be a hydrocyclonic separation unit.

The plurality of water treatment apparatus, or a subset thereof, may be arranged in series. Alternatively or in addition, the plurality of water treatment apparatus, or a subset thereof, may be arranged in parallel. In a preferred embodiment, the system comprises an arrangement of controllable valves such that the plurality of water treatment apparatus, or a subset thereof, may be operated in series or in parallel depending on configuration of the controllable valves.

The system may comprise one or more inlet pumps. Preferably, each of the plurality of water treatment apparatus, or a subset thereof, comprise a dedicated inlet pump.

The system preferably comprises a system bypass line from a system inlet to a system outlet. The system may comprise one or more apparatus bypass lines from a system inlet to a separation unit.

The system may comprise a recirculation line between an outlet of one or more of the water treatment apparatus and an inlet to the one or more water treatment apparatus. The recirculation line may be disposed between an outlet of a separation unit line and an inlet to the one or more water treatment apparatus.

The system may comprise one or more ozone generation units. The system may comprise an arrangement of valves configured to a control the flow of ozone from an ozone generation unit to a plurality of water treatment apparatus. Preferably, the arrangement of valves is operable to divert or pulse the flow of ozone from the ozone generation unit between a plurality of water treatment apparatus.

Embodiments of this aspect of the invention may include one or more features of the previous aspects of the invention or their embodiments, or vice versa.

According to further aspects of the invention there are provided methods of treating a liquid using the apparatus of any of the first to fifth aspects of the invention, or the system of the sixth aspect of the invention.

According to further aspects of the invention there are provided water treatment apparatus substantially as described herein with reference to the accompanying drawings.

According to further aspects of the invention there are provided methods of treating a liquid substantially as described herein with reference to the accompanying drawings.

BRIEF DESCRIPTION OF THE DRAWINGS

There will now be described, by way of example only, various embodiments of the invention with reference to the following drawings, of which:

FIG. 3A is a partial cutaway view of the apparatus of FIGS. 1 and 2;

FIG. 3B is an enlarged view of a detail B of FIG. 3A;

FIGS. 6A and 6B are respectively sectional views through lines A-A and B-B of FIG. 5B;

FIGS. 9A, 9B and 9C are respectively isometric, end and front elevations of an injection diffuser that may be used in embodiments of the invention;

FIGS. 18A to 18D are respectively a longitudinal section, a cutaway isometric view, a schematic end view, and a further cutaway isometric view of an apparatus according to an alternative embodiment of the invention;

DETAILED DESCRIPTION OF THE PREFERRED EMBODIMENTS

Figure 1A:
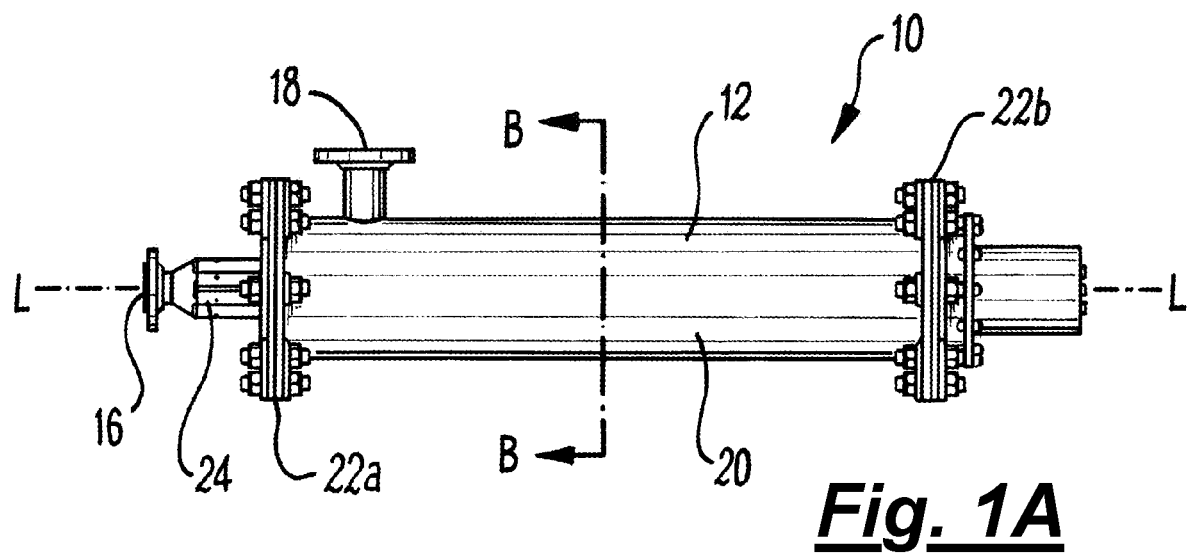
FIG. 1A is a side elevation of an apparatus in accordance with a first embodiment of the invention.
Figure 1B:
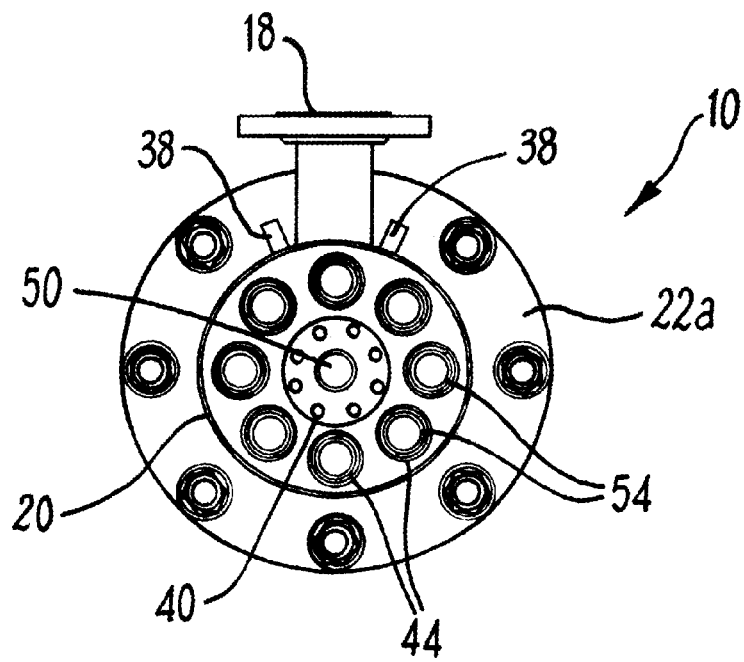
FIG. 1B is a sectional view through line B-B of the apparatus of FIG. 1A.
Figure 2:
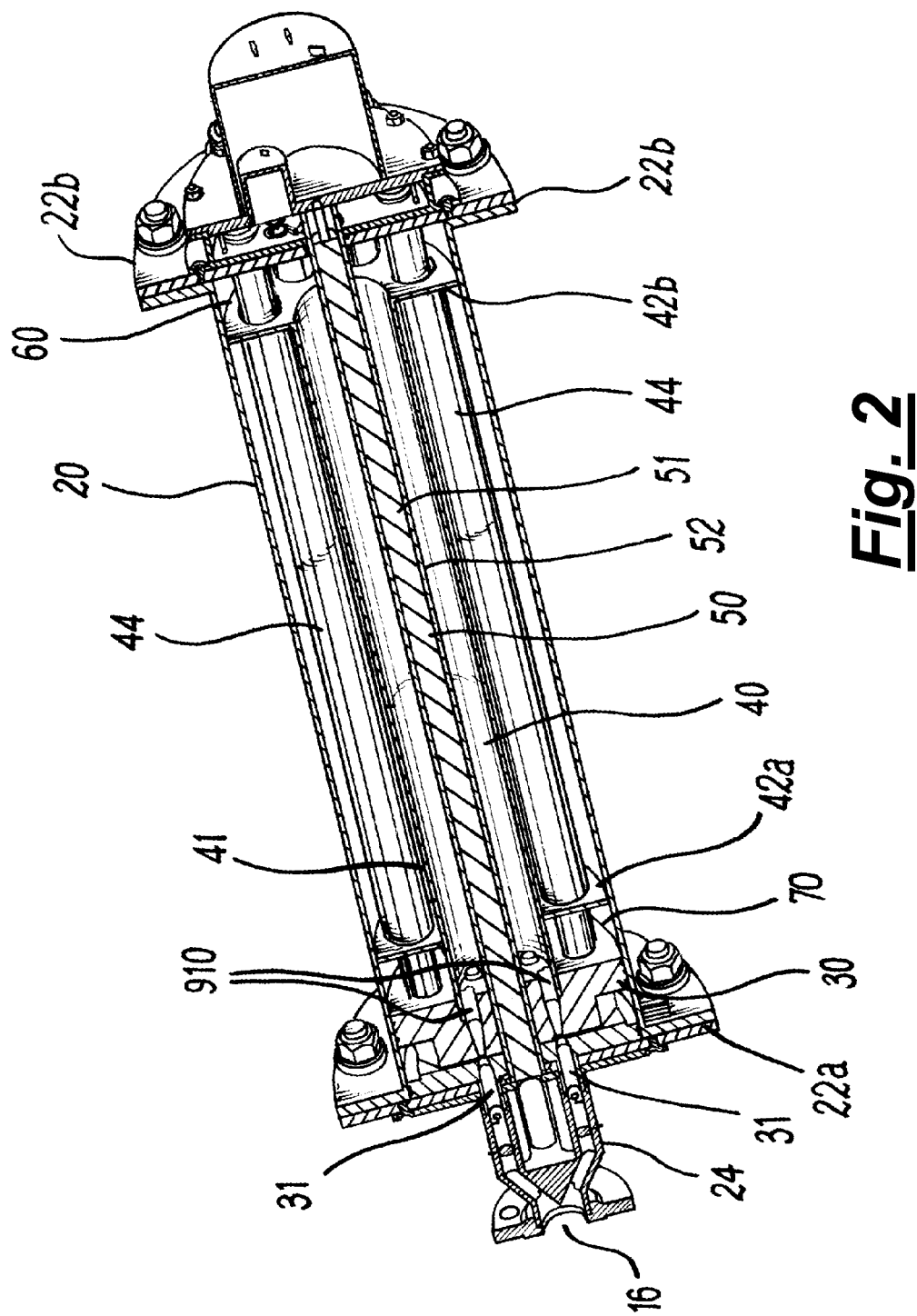
FIG. 2 is a sectional view of the apparatus of FIGS. 1A and 1B.

Referring firstly to FIGS. 1A, 1B and 2, there is shown generally depicted at 10, a water treatment apparatus in accordance with a first embodiment of the invention. The water treatment apparatus 10 is configured for the treatment of contaminated water, such as water produced as a by-product of an oil and gas production operation (although it will be appreciated that waste water or contaminated water from other processes may also be treated within scope of the invention). The apparatus is designed for an advanced oxidation process, and in particular for an advanced oxidation process which utilises ultraviolet (UV) radiation in combination with an injection of ozone gas to treat the contaminated water and ultraviolet (UV) radiation, optionally in combination with catalyst such as a metal oxide or peroxide.

The apparatus comprises a housing 12, which in this case is a substantially cylindrical housing having a first end 14a and a second end 14b and a longitudinal axis L. In FIG. 1A, the apparatus is arranged substantially horizontally, although depending on the application, the apparatus 10 maybe horizontal, vertical or in an intermediate inclined orientation. The housing 12 comprises a cylindrical main body 20 and first and second flange assemblies 22a and 22b which enclose internal components and seal the apparatus.

The apparatus 10 comprises a liquid inlet 16 and a liquid outlet 18. The inlet 16 is configured to be connected to a source of liquid to be treated (not shown) and is fluidly connected to internal components of the apparatus via an inlet flow manifold 24. In this embodiment, the inlet 16 is coaxial with the longitudinal axis of the apparatus. The outlet 18 is radially oriented with respect to the apparatus and is disposed towards the inlet end 14a of the apparatus.

Figure 3C:
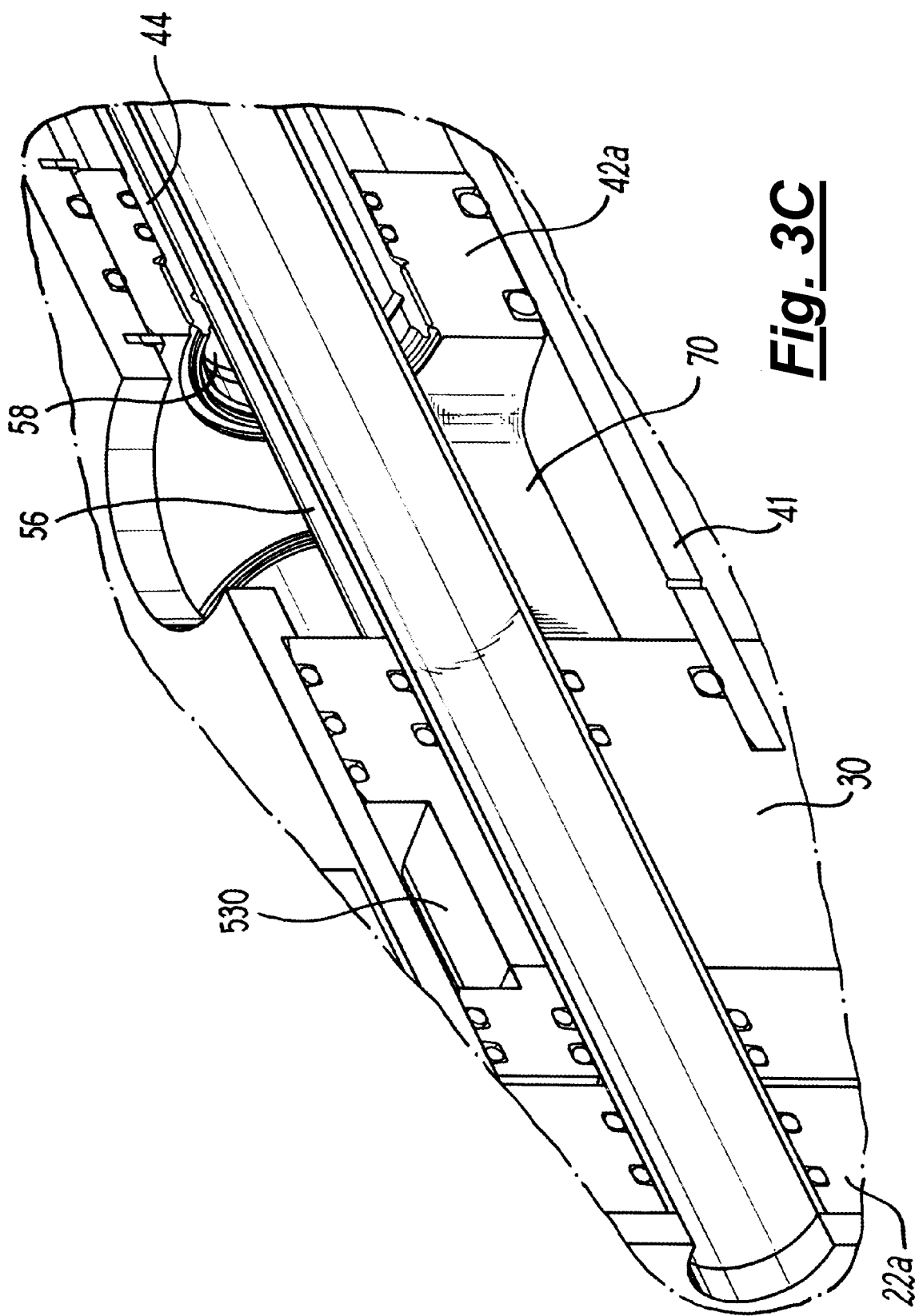
FIG. 3C is an enlarged view of a detail C of FIG. 3B.

Internal features of the apparatus 10 are most clearly shown in FIG. 1B and FIG. 2, along with FIGS. 3A, 3B, and 3C which are partial cutaway views showing internal construction of the apparatus 10 in greater detail. In FIGS. 3A, 3B, and 3C, UV lamps are omitted for clarity of the drawing. Downstream from the flow inlet manifold 24 is an injector assembly generally depicted at 30, configured for the injection of gas such as ozone into a liquid flowing through the apparatus. The injection assembly 30 defines a plurality of parallel flow channels 31. The injection assembly 30 is a Venturi injector and comprises a plurality of injection ports 32 disposed in respective injection flow channels 31. Restrictions 34 in the flow channels reduce liquid pressure which draws a gas such as ozone or oxygen into the flowing liquid. The apparatus comprises a pair of gas injection supply lines 38 for the injection assembly.

Downstream of the injector assembly 30 is a first liquid treatment vessel in the form of a conduit 40. Conduit 40 is coaxial with the longitudinal axis of the apparatus, and defines an annular flow volume around a source of ultraviolet (UV) radiation 50. The UV source 50 comprises an ultraviolet lamp 51 which is cylindrical in form, and extends through the apparatus in a longitudinal direction, along the centre of the conduit 40. The lamp is therefore coaxial with the longitudinal axis of the apparatus. Lamp 51 is surrounded by a thimble 52, which is a relatively thin glass sheath defining a UV radiation emitting surface of the UV source 50. In this embodiment the thimble 52 is formed from a synthetic fused silica (SFS) material. In this case, a single lamp 51 is depicted within the centre of conduit 40, but in alternative embodiments a lesser or greater number of lamps may be provided.

The conduit 40 is defined by an inner mandrel 41 which extends longitudinally along the length of the apparatus. The inner mandrel 41 is supported within the main body 20 of the housing 12 by first and second shroud ends 42a, 42b. The first and second shroud ends 42a and 42b also support a plurality of inner barrels 44 distributed circumferentially around the conduit 40. In this case, eight inner barrels 44 are defined, but in alternative embodiments a lesser or greater number of inner barrels 44 may be provided.

The inner mandrel 41, first and second shroud ends 42a, 42b, and inner barrels 44 together form a skeletal structure of the apparatus which defines the flow paths through the apparatus. A preferred material for the inner mandrel 41, first and second shroud ends 42a, 42b, and inner barrels 44 is stainless steel, although other materials may be used within the scope of the invention. These include but are not limited to thermoplastic fluoropolymers such as PTFE or PVDF, and/or thermoplastic polyaryletherketones such as PEEK.

Disposed between the conduit 40 and the flow paths defined by the barrels 44 is a flow redirection volume in the form of an intermediate flow manifold 60. The intermediate flow manifold 60 is fluidly connected with the conduit 40, and the flow paths defined through the barrels 44. The manifold 60 redirects the flow from the conduit 40 to the openings to the barrels 44, and in this configuration reverses the flow direction to provide a convoluted path through the apparatus.

Downstream of the barrels 44 is a flow collection manifold 70. The downstream ends of the barrels are open to the flow collection manifold 70, and the outlet 18 connects the apparatus to an outlet conduit (not shown).

Each inner barrel accommodates a respective UV source 54, comprising a cylindrical UV lamp 55 and thimble 56 which extend along the apparatus through the inner barrels 44. As with UV source 50, the UV sources 54 are substantially cylindrical, and the thimbles 56 comprise sheaths of SFS material which define UV emission surfaces. Each thimble and lamp assembly is located centrally within a respective inner barrel 44 to define an annular space 58 between the outer surface of the thimble and the inner surface of the inner barrel.

As shown in FIGS. 3B and 3C, the inner mandrel 41 extends into a slot 32 on the injector assembly 30, and is sealed against the injector assembly by an o-ring. The UV sources 50, 54 extend through the injector assembly 30 to apertures provided in the end flange assembly 22a, and are sealed against apertures in the injector 30.

FIG. 3C most clearly shows a thimble 56 extending from a barrel 44, through the flow collection manifold 70, through the collection manifold and the injector assembly, and into the injector assembly and end flange assembly. The thimble 56 is sealed against the shroud end 42a, the injector assembly 30, and the end flange 22a by respective pairs of o-ring seals. The o-ring seals contain liquid flowing from the annular space 58 between the thimble 56 and the barrel 44, into the collection manifold 70 and out of the outlet 18, while permitting rotation of the thimble with respect to the apparatus and the internal UV lamp (as will be described below). Outer o-rings provide seals between the shroud end 42a and the main body 20, and the injector assembly 30 and the main body 20. Similar mounting and seal arrangements are provided at the shroud end 42b.

The flow inlet manifold 24, injector assembly 30, inner mandrel 40, intermediate flow redirection volume 60, barrels 44, and flow collection manifold 70, together define the flow path of a liquid from the inlet 16 to the outlet 18. The inventors have appreciated that the flow characteristics of the liquid, as it passes the UV emission surfaces of the UV sources 50, 54, have a significant impact on the efficiency and effectiveness of the advanced oxidation process. The conduit 40 provides an annular flow space around UV source 50 immediately downstream of the gas injection assembly. In this region, the liquid is mixed with dissolved and undissolved ozone and oxygen gas and is exposed to UV radiation emitted by the source 50. The internal volume of the conduit is an active reactor volume which treats the water through reaction of contaminants with hydroxyl radicals (•OH) generated through the presence of ozone gas and the exposure to UV radiation. The flow of liquid is arranged around the UV emission surface of the UV source 50.

By the time the flow reaches the downstream end of the conduit 40, the majority of the injected ozone is dissolved. The flow of liquid is reversed in the intermediate flow manifold 60, and enters the relatively small annular volumes 58 defined by the barrels 44 and the respective thimbles 56. The liquid therefore follows a convoluted path. The liquid flows past the UV sources 54, and into the flow collection manifold 70. The number, size, and configuration of the barrels 44 are selected to provide a thin film, laminar flow path through the annular volumes 58 defined between the barrel and its respective UV source. By dividing the flow into multiple parallel flow paths in this way, the apparatus redistributes the liquid across the multiple UV emission surfaces, reducing the average distance of the liquid and any dissolved or suspended contaminants to the emission surface.

In this embodiment, the maximum distance the liquid flowing in the barrel annulus and the emission surface, in a direction substantially normal to the emission surface is approximately 4 mm. This is defined by the radial width of the annular space 58. Other distances may be used in alternative embodiments of the invention, but it is preferred that the distance is less than 20 mm.

The apparatus functions to modify a cross-section of the liquid flow path to form one or more flow treatment flow cross sections. The flow is distributed around the UV source, and comprises a flow treatment flow cross section which has a first dimension measured in a direction substantially transverse to a direction normal to the emission surface (i.e. around the annulus). A second dimension of the flow cross section, substantially parallel to the direction normal to the emission surface (i.e. in the radial direction of the barrel), is considerably less than the first dimension. In other words, the flow cross-section is modified to be distributed across (and in this case around) the emission surface. By providing multiple barrels (and therefore multiple parallel flow paths) the liquid being treated can pass along and through the barrels at an appropriate flow rate for the advanced oxidation process. This enables treatment rates and capacities to be maintained without increasing the flow rate of liquid through the apparatus, and/or without introducing a substantial pressure drop or increase across the apparatus.

Figure 4A:
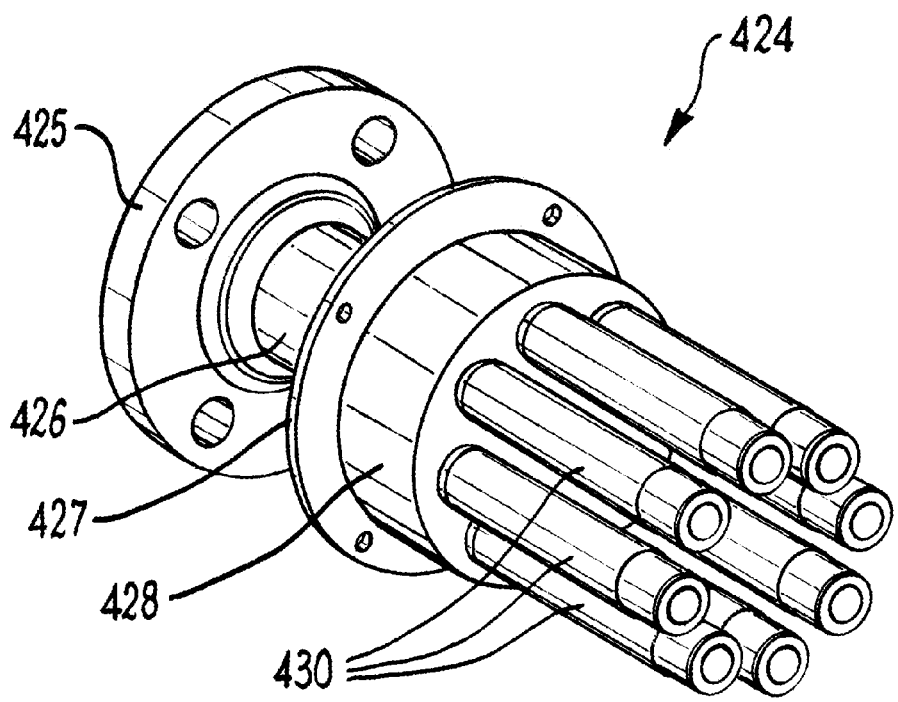
FIG. 4A is an isometric view of a flow inlet manifold assembly used in the apparatus of FIGS. 1A and 1B.
Figure 4B:
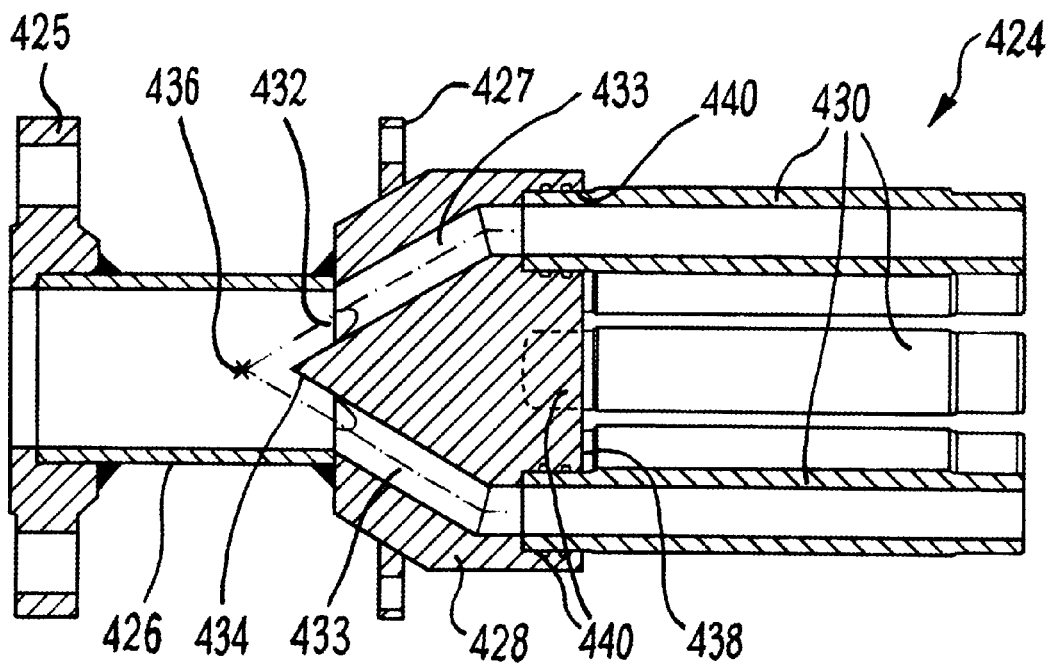
FIG. 4B is a longitudinal section through the flow inlet manifold assembly of FIG. 4A.
Figure 4C:
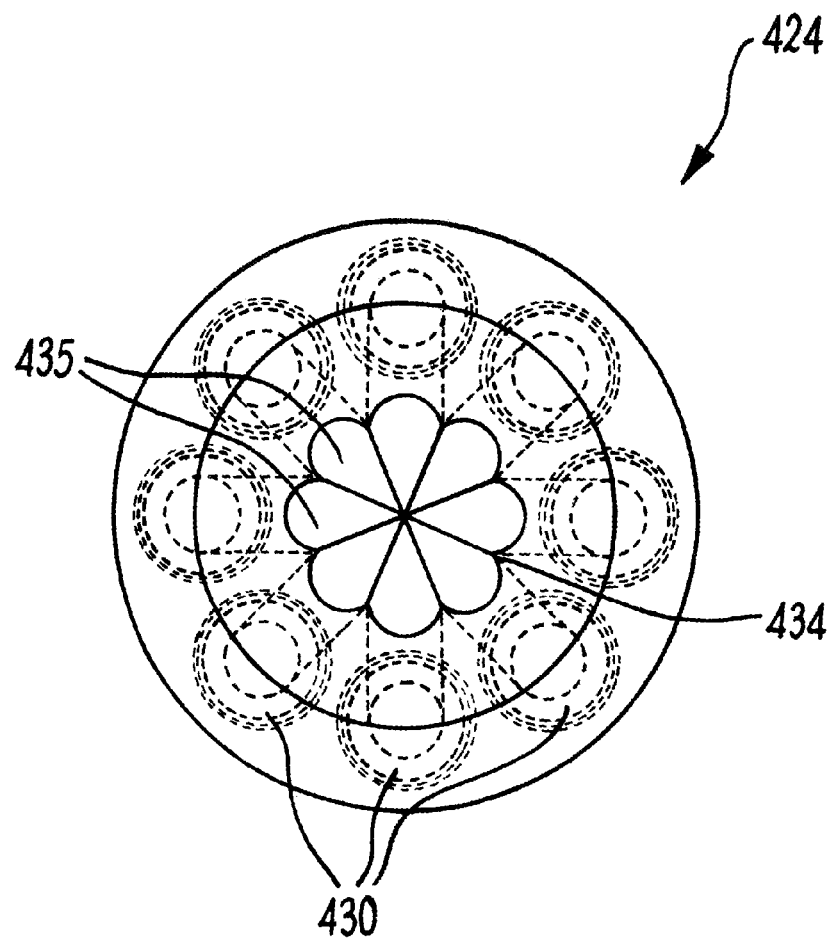
FIG. 4C is a schematic end view of the flow inlet manifold showing internal features.
Figure 5A:
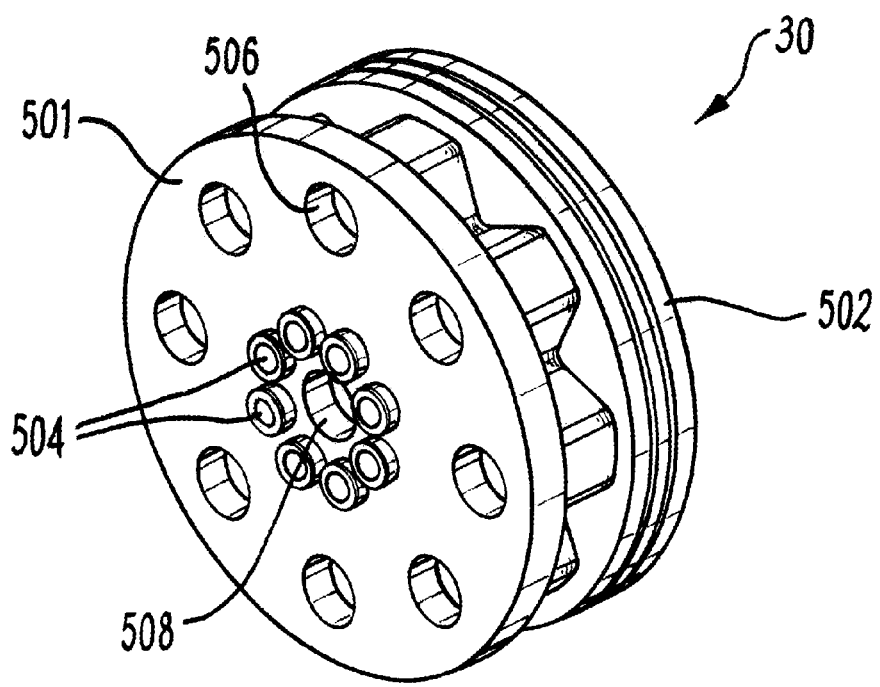
FIGS. 5A and 5B are respectively isometric and end views of an injector assembly used in the apparatus of FIGS. 1A and 1B.
Figure 5B:
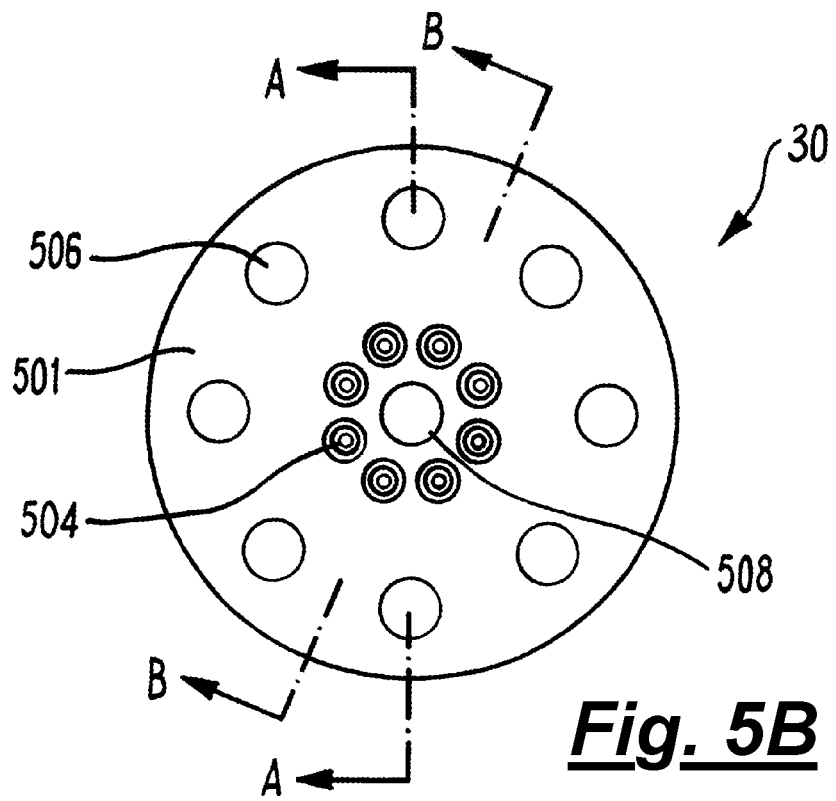

The flow inlet manifold 24 is shown in more detail in FIGS. 4A to 4C. FIG. 4A is an isometric view of a flow inlet manifold assembly, generally depicted at 424. The assembly 424 comprises an inlet tubing 426, a flow divider 428, and a plurality of outlet tubings 430. The inlet tubing 426 is provided with a socket flange 425 with permits the inlet tubing to be coupled to the source of liquid to be treated (not shown). A mounting and retaining flange 427 is also provided on the flow divider 428.

The flow divider 428 comprises a single inlet 432 arranged to be joined with the inlet tubing 426, and divides the flow into a plurality of divider conduits 433. The flow divider comprises a nose 434, which is defined by scalloped edges 435 which correspond to part-cylindrical boundaries of the divider conduits 433. The axes of the divider conduits 433 converge towards a point 436 on the longitudinal axis of the inlet tubing 426 immediately upstream of the nose 434. A downstream facing surface 438 of the flow divider comprises a plurality of circumferentially distributed apertures 440 which receive the outlet tubings 430.

In use, liquid flowing into the inlet tubing 426 impinges on the nose 434 of the manifold, and is divided into the divider conduits 433 such that the fluid exits through the plurality of outlets. In this embodiment, eight outlets 430 are provided, corresponding to the number of injectors in the injector assembly 30, as will be described below. It will be appreciated that in alternative embodiments of the invention, a lesser or greater number of outlet conduits and/or injectors may be used.

Referring now to FIGS. 5A and 5B, FIGS. 6A and 6B, FIGS. 7A to 7D, and FIGS. 8A to 8C, there is shown generally at 30 an injector assembly used in the apparatus of this embodiment of the invention. The injector assembly 30 comprises first and second injector members in the form of plates 501 and 502. The injector plates comprise a plurality of throughbores 504, 506, circumferentially arranged around a central axis of the assembly. A central throughbore 508 receives a thimble 52 and its UV source 50, and o-rings seal the bore against the surface of the thimble 52. A first, inner ring 504 of throughbores is arranged to receive and seal the outlet tubings 430 of the inlet manifold assembly 424 of FIGS. 4A to 4C. A second, outer ring of throughbores 506 is configured to receive and seal thimbles 56 of UV sources 54.

FIGS. 6A and 6B are sectional views through the assembly at lines A-A and B-B respectively. FIG. 6A shows sectional views through two of the outer throughbores 506 and central throughbore 508. FIG. 6B shows a section through the throughbores 504, which form injection flow channels.

The second injector plate 502 comprises an annular slot 32 which is configured to receive the inner mandrel 41 of the apparatus with a corresponding o-ring sealing recess.

Figure 7A:
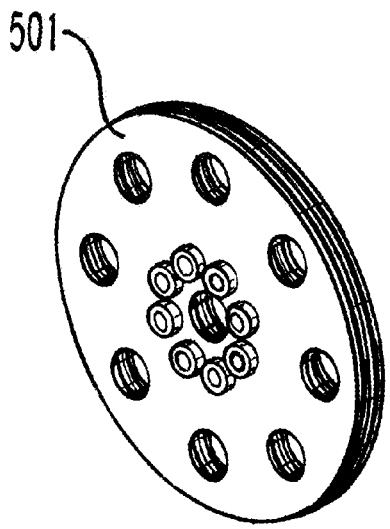
FIGS. 7A and 7B are respectively front and rear isometric views of a first injection plate of the injector assembly of FIGS. 6A and 6B.
Figure 7B:
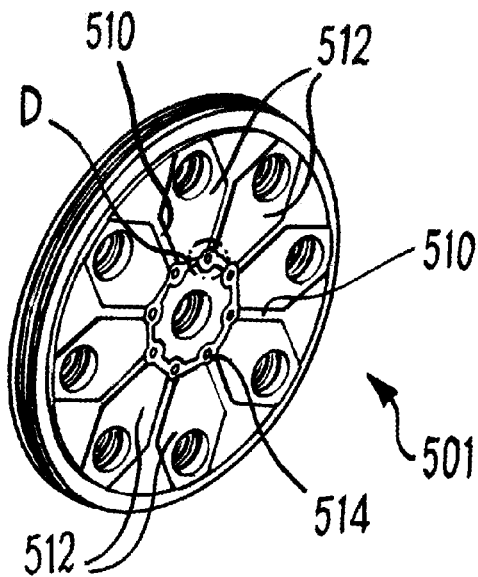
Figure 7C:
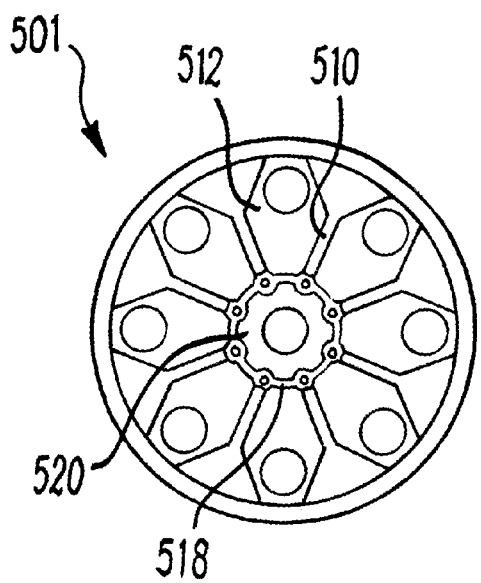
FIG. 7C is a rear elevation of the first injection plate of FIGS. 7A and 7B.
Figure 7D:
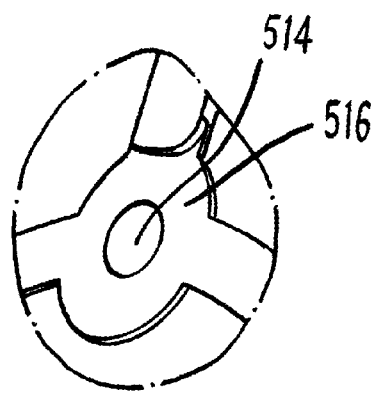
FIG. 7D is an enlarged view of a detail D of FIG. 7B.

As will be clearest from FIGS. 7A to 7D and 8A to 8C, the first and second injection plates 501, 502 are assembled together to form a plurality of radially oriented injection paths 510 for the injection of gas into liquid flowing through the injection flow channels 504. The inside surface of the first injector plate 501, as shown in FIG. 7B, comprises an arrangement of circumferentially-distributed upstanding abutment faces 512, which partly define radially oriented narrow recess channels 510. Each recessed channel 510 is aligned with an injection port 514, details of which are shown in FIG. 7D. Each injection port 514 comprises an annular recess 516 which surrounds the throughbore forming a part of the injection flow channel 504. Each injection port 514 is connected to an adjacent injection port 514 by a circular recess 518, defined by the upstanding abutment faces 512 on the outside and a central abutment face 520 on the inside.

Figure 8A:
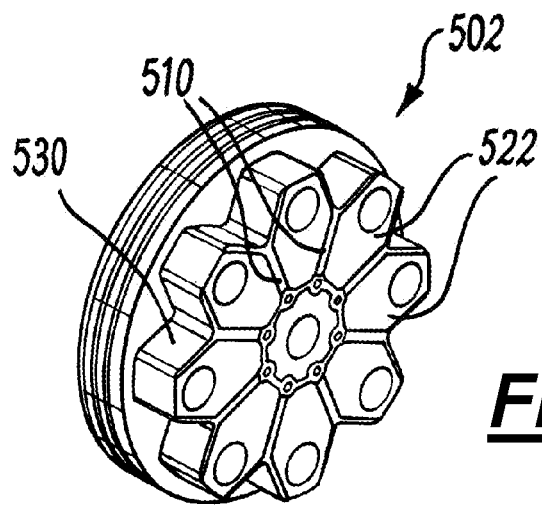
FIGS. 8A and 8B are respectively front and rear isometric views of a second injection plate of the assembly of FIGS. 5A and 5B.
Figure 8B:
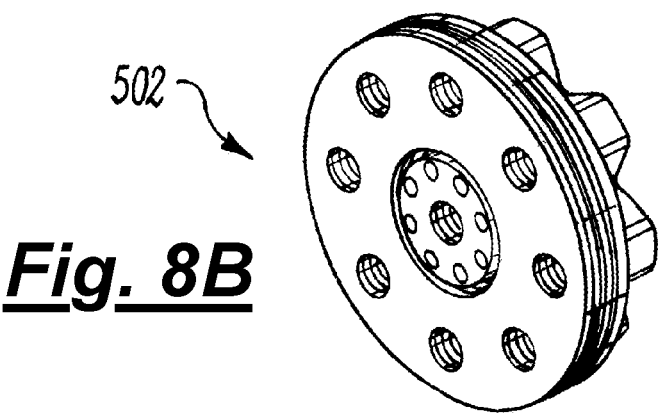
Figure 8C:
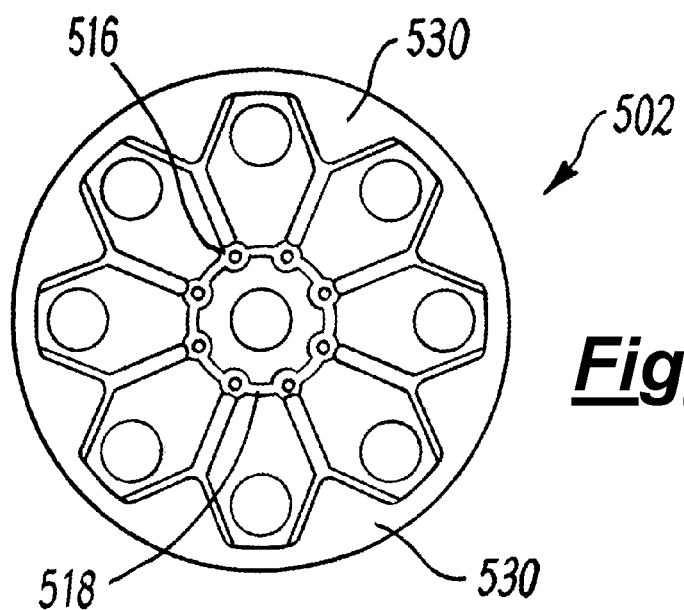
FIG. 8C is a front elevation of the second injection plate of FIGS. 8A and 8B.
Figure 10A:
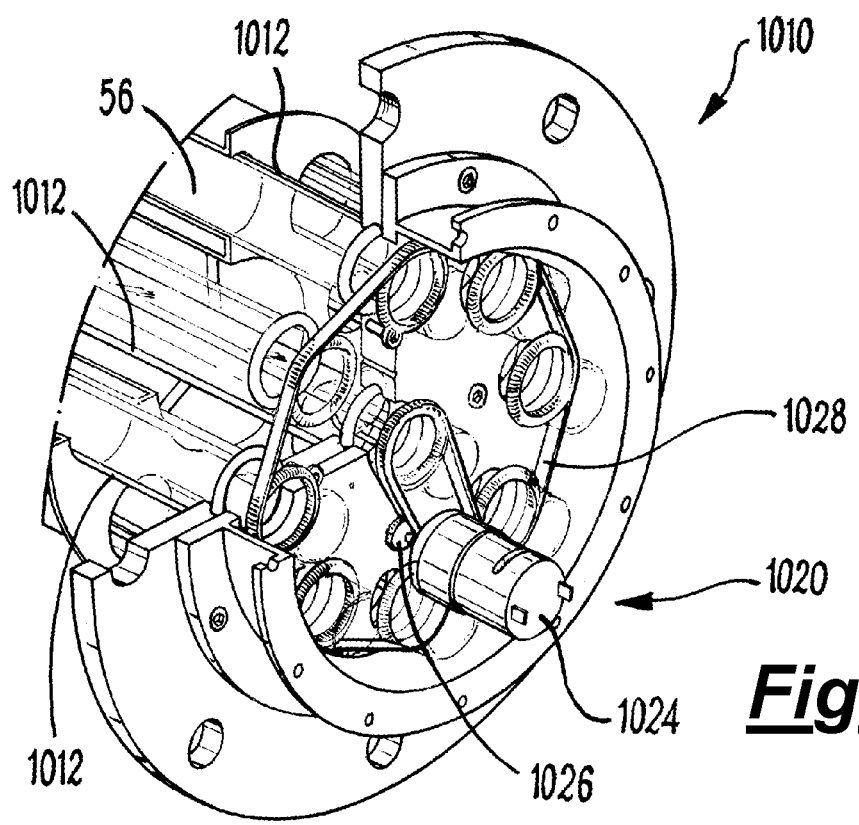
FIGS. 10A, 10B and 10C are respectively isometric, first end and second end views of a cleaning system according to an embodiment of the invention.
Figure 10B:
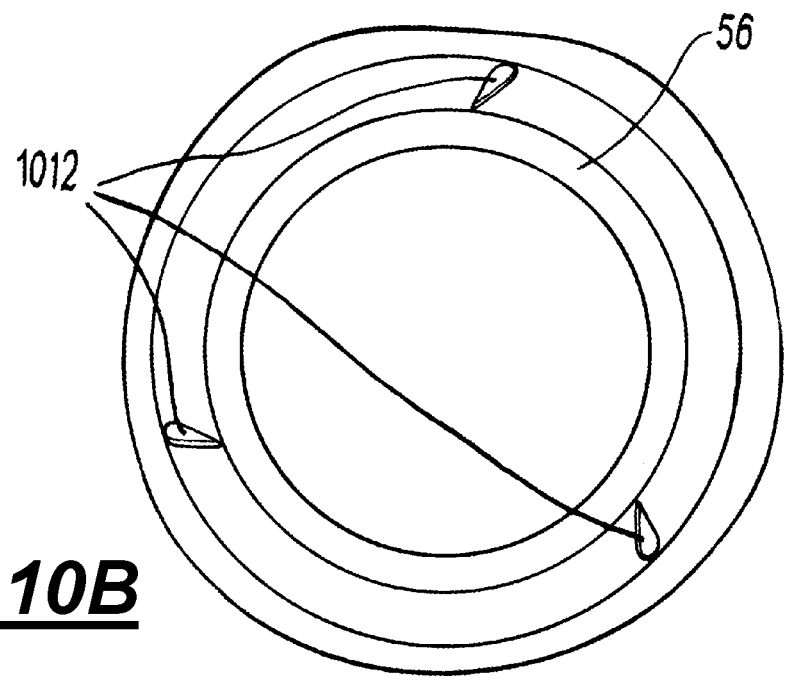
Figure 10C:
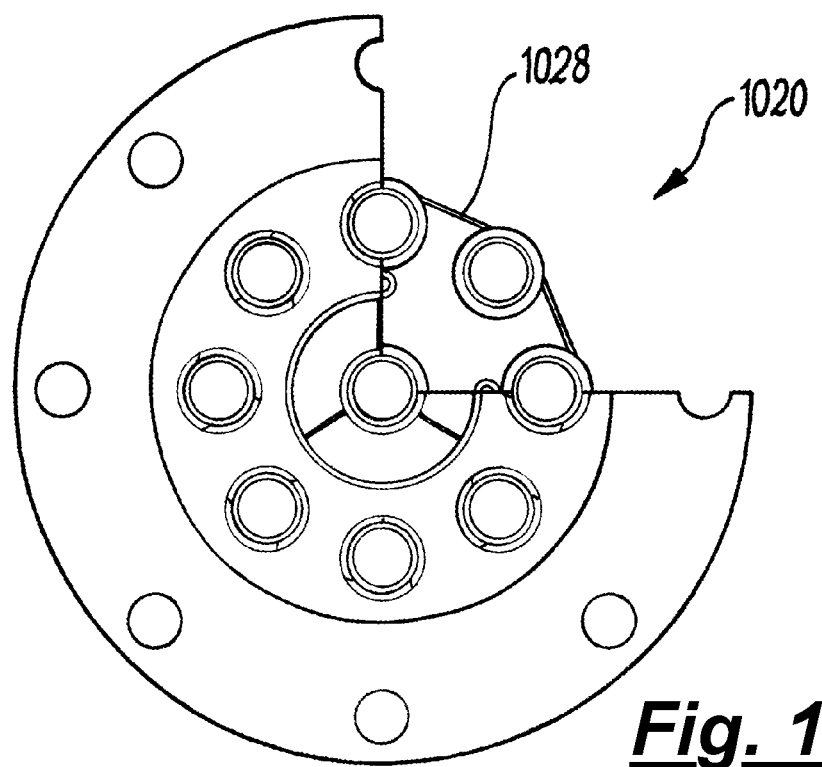
Figure 10D:
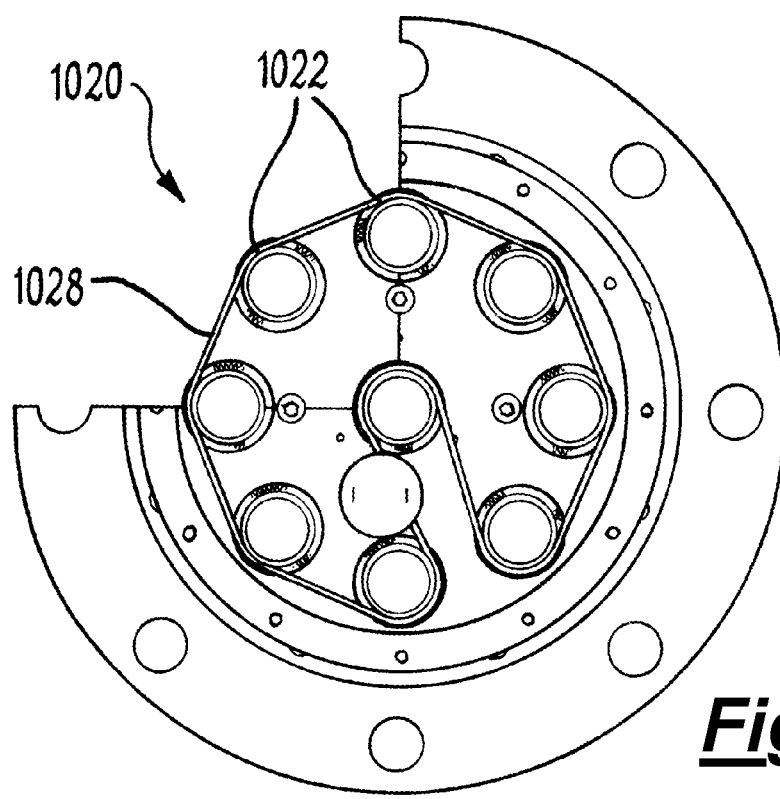

Referring now to FIGS. 8A to 8C, the second injection plate 502 comprises a substantially planar outside surface and inside surface which has a shape corresponding to the inside surface of the first injection plate 501. In particular, the inside surface comprises an arrangement of circumferentially distributed upstanding abutment faces 522, which partly define radially-oriented narrow recessed channels 510. Each recessed channel 510 is aligned with an injection port 514. Each injection port comprises an annular recess 516 which surrounds the throughbore forming a part of the injection flow channel 504. Each injection port 514 is connected to an adjacent injection port 514 by a circular recess 518, defined by the upstanding abutment faces 512 on the outside and a central abutment face 520 on the inside.

Around its perimeter, the second injection plate 502 is shaped to define a plurality of gas chambers 530, located in the spaces between adjacent throughbores 506. When the first and second injection plates are brought together, as most clearly shown in FIGS. 6A and 6B, the abutment faces are aligned to define injection paths 510 which connect the injection gas chambers 530 to the injection ports 514.

The injection flow channels 504 are substantially circular in cross section. The injection assembly 30 functions as a Venturi injector array, and each injection flow channel 504 comprises a restriction which provides a reduction in liquid pressure to draw a gas, such as ozone or oxygen, into a liquid flowing through the channels 504.

The injection assembly of this embodiment is formed from a material which is capable of transmitting the full UV radiation spectrum (including UVA, UVB and UVC radiation). In this case, the material is a synthetic fused silica (SFS) glass. Each of the first and second plates is of unitary construction from SFS material. In the assembled apparatus, UV sources 50 and 54 extend into and through the injector assembly 30. As the injector assembly is formed from a material transparent and transmissive to UV radiation, the UV radiation propagates through the injector assembly 30 to the injection port. Radiation is therefore incident on the liquid before, at the point of, and immediately after and before the injection of the gas. The inventors have appreciated that immediate or near immediate UV irradiation of a liquid to be treated at an ozone injection point significantly improves the efficacy of an advanced oxidation process reaction.

In addition, UV radiation propagates from the UV sources 50, 54 through the injection assembly into the gas chambers 530 disposed around the circumference of the injection assembly. In certain applications, pre-exposure of the gas prior to injection into the liquid to be treated may have a beneficial effect on the creation of hydroxyl radicals, and therefore positively affects an advanced oxidation process. In particular, pre-exposure of an ozone/oxygen gas mixture prior to injection may increase the proportion of ozone in the mixture, therefore increasing the potential for hydroxyl radical creation at the point of gas injection into a treatment liquid.

Alternative embodiments of the invention may use different (or additional) approaches to increase the UV exposure of injection gas. In one group of variants, the exposure of the gas to UV radiation from the UV source is enhanced by increasing the surface area of the gas injection paths. This may be achieved for example by forming the injection paths (510 in FIG. 6B) to be convoluted to provide a tortuous path for the injection gas through the injector plates, increasing the distance that the gas travels through the apparatus to thereby increase exposure of the gas to UV radiation from the UV source. Alternative variants enhance exposure of the gas to UV radiation from the UV source by increasing the surface area of the flow path, without necessarily increasing the length of the flow path. This can be achieved, for example, by machining one or more recesses or grooves, or providing one or more upstanding formations, in the flow path. Alternatively, or in addition, a surface treatment may be applied to the interior of the flow paths to create a roughened and/or dimpled surface which increases its surface area (for example like the surface of a golf ball). Various methodologies may be used to create such an increase in surface area, for example grit blasting or selective etching. A further alternative embodiment enhances exposure of the gas to UV radiation from the UV source by optimising the shape and or size of the gas chambers (530 in FIG. 6B). It will be appreciated that combinations of machining, increasing flow path length and/or tortuosity, and/or surface treatment may be used depending on system requirements.

In preferred embodiments of the invention, the injector assembly 30 is formed by the following method. A single block of UV transmissive material (e.g. SFS glass) which is substantially cylindrical in shape is provided. The block is cut in a plane perpendicular to the longitudinal axis of the block, to form a pair of plates. One or both of the opposing faces of the plates is machined to form the injection paths (510 in FIGS. 6A and 6B). The plates are then recombined to form the injector assembly, by tightly compressing, gluing, bonding or fusing the respective plates together. In one embodiment the plates are fused together by partially melting the glass. The throughbores are formed through the assembly after the plates have recombined, although in alternative embodiments the throughbores are formed prior to cutting the block into two plates, or after forming the plates but prior to their reassembly.

Referring now to FIGS. 9A to 9C, there is shown an injection diffuser, generally depicted at 910, used in accordance with embodiments of the invention. The injection diffuser 910 is disposed in the apparatus in a location downstream of the injection ports, as shown in FIG. 2. In this embodiment, an injection diffuser 910 is provided in a downstream part of each injection flow channel 504, in the injection assembly 30 itself. Therefore the diffusers are in close proximity to the injection ports 514.

The injection diffuser 910 occupies a substantially cylindrical volume, and is formed from an arrangement of interacting slats 912 which are arranged in parallel groups 914a, 914b. Each group of slats is arranged in a plane, with the planes of adjacent groups being inclined with respect to one another. Slats 912 in adjacent groups intersect one another. The groups are arranged in a repeating pattern and as shown in FIG. 9C, in the longitudinal direction of the injection diffuser, a circular cross-sectional area is substantially covered so that there is no direct path for liquid through the diffuser. The diffuser therefore defines a highly tortuous flow path for a fluid mixture flowing in the channel, which results in effective mixing of the fluids. This has the effect of increasing the surface area of undissolved ozone and oxygen bubbles by splitting the bubbles into smaller bubbles. The fluid mixture becomes a substantially homogeneous mixture.

In this embodiment, the injection diffuser 910 is coated with the photocatalytic compound titanium dioxide in order to lower the activation energy for the advanced oxidation process reaction. This configuration is particularly advantageous with the UV transmissive injector assembly 30 of preferred embodiments of the invention: the injection diffuser 910 may be placed close to the injection port (within the injector flow channels themselves) for increased effectiveness, and because the injector is formed from a UV transmissive medium, it is exposed to UV radiation from the UV sources. The high surface area of the diffuser 910 and the high degree of contact with the flowing liquid and gas mixture makes the diffuser an effective support for a photocatalyst coating. The result is an injection diffuser which promotes the shearing, mixing and dissolution of injected gas, while enhancing the advanced oxidation reaction through a photocatalytic effect.

The injection diffuser 910 shown in 9A to 9C has a fixed geometry. However, in a variation to the illustrated embodiment, the geometry of the injection diffuser may be adjustable. For example, adjacent, intersecting planes of slats 910 may be enabled to pivot with respect to one another. Thus the length of the injection diffuser can be increased, with a corresponding reduction in cross-sectional area, reducing the resistance to the flow as the liquid passes through the channel in which the injection diffuser is located. In preferred embodiments of this variation, the geometry is automatically adapted dependent on the liquid flow impinging on the injection diffuser. An increased flow rate would tend to close the arrangements of slats with respect to one another in order to increase the flow resistance and create an enhanced mixing and diffusion effect. In contrast, lower flow rates would reduce the tortuosity of the flow path provided by the injection diffuser and reduce the restrictive effect on the flow.

It will be appreciated that the diffuser assembly could take alternative geometric forms (which may or may not include arrangements of slats) whilst producing similar effects on mixing of liquid and gas and the shearing and/or splitting of undissolved gas bubbles. Alternatively (or in addition), although the injection diffuser 910 is formed from a suitable solid material which is then coated with titanium dioxide, other photocatalytic compounds may be used to coat the injection diffuser. Photocatalytic compounds which may be used within the scope of the invention include but are not limited to photocatalytic metal oxides, including for example aluminium oxide.

In a further alternative embodiment, the injection diffuser is partially or fully constructed from a photocatalytic material (rather than being formed from a non-catalytic material which is subsequently coated). The material may, for example, be a composite of a polymeric material and a photocatalytic metal oxide.

FIGS. 10A to 10D illustrate features of a cleaning system in accordance with an embodiment of the invention. The apparatus 10 includes a cleaning mechanism which addresses issues which may occur due to build-up of materials, such as scale or debris, on the functioning parts of the apparatus. In particular, and as noted above, effective exposure of the liquid to be treated from the UV radiation requires good transmission of the UV radiation throughout the liquid volumes. Debris and contaminants contained in the liquid may have a tendency to accumulate on the UV emission surfaces of the UV sources, reducing their transparency by preventing effective radiation and reducing the efficiency of the advanced oxidation process reaction. In addition, reaction processes may cause a build-up of scales or other by-products of reaction processes, which can further reduce the effective transmission of the UV radiation.

In order to address these issues, the apparatus is provided with a cleaning system 1010 comprising an arrangement of elongated wiper elements 1012 which extend along the length of the apparatus in the conduit 40 and the annular spaces 58, oriented parallel to the longitudinal axes of the UV sources 50, 54. The wiper elements 1012 contact the emission surfaces of the thimbles 52, 56. In this embodiment, three wiper elements 1012 are provided for each thimble, and are arranged circumferentially around the surface at 120 degree spacing. The wiper elements provide a linear contact point along the UV emission surfaces. The wiper elements also function to centralise and support the thimbles along the length of the annular flow spaces. The wiper elements 1012 of this embodiment are constructed from a compliant, UV-stable and ozone-stable thermoplastic material, which in this case is polytetrafluoroethylene (PTFE). In alternative embodiments, other suitable materials may be used to form the wiper elements, including but not limited to elastomeric materials such as ethylene propylene diene monomer (EPDM) rubber. Combinations of materials, including combinations of thermoplastics and elastomeric materials may be used to form the wiper elements.

The apparatus is also provided with a drive mechanism, generally shown at 1020 which is configured to rotate the UV emission surfaces relative to the wiper elements 1012. In this configuration, the drive mechanism is arranged to rotate the thimbles 52, 56 of the UV sources with respect to the wiper elements, the latter remaining static with respect to the rest of the apparatus 10. Each thimble is provided with a supporting o-ring seal and a sprocket 1022 located at its driven end. The thimble is supported in the end flange 42a by o-ring seals which permit rotation of the thimble. An electric motor 1024 provides a drive gear 1026 which engages a belt or chain 1028, and the belt or chain engages the sprockets 1022 of the thimbles. In use, the electric motor 1024 is activated to rotate the thimbles by driving the belt or chain 1028. As the outer surface of the thimble rotates, it is wiped by the static wiper elements, and experiences three wipes across the complete liquid-exposed length of the thimble for each revolution of the thimble. The effect of wiping is to remove and/or prevent build up of debris, scale or other contaminants in the liquid treatment volumes. This improves the efficiency of the treatment process, and increases mean time between maintenance actions, and increases the longevity of the apparatus.

In variations to the described embodiment, the wiper elements 1012, and in particular those wiper elements in the conduit 40 surrounding the UV source 50, may be provided with supplementary static mixer elements which serve to further promote shearing, mixing and dissolution of injected gas.

Figure 11:
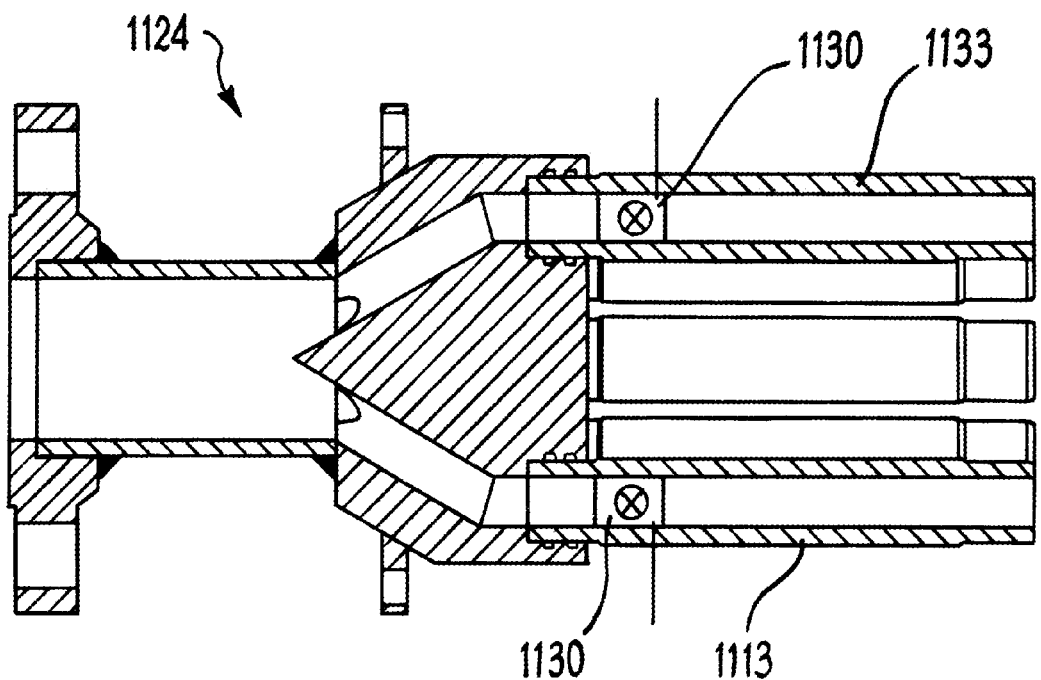
FIG. 11 is a longitudinal section through a flow inlet manifold assembly according to an alternative embodiment of the invention.

FIG. 11 is a cross-section through a flow inlet manifold assembly in accordance with a further alternative embodiment of the invention. The flow inlet manifold assembly, generally depicted at 1124, is similar to the flow inlet manifold assembly 424 and will be understood from FIGS. 4A to 4C and their description. However, the assembly 1124 comprises controllable flow valves 1130 disposed in each of the flow outlet tubings 1133. The valves are electronically operated solenoid valves which are controlled by a control module (not shown). The individual valves 1130 are controlled to open or close the outlet tubings 1133, and therefore close the paths to the corresponding injection flow channels. The control module receives signals from one or more detectors located in the inlet conduit which conveys the liquid to be treated to the flow manifold. Depending on the liquid flow parameters measured, which for example may be selected from one or more flow rate, pressure, temperature, turbidity, viscosity, and of one or more parameters associated with the level of contaminants in the liquid, the control module sends a signal to the valves 1130 that determine how many of the outlet tubings 1133, and therefore how many of the injection ports, are active in the treatment process. This provides a simple and effective means for controlling the injection of gas into the liquid to be treated.

In a variation to the assembly 1124, the valves 1130 are fully electronically controllable flow control valves, which are adjustable from a fully open position to a closed position and a range of intermediate flow positions. The valves may therefore enable flow regulation (including choking) and selective shut-off through each individual tubing 1133.

Figure 12:
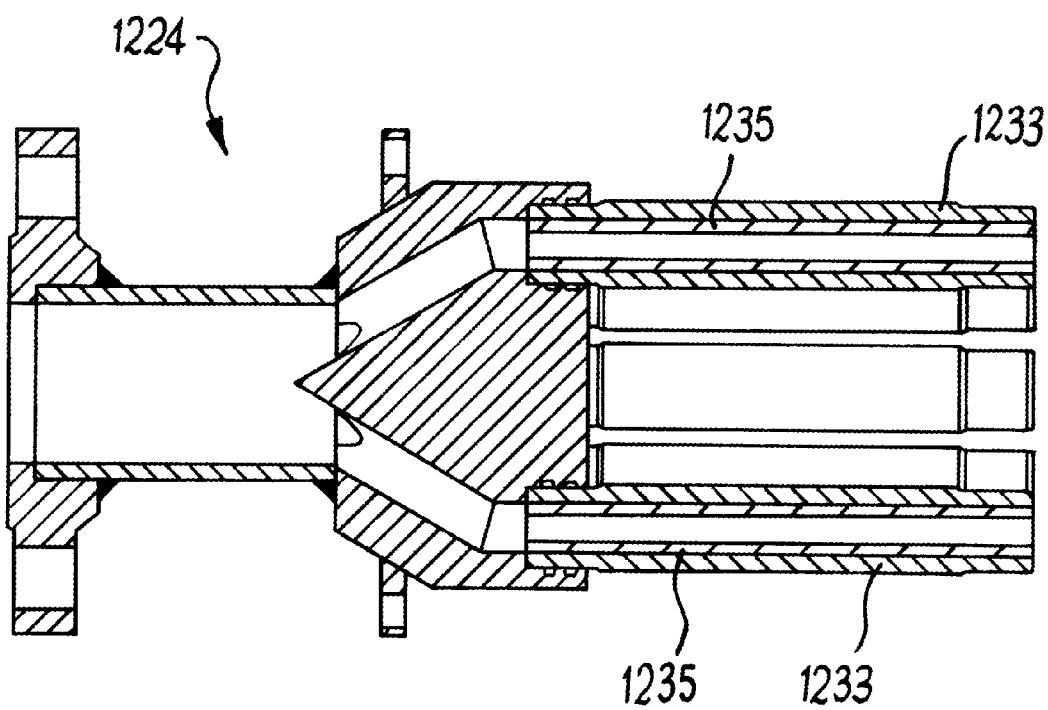
FIG. 12 is a longitudinal section through a flow inlet manifold assembly according to a further alternative embodiment of the invention.

FIG. 12 is a cross-sectional view through a flow inlet manifold according to a further alternative embodiment of the invention. In this embodiment, the assembly 1224 is again similar to the assembly 424, and will be understood from FIGS. 4A to 4C and FIG. 11 and their accompanying descriptions. However, in this embodiment, each of the flow outlet tubings 1233 is provided with a lining 1235 of a UV transmissive material. The lining extends from the opening of the flow outlet tubing to the first injection plate of the injection assembly 30, and therefore is optically coupled with the first injection plate. UV radiation propagating in the injector assembly is also caused to propagate in the lining, in a direction upstream of the injection assembly, and into the flow inlet manifold assembly 1224. The effect of the UV radiation propagating upstream is to increase the UV exposure of the liquid being treated, and expose liquid being treated at an earlier stage of the treatment process. This will have a positive effect on the creation of hydroxyl radicals and liquid to be treated, enhancing the advanced oxidation process reactions and improving the overall efficiency of the treatment method.

Figure 13:
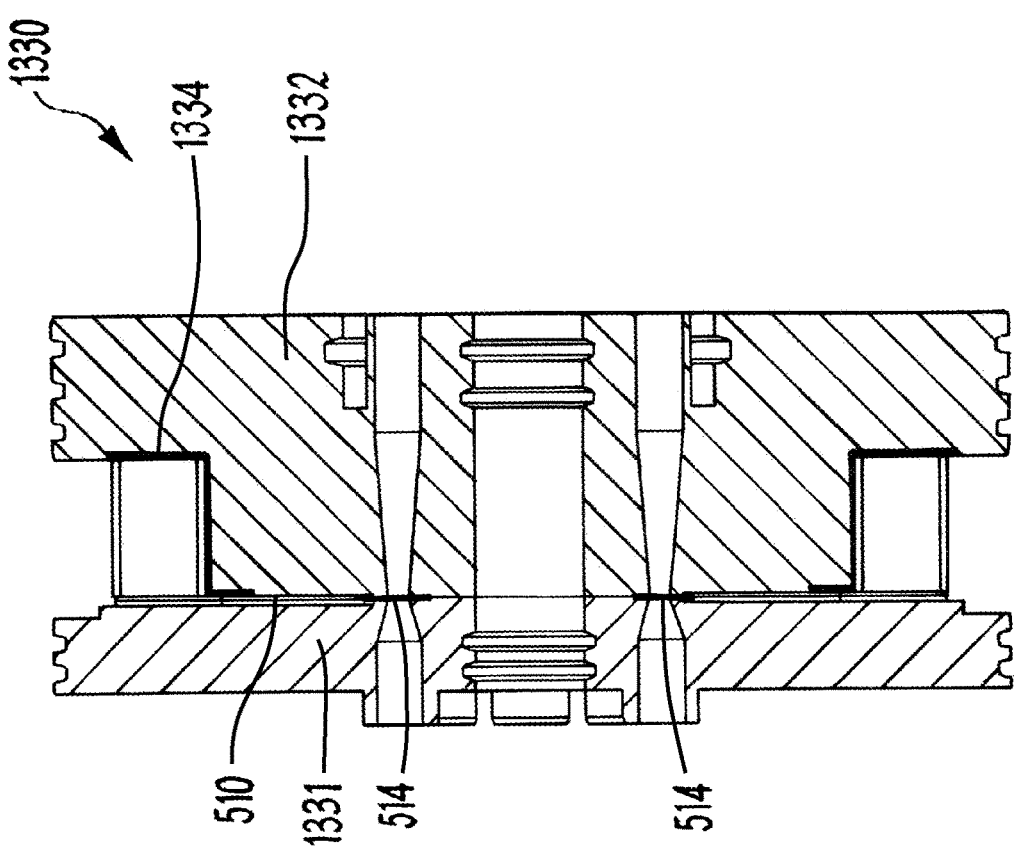

FIG. 13 is a cross-section through an injector assembly in accordance with an alternative embodiment of the invention. The injector assembly, generally depicted at 1330, is similar to the flow injector assembly 30 and will be understood from FIGS. 5 to 8 and their descriptions. However, in this embodiment, the injector assembly 1330 comprises a UV opaque coating 1334 provided on the second injector plate 1332 around the gas chambers 1338. The opaque coating shields the gas in the chambers 1338 from the UV radiation until it is present in the injection flow paths 510. This prevents the UV radiation from having a detrimental effect on the gas in the chamber prior to entry into the injection flow path, but still enables a degree of pre-conditioning of the injection gas prior to the injection point.

Figure 14:
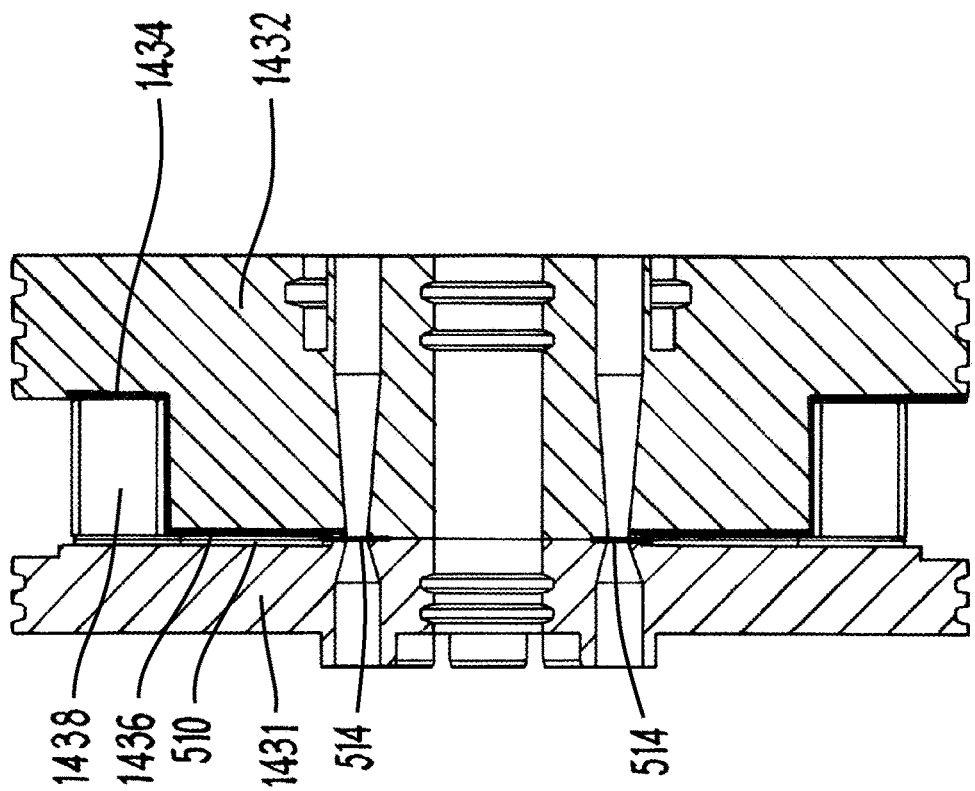
FIGS. 13 and 14 are longitudinal sections through injector assemblies according to alternative embodiments of the invention.

FIG. 14 is a cross-section through an injector assembly in accordance with a further alternative embodiment of the invention. The injector assembly, generally depicted at 1430, is similar to the flow injector assembly 1330 and will be understood from FIG. 13 and its descriptions. The injector assembly 1430 differs in that it comprises a UV opaque coating 1434 on the second injector plate 1432 around the gas chambers 1438 and along the entirety of the length of the flow path to the injection ports 514. The opaque coating shields the gas in the chambers 1438 from the UV radiation until it has been injected into the liquid, and reduces the possibility of degrading the injection gas before it is mixed with the liquid.

In further alternative embodiments of the invention, one or both of the injection plates of the assembly is formed from a material which is opaque to UV radiation (for example stainless steel), and the UV radiation is incident on the liquid only at parts of the apparatus downstream of the injector assembly.

Figure 15:
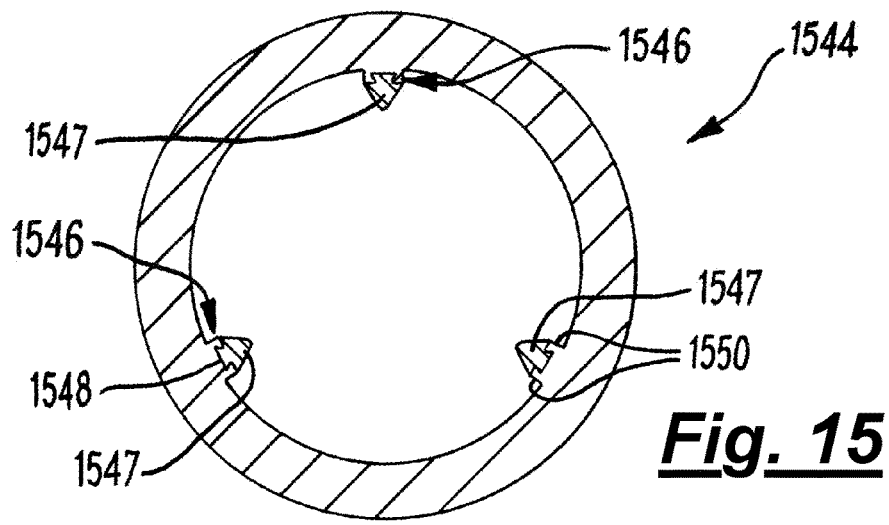
FIGS. 15 to 17 are respectively cross-sectional views of barrels that may be used in alternative embodiments of the invention.

FIG. 15 is a cross section through an inner barrel 1544 in accordance with an alternative embodiment of the invention. The inner barrel 1544 is similar to the inner barrel 44 of the apparatus described with respect to the apparatus 10 of FIGS. 1 to 10 and will be understood from the foregoing description in relation to those drawings. However, in this embodiment, the barrel 1544 is provided with a plurality of formations 1546 that function as attachment points for wiper elements 1547 (or other functional element) which extends along the barrel. In this example, each formation comprises a groove 1548 arranged longitudinally in the inner wall of the barrel, formed by the provision of a pair of upstanding walls 1550. The groove 1548 has a profile corresponding to an attachment profile of a wiper element (not shown) formed from a compliant, UV-stable, ozone-stable thermoplastic material, which in this case is polytetrafluoroethylene (PTFE). During construction of the apparatus, the wiper element is assembled with the barrel by sliding it in a longitudinal direction from the open end of the groove, which functions to attach and retain the wiper element 1547 in the assembled apparatus. Three formations are provided in this embodiment for the attachment of three wiper elements, although it will be appreciated that a greater or lesser number of wiper elements and corresponding formations may be used.

Due to the length of the barrels used in preferred embodiments of the invention, it is advantageous that the cross sectional profile of the barrel 1544 is formed by an extrusion method. The barrel of this embodiment is therefore formed from an extrudable UV-stable and ozone-stable material, which in this case is polytetrafluoroethylene (PTFE). It will be appreciated that other extrudable materials maybe used within the scope of the invention. For example, other extrudable thermoplastics such as polyvinylidine fluoride (PVDF) may be used (including but not limited to those sold under the registered trade mark KYNAR). Extrudable metals such as aluminium and alloys of aluminium could be used to form the barrels in alternative embodiments of the invention.

Furthermore, where technically and/or commercially feasible (for example where the dimensions of the barrels permit), embodiments of the invention may use other techniques such as injection moulding, casting, and 3D printing to form the profiled barrel. It is also possible, particularly where the barrel is formed with a relatively short longitudinal length, that the profile of formations be machined into the surface of the barrel.

Figure 16:
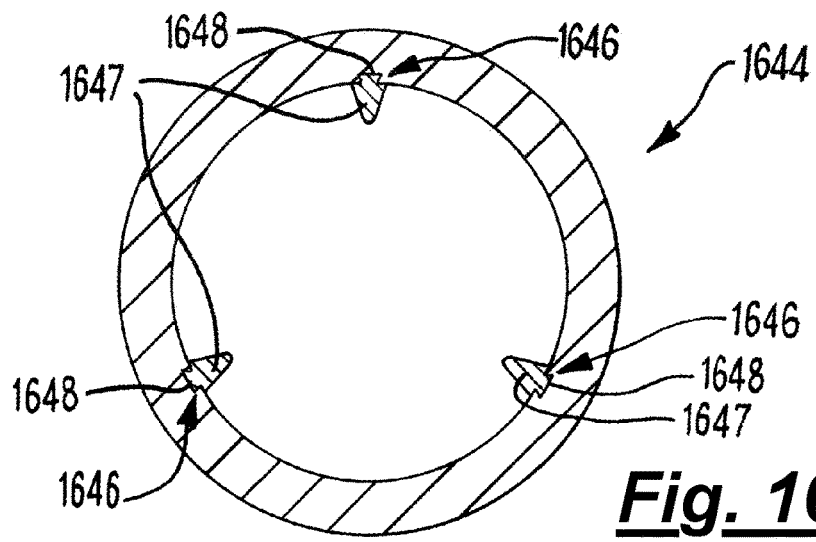

FIG. 16 is a cross section through a barrel 1644 according to a further alternative embodiment of the invention. The barrel 1644 is similar to the barrel 1544, and will be understood from FIG. 15 and the accompanying description. However, in this embodiment, the formations 1646 in the barrel are longitudinally oriented grooves 1648 which have female dovetail cross sections. This corresponds to a male dovetail cross section provided in a wiper element. The grooves functions to attach and retain the wiper elements 1647 in the assembled apparatus.

Figure 17:
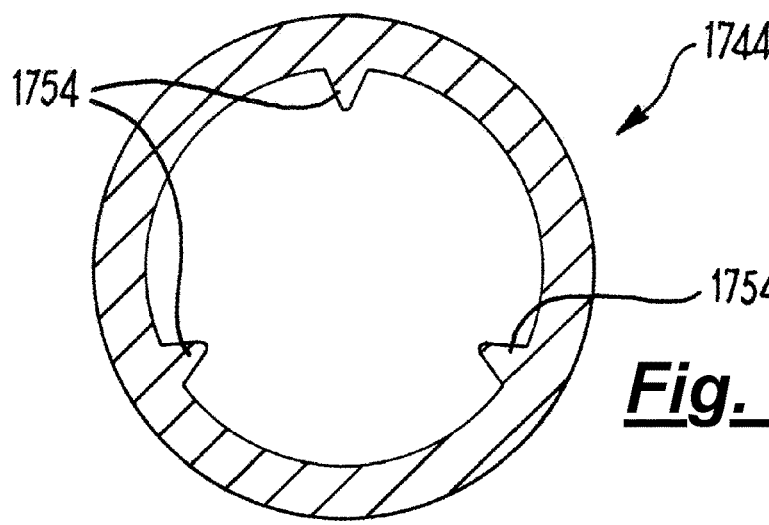

FIG. 17 is a cross section through a barrel 1744 as may be used in an alternative embodiment of the invention. The barrel 1744 is similar to the barrel 1544, and will be understood from FIG. 15 and the accompanying description. In this embodiment, the barrel 1744 differs in that rather than being profiled to provide attachment points for wiper elements which are then subsequently assembled into the barrel, the wiper elements 1754 are unitarily formed with the barrel. The barrel 1744 comprises a number of longitudinally extending ridges which form the wiper elements, and contact a radiation emitting surface of the UV source that extends through the source in the assembled water treatment apparatus.

Due to the length of the barrels used in preferred embodiments of the invention, it is advantageous that the cross sectional profiles of the barrel 1644 and 1744 are also formed by extrusion, and may be formed from polytetrafluoroethylene (PTFE) (although other materials are also suitable). Where technically and/or commercially feasible other techniques such as injection moulding, casting, and 3D printing may be used to form the profiled barrel.

As with the wiper elements with FIGS. 10A to 10D, suitable materials may be used from the wiper elements themselves, including but not limited to elastomeric materials such as EPDM rubber and combinations of thermoplastics and other elastomeric materials.

Figure 18D:
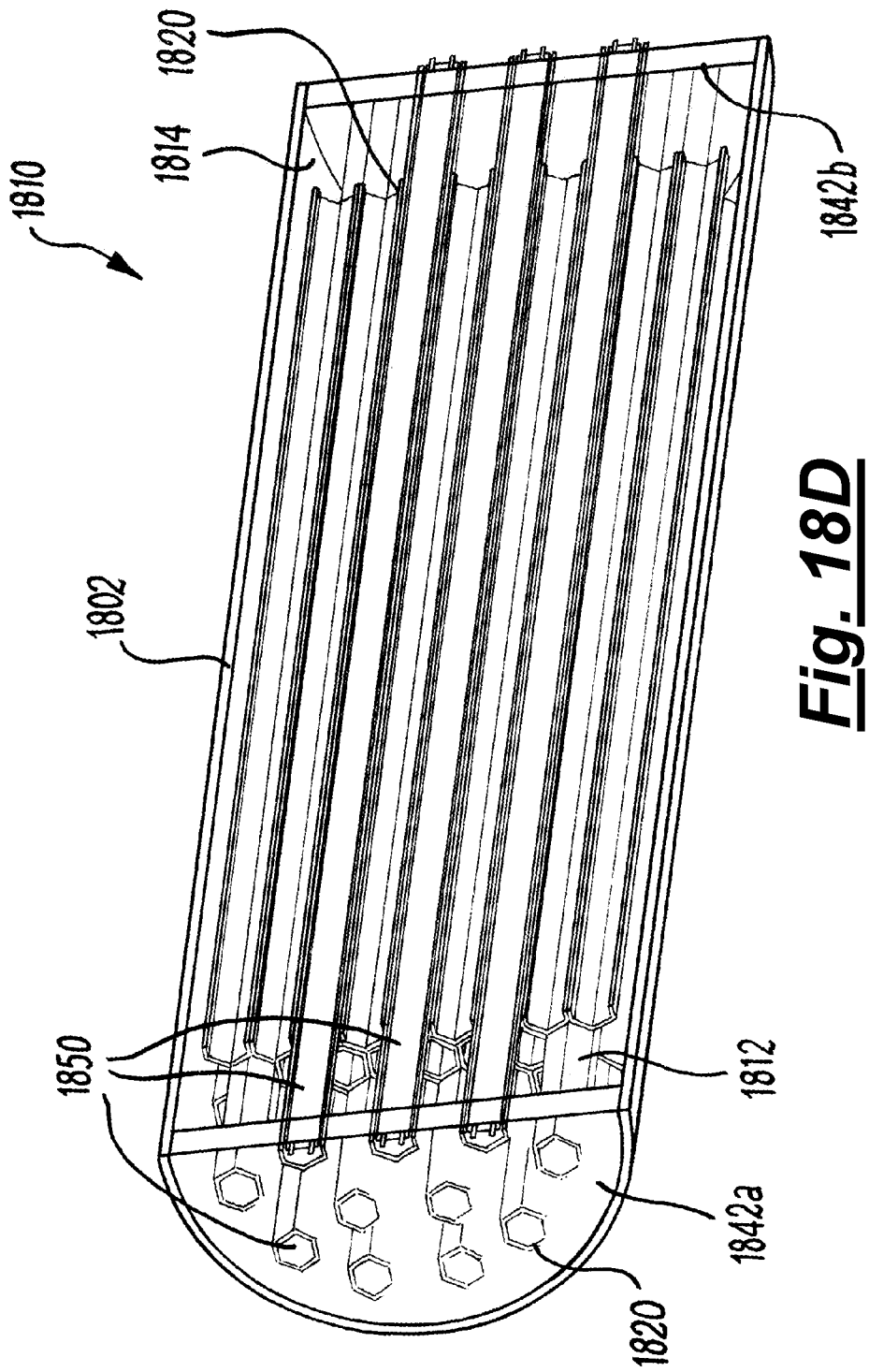

Referring now to FIGS. 18A to 18D, there is shown schematically a water treatment apparatus in accordance with further alternative embodiments of the invention. FIG. 18A is a longitudinal section through the apparatus 1810; FIG. 18B is a cutaway isometric view of the apparatus 1810; FIG. 18C is a schematic end view of the apparatus 1810 showing functional internal components; and FIG. 18D is a further cutaway isometric view of the apparatus 1810.

As with previous embodiments, the apparatus is configured for the treatment of contaminated water in an advanced oxidation process which utilises ultraviolet (UV) radiation in combination with an injection of ozone gas to treat the contaminated water. The apparatus operates in accordance with the same inventive principles as the apparatus of previous embodiments of the invention.

The apparatus 1810 comprises a main body 1802, a flow inlet 1804, and a flow outlet 1806. The apparatus comprises an inlet flow manifold 1812 which is downstream of the liquid inlet 1804, and a liquid outlet manifold 1814 upstream of the liquid outlet 1806. The inlet and outlet manifolds are separated by a flow structure which defines a plurality of parallel treatment flow paths. The apparatus 1810 differs from that of previous embodiments in that the parallel flow paths are defined by an arrangement of conduits 1820 with a regular polygonal cross sections, which in this case are hexagonal. The hexagonal conduits are stacked together to fill the cross-sectional area defined by the main body, and provide plurality of compartmentalised flow streams between the inlet and the outlet manifolds. UV sources 1850, which in this case are longitudinal UV lamps, are provided in selected hexagonal conduits which are isolated from the hexagonal conduits which accommodate the flow (UV sources are omitted from FIG. 18A in the interests of clarity). The UV sources extend through the inlet manifold and the outlet manifold to the first and second shroud ends 1842A, 1842B.

The hexagonal conduits 1820 of this embodiment are formed from a synthetic fused silica (SFS) material and are therefore highly transmissive of UV radiation. UV radiation is therefore able to propagate throughout the internal flow area defined by the main body 1802.

As shown in FIG. 18C, each of the hexagonal conduits that define a flow path through the apparatus (as opposed to housing a UV source), are provided with a wiper assembly 1860 (wiper assemblies are omitted from FIGS. 18A, 18B and 18D in the interests of clarity). In contrast with the previous embodiments, each wiper assembly 1860 comprises a longitudinal wiper element which is driven to rotate with respect to the stationary conduits in which they are located. A wiper assembly comprises a central shaft 1862, which in this example is coaxial with its respective hexagonal conduit, and comprises a pair of wiper elements 1864. The wiper elements 1864 are sufficiently long to reach the maximum radial dimension of the conduit (i.e., into an apex of the hexagonal cross section) and are sufficiently flexible to be rotated to move along the inside surface and passed the minimum radial distance as the shaft rotates.

Compartmentalising the flow into multiple parallel flow streams in the liquid treatment vessel has the advantage of maintaining a laminar flow regime through the apparatus while providing uniform radiation exposure of the liquid being treated. The configuration also ensures that the liquid flowing through the apparatus is a maximum radiation distance measured in the direction normal to a radiation emitting surface. In the example shown, the maximum distance is selected to be 20 mm, although in alternative embodiments, shorter distances of 10 mm, 8 mm, and 5 mm may be selected.

The arrangement of hexagonal conduits provides a highly efficient and orderly stacking arrangement within the finite cross sectional area of the apparatus. In addition, the structure formed by the stacked hexagonal conduits is very strong and resistant to radial or transverse forces on the apparatus.

In the embodiment shown, each hexagonal conduit is formed by extruding the conduit from a synthetic fused silica material. Subsequently, each hexagon is assembled to form the single structure by melting the hexagonal conduits together. However, in an alternative embodiment, the entire structure (or subsections thereof) is formed as a single piece by moulding from synthetic fused silica.

It will be appreciated that in alternative embodiments of the invention, selected hexagonal conduits can be used to provide a reverse flow path for liquid being treated. In such a configuration, the inlet and the outlet may be arranged at the same end of the apparatus with flow being arranged to pass through the apparatus in reverse direction and then being reversed by a flow manifold to pass down the apparatus in an opposing direction via selected hexagonal conduits. Provision of a convoluted reverse flow path in this way increases the exposure of the liquid to UV radiation.

It will be appreciated that in variance to the embodiment shown in FIGS. 18A to 18D, the conduits used to compartmentalise the flow may take different cross sections. For example, the outer shape of the cross section may take on a different polygonal form, such as pentagonal or octagonal. Alternatively, or in addition, the internal surface of the conduit may be shaped differently to the external surface. For example, the internal bore defined by the conduit may be of circular cross section.

Figure 19:
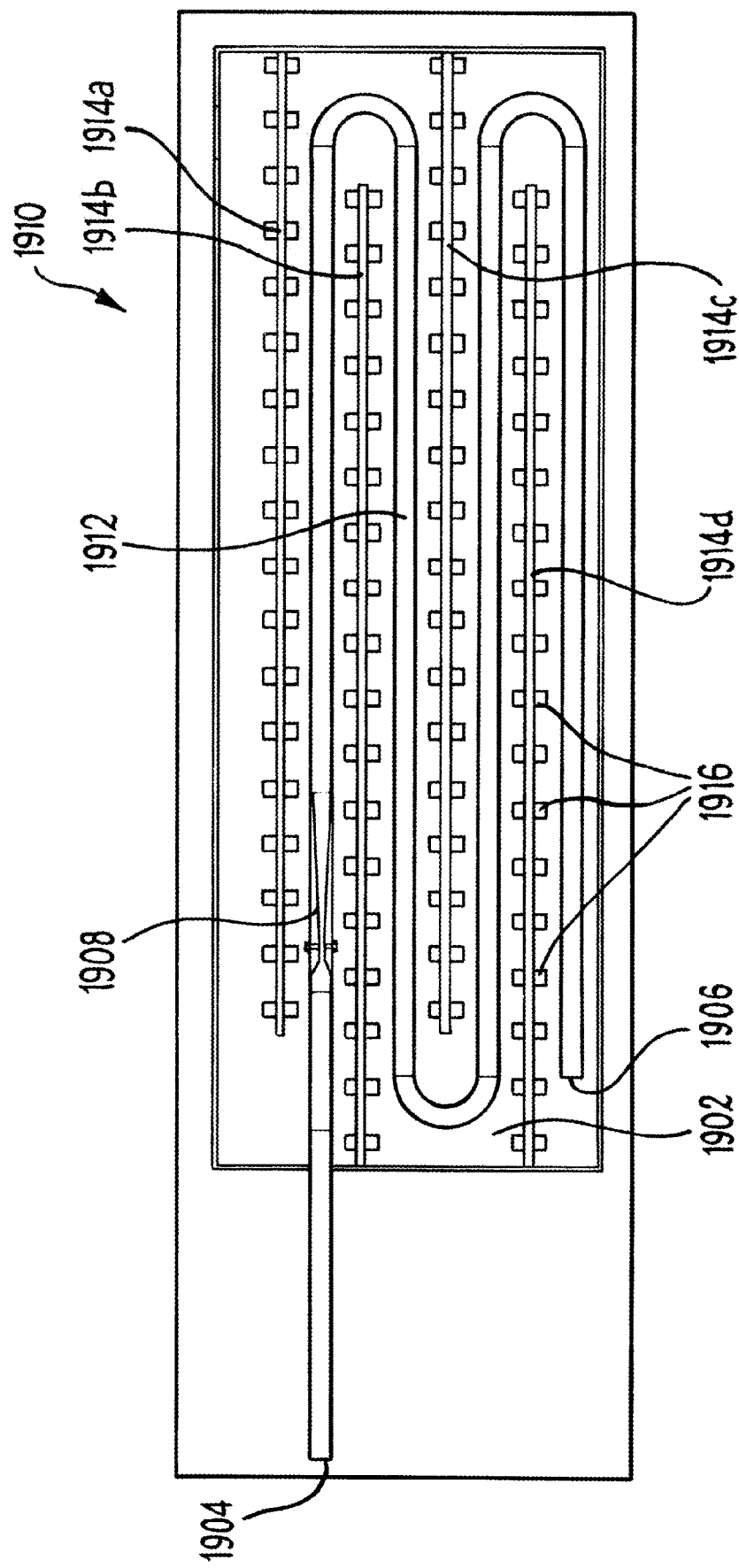
FIG. 19 is a schematic view of a water treatment apparatus in accordance with an alternative embodiment of the invention.
Figure 20A:
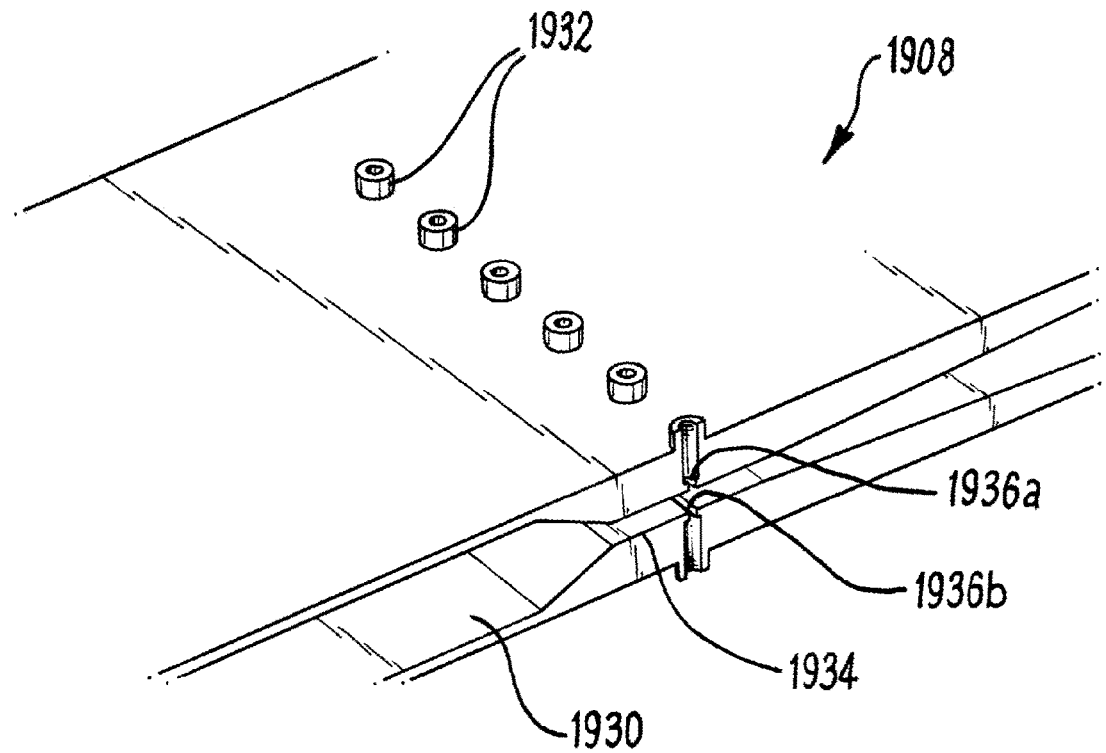
FIG. 20A is a longitudinal section through an injector assembly used in the apparatus of FIG. 19.
Figure 20B:
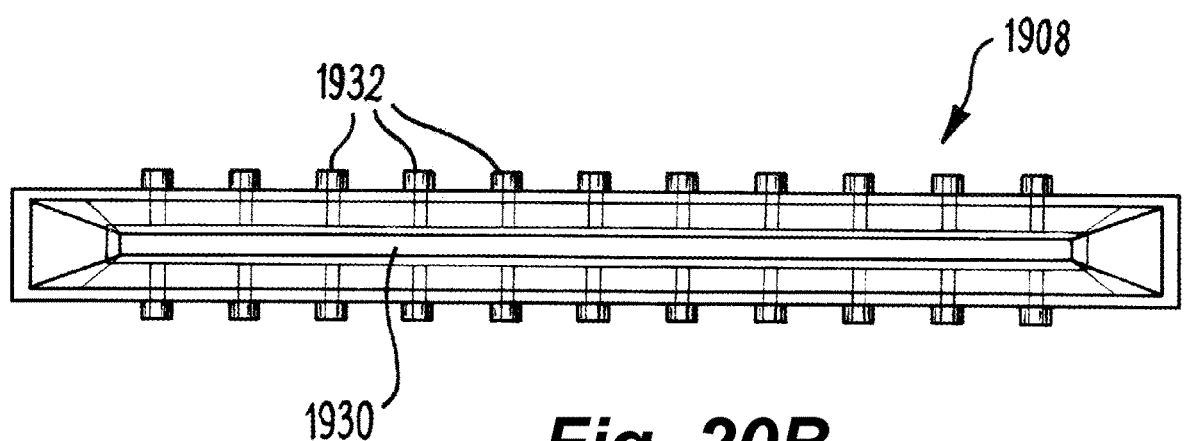
FIG. 20B is a front end view of the injector assembly of FIG. 19.

Referring now to FIG. 19, FIG. 20A and FIG. 20B, there is shown schematically a water treatment apparatus in accordance with an alternative embodiment of the invention. The apparatus, generally depicted at 1910, is also configured for the treatment of contaminated water in an advanced oxidation process which utilises ultraviolet (UV) radiation in combination with an injection of ozone gas to treat the contaminated water, and operates according to similar inventive principles to the apparatus of previous embodiments of the invention.

The apparatus 1910 comprises a main body 1902, a flow inlet 1904, and a flow outlet 1906. Disposed between the inlet and the outlet is an injection assembly 1908 and a liquid treatment volume in the form of a conduit 1912. The conduit 1912 has a substantially rectangular-shaped cross-section and follows a convoluted path through the main body 1902. The main body is formed from a synthetic fused silica (SFS) material, and is transparent to UV radiation. Integrated into the apparatus are UV sources 1914a, 1914b, 1914c and 1914d. Each UV source comprises a substantially planar two-dimensional array of LEDs 1916, which emit UV radiation and comprise upper and lower emission surfaces. Liquid passing through the conduit is therefore exposed to UV radiation via the material of the main body. The conduit 1912 follows a meandering, convoluted path around the planar UV sources 1914.

Located downstream of the inlet 1904 is the injection assembly 1908. The injection assembly 1908 functions to inject a gas such as ozone into a liquid flowing through the apparatus. FIG. 20A is a part sectional isometric view of the injection assembly 1908, and FIG. 20B is a front view of the injection assembly 1930. The injection assembly 1908 defines a flow channel 1930 which is substantially rectangular in cross section, corresponding to the cross-section of the conduit 1912. The injection assembly 1908 is a Venturi injector and comprises a plurality of injection ports 1932 distributed across the flow channel. In this example a linear array of injection ports is provided on each of the upper and lower surfaces of the assembly, although in alternative embodiments, injection ports may be provided on just one of the surfaces. A greater or lesser number of injection ports (i.e. one or more) may be provided in alternative embodiments. A restriction 1934 in the flow channel provides a reduction in liquid pressure which draws a gas such as ozone or oxygen into the flowing liquid. Upper and lower transverse grooves 1936a, 1936b connect the apertures of the injection ports 1932 to effectively distribute the injection gas across the width of the flow channel.

The apparatus 1910 differs from the apparatus 10 in that rather than distributing the flow into a plurality of separate, parallel flow streams, and distributing the liquid around a linear UV source, the flow is distributed across the width of a planar UV source. The cross-sectional shape of the channel provides a thin film, laminar flow path through the apparatus. The flow path is convoluted to increase the distance over which the flowing liquid is exposed to the UV radiation. The increased width and flattened profile of the conduit redistributes the liquid across the planar UV emission surface, reducing the average distance from the liquid and any dissolved or suspended contaminants to the emission surface. In this embodiment, the maximum distance between the liquid flowing conduit and an emission surface, measured in a direction substantially normal to the emission surface, is approximately 10 mm.

Although the embodiment described with reference to FIGS. 19 and 20 includes a convoluted flow path through a series of planar UV sources, it will be appreciated that the principles of this embodiment can be applied to a treatment vessel which makes a single pass of one planar UV source, or a pair of UV sources which sandwich the liquid treatment vessel. In other configurations, the flow may be distributed to a plurality of liquid treatment flow paths arranged in parallel, which then pass one or more planar UV light sources. Although the UV sources described above are formed from an array of UV LEDs, other UV sources may be used to form the planar UV source, for example by the use of light guides or light diffusers with conventional UV sources. In other configurations, the planar UV source (whether formed from an array of LEDs or another source) may be curved or shaped around a third dimension in a variety of shapes to suit the application. For example, a substantially planar surface may be made partially convex or concave to face or surround a liquid treatment flow path.

Figure 21:
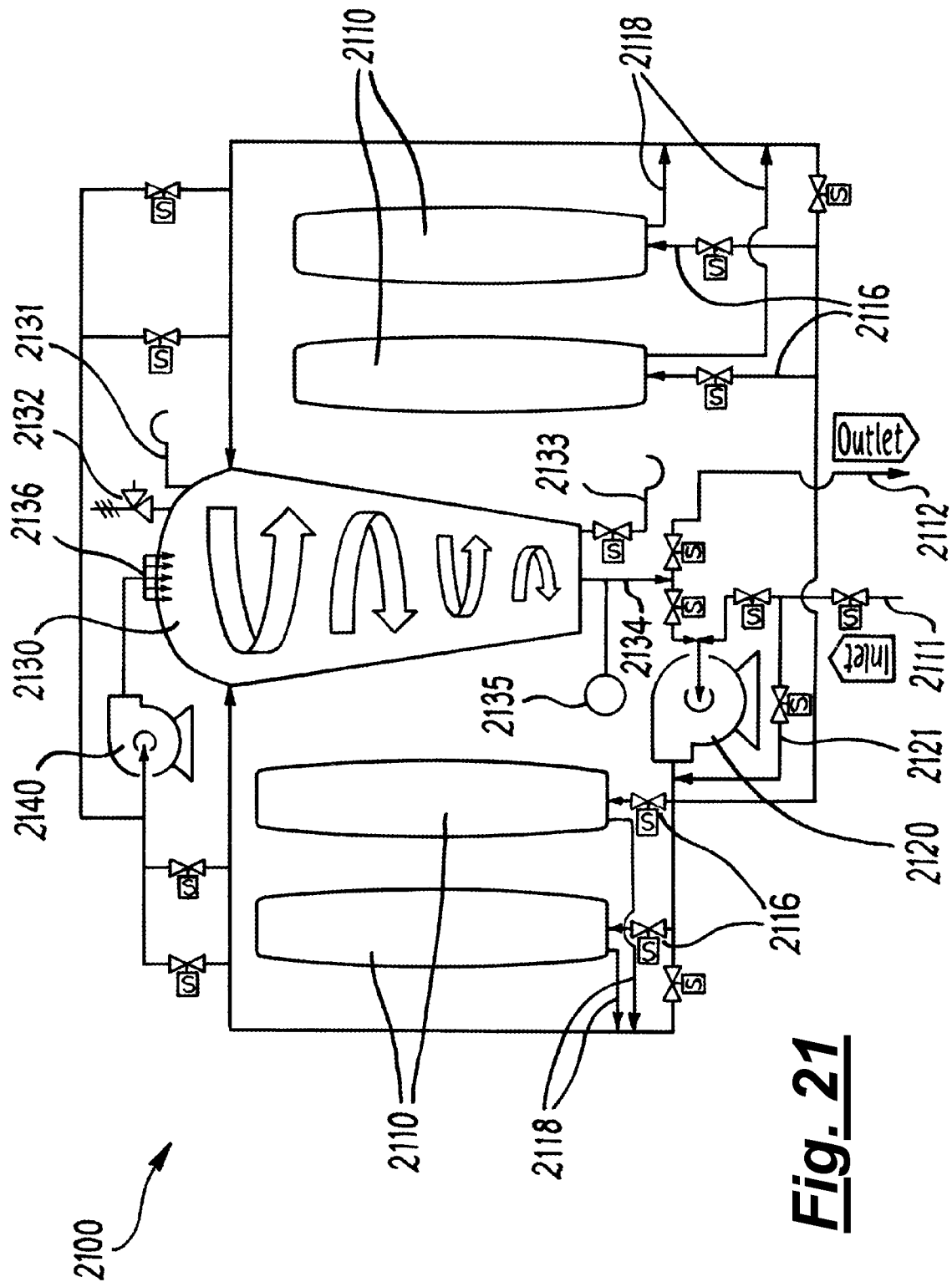
FIG. 21 is a schematic process and instrumentation diagram showing the apparatus of FIG. 1 in a water treatment system in accordance with an embodiment of the invention.

Referring now to FIG. 21, there is shown schematically a process and instrumentation diagram of a water treatment system incorporating the apparatus of FIGS. 1 to 3. The water treatment system comprises four water treatment apparatus 10, arranged in two banks of two. The apparatus 10 are configured for an advanced oxidation process reaction which uses a combination of UV radiation and injection of ozone and optionally a metal oxide photocatalyst to generate hydroxyl radicals. The apparatus 10 are arranged in parallel between a system inlet 2116 and a system outlet 2112.

Inlet pump 2120 pressurises the liquid from the system inlet 2111 to the individual inlets 2116 of the apparatus 10. The inlet pump 2120 is provided with a bypass line 2121. Outlets 2118 from the apparatus 10 are connected into a pair of flow lines which provide inlets to a separation vessel 2130 in this embodiment. The separation vessel 2130 is configured to provide a hydrocyclonic process for separation of liquids, gases and solids from the liquid exiting the apparatus 10. The separation vessel 2130 comprises a gas vent line 2131, a pressure release valve 2132, and a drain line 2133 for removing solids. Liquid outlet 2134 allows selective recirculation of the liquid through the inlet pump 2120, or discharge of liquid through the system outlet 2112. The system is provided with flow valves, which in this case are electronically operated solenoid valves, which are controlled from a control module (not shown). Sensors 2135 disposed in the liquid outlet measure parameters of liquid exiting the separation vessel, and communicate detection signals through a control module (not shown) for control of the inlet recirculation and discharge flow valves.

The separation vessel 2130 is also provided with a misting or spraying inlet 2136 which receives fluid from a secondary pump 2140. The secondary pump 2140 enables liquid exiting the apparatus 2110 to be diverted to the misting inlet of the separation vessel.

Figure 22:
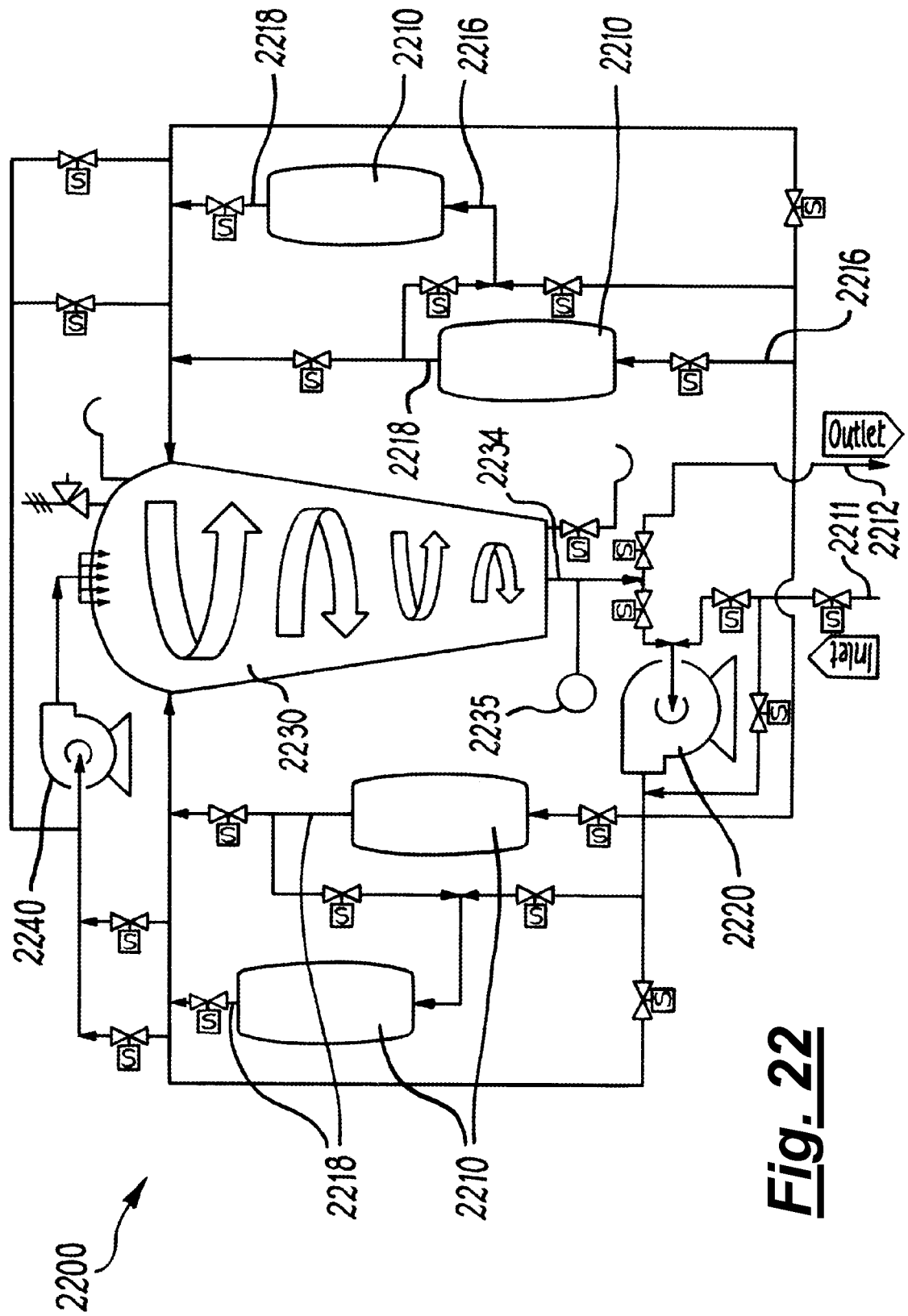
FIG. 22 is a schematic process and instrumentation diagram of a water treatment apparatus in a water treatment system in accordance with an alternative embodiment of the invention.

Referring now to FIG. 22, there is shown schematically a process and instrumentation diagram of a flow system according to an alternative embodiment of the invention. Flow system, generally shown as 2200, is similar to the flow system 2100 of FIG. 21, and will be understood from FIG. 21 and the accompanying description. Like features are indicated with like reference numerals, incremented by 100 from those in FIG. 21. In this embodiment, the system comprises four water treatment apparatus 2210 arranged with flow lines and flow valves in pairs such that they can be operated in parallel or in series, depending on the application requirements. Each pair of apparatus 2210 is provided with an inlet to the separation vessel 2230.

Note that although the outlets 2218 of the apparatus 2210 are shown at the opposing ends of the apparatus 2210 from the respective inlets 2216, this is for ease of illustration. In practice, the outlets 2218 of the apparatus 2210 may be located close to the inlet end of the apparatus, such that a convoluted flow path is provided within the apparatus, as is the case with the apparatus of FIGS. 1 to 3.

The apparatus system comprises one or more sensors disposed in the system inlet flow line, and one or more sensors 2235 disposed in the separation vessel outlet 2234 for measuring parameters of the liquid and transmitting measurement signals to a control module (not shown). The control module operates the electronic solenoid valves to determine whether the pairs of apparatus 2210 should be operated in series or parallel modes, and whether the liquid exiting the separation vessel 2230 is recirculated through one or more apparatus 2210.

Figure 23:
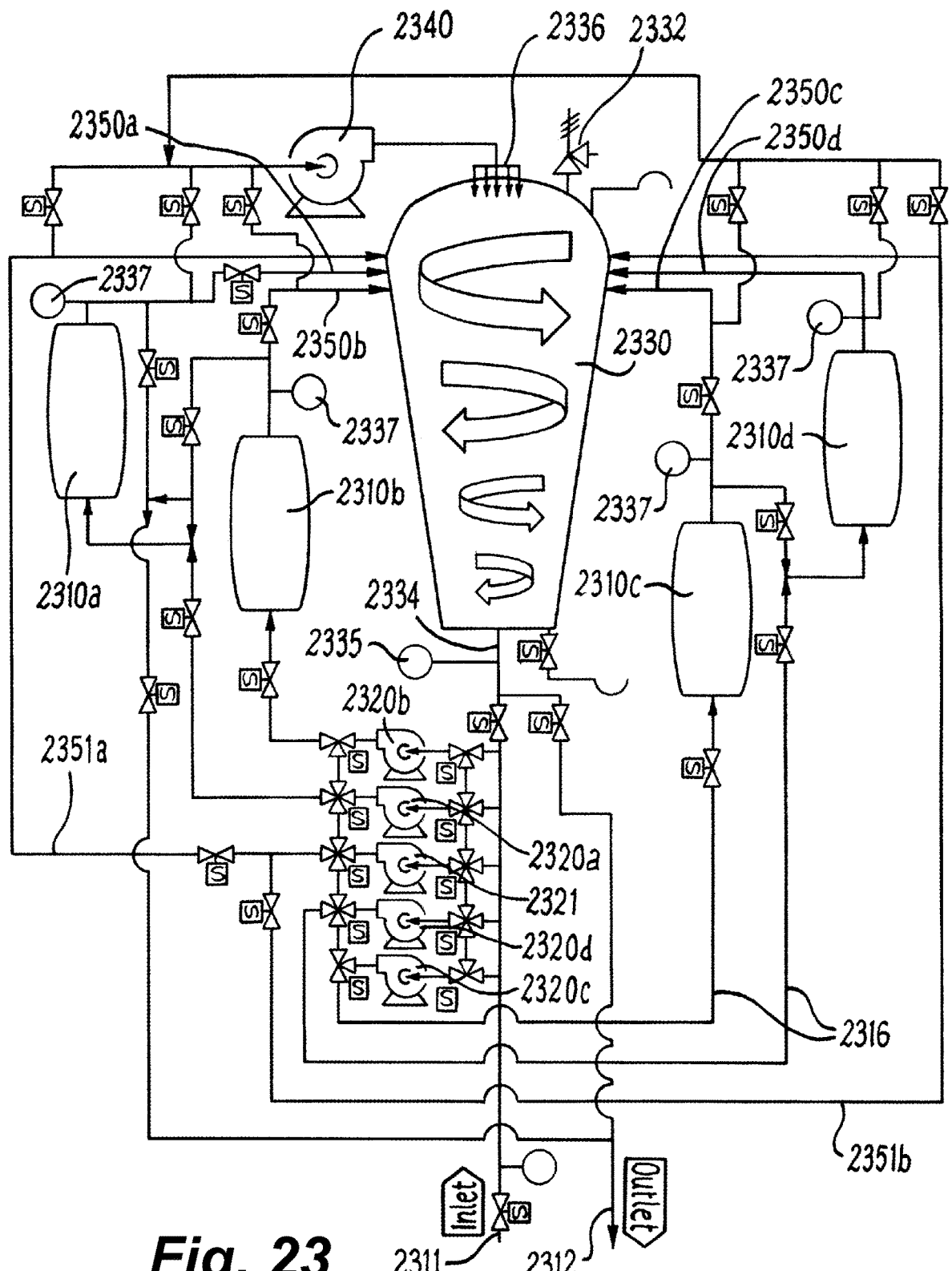
FIG. 23 is a schematic process and instrumentation diagram of a water treatment apparatus in a water treatment system in accordance with an alternative embodiment of the invention.

FIG. 23 is a schematic process and instrumentation diagram for a flow system according to a further alternative embodiment of the invention. The system, generally depicted at 2300, is similar to the system 2200, and will be understood from FIG. 22 and the accompanying description. Like features are indicated with like reference numerals, incremented by 100 from those in FIG. 22. The system 2300 is similar to the system 2200 in that four water treatment apparatus 2310a, 2310b, 2310c, 2310d are provided and are connected with an arrangement of flow lines and controllable flow valves, such that they may be operated in series or in parallel, depending on the treatment requirements. However, the system differs from that of FIG. 22 in that each apparatus 2310 is provided with its own outlet line 2350a, 2350b, 2350c, 2350d which is an independent inlet to the separation vessel 2330. In addition, each apparatus 2310 is provided with its own pump 2320a, 2320b, 2320b, 2320d. Bypass lines 2351a, 2351b are provided with their own bypass pump 2321. The outputs of each water treatment apparatus 2310 are also provided with sensor modules 2337 which are capable of measuring one or more parameters of the liquid exiting the apparatus.

The system inlet 2311 is connected to the arrangement of inlet pumps 2320 via a system manifold and an arrangement of electronically operable valves. Similarly, the outlet sides of the pumps 2320 are independently and selectively manifolded together.

The flow system shown in FIG. 23 is highly flexible and adaptable depending on the system requirements. The arrangement may be operated in series, parallel, bypass and/or recirculation modes independent of liquid parameters measured at sensor modules 2337 or 2335. Each apparatus 2310 can be treated as a standalone treatment apparatus, discharging into a common separator unit 2330. Each line 2350 has its own sensor, and therefore the system may discharge treated fluid out of the system outlet 2312 or go back to a 2320 pump for recirculation. The presence of a bank of pumps facilitates operation of the apparatus 2310 separately or in unison for recirculation of fluid of one, several or all apparatus simultaneously.

The benefits of such a system include redundancy and flexibility. It is feasible change out a pump and/or an apparatus 2310 whilst still having all other flow components in full operation. There is also an advantage in being able to regulate the treatment cycle of each apparatus independent to the others in operation. This could be advantageous for applications in which it is desirable to keep raw (non circulated) fluid coming into the system to be dealt with by a certain set of apparatus 2310, while the others deal with a re-circulated fluid. Different apparatus 2310 could be set at different fluid flow rates (both treatment fluid and injection gas).

In one typical mode of operation, the water treatment apparatus 2310 are used in groups and the inlet liquid flow may be treated through the first pair of water treatment apparatus in an outlet to the separation vessel 2330. The outlet of the separation vessel feeds the second pair of water treatment apparatus, which would pass the treated liquid back into the separation unit. If the sensor module 2335 determines that the liquid is sufficiently well treated, the water can be discharged to the system outlet. If it is not, the system inlet is closed, and the liquid is recirculated through one or more of the water treatment apparatus via the inlet pump system.

In a variation to the flow system 2300 (which is not illustrated), the array of inlet pumps 2320 may be replaced with a single inlet pump which is provided with a bypass. This offers much of the same functionality as the flow system 2300, with reduced capital cost.

It will be appreciated that the configuration 2300 of FIG. 23 may also be used to selectively control the passage of liquid through an individual apparatus. For example, flow through a particular water treatment apparatus can be interrupted in order to render the liquid static in the apparatus for period of time. Flow can be recommenced when the liquid to be treated has had sufficient exposure to UV radiation.

Figure 24:
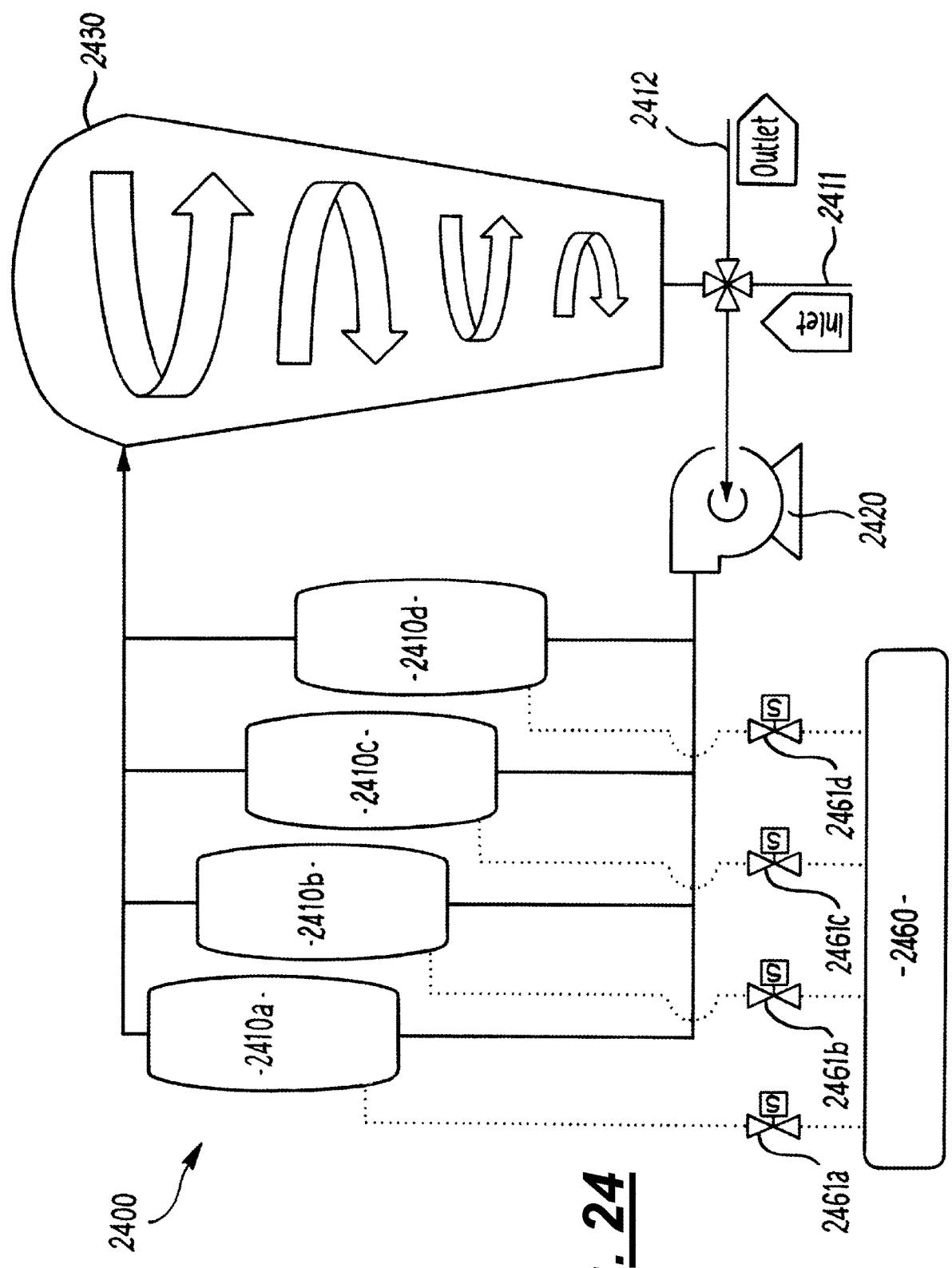
FIG. 24 is a schematic process and instrumentation diagram of a water treatment apparatus in a water treatment system in accordance with an alternative embodiment of the invention.

There will now be described, with reference to FIG. 24, an alternative flow configuration in which multiple water treatment apparatus are used in conjunction with a single ozone generator in a pulsed mode. The system, shown schematically at 2400, comprises a bank of four water treatment apparatus 2410a-d, arranged in parallel between an inlet pump 2420, and a separation unit 2430. Each of the apparatus 2410 is configured for an advanced oxidation process reaction, which uses a combination of UV radiation and injection of ozone to generate hydroxide radicals. The system comprises a single ozone generator unit 2460, which is connected to the injectors of the apparatus 2410 via respective injection lines. Each injection line is provided with an electronically controllable solenoid valve 2461a-d.

In this embodiment, the ozone generator 2460 has an output capacity which is not sufficient to supply ozone at the maximum rate demanded by all four water treatment apparatus 2410. Instead, the system is operated in a pulsed mode in which ozone is supplied to a subset of the water treatment apparatus 2410 at any one time. In one example mode of operation, the ozone generator has a sufficient outlet capacity to supply ozone to the injectors to two of the four water treatment apparatus. During an initial treatment phase, ozone is supplied to apparatus 2410a and 2410b by opening the solenoid valve 2461a and 2461b, while the solenoid valves 2461c and 2461d are closed. Liquid is pumped through the full water treatment apparatus 2410 in parallel.

During this phase of operation, apparatus 2410a and 2410b operate as normal. However, in the absence of a supply of ozone to the injectors of the apparatus 2410c and 2410d, the Venturi injectors of the apparatus begin to function as cavitating Venturi devices. This induces cavitation effects in the apparatus 2410c and 2410d which are beneficial to the liquid treatment, even in the absence of ozone injections. After a pre-determined time, the supply of ozone in the generator 2460 is switched by closing valves 2461a and 2461b, while simultaneously opening valves 2461c and 2461d. In this second phase of operation, ozone is supplied to the apparatus 2410c and 2410d, while apparatus 2410a and 2410b are starved of ozone. Apparatus 2410a and 2410b therefore operate in a Venturi cavitation mode, while apparatus 2410c and 2410d operate in accordance with the principles of previous embodiments. The flow from the ozone generator can be alternated at a frequency controlled depending on operational requirements, such that the supply of ozone is switched or pulsed between groups of water treatment apparatus.

The system 2400 and the method described above provide the benefits of the multiple treatment apparatus used in flexible configurations, without necessitating the use of the ozone generator capable of supplying all of the apparatus simultaneously. Furthermore, by starving the apparatus of an injector of ozone, cavitation effects may be used in the water treatment process, which are beneficial to the treatment of contaminants, even in the absence of ozone injection.

It will be appreciated that pulsed configurations such as those described above can be used with different numbers of water treatment apparatus, which can be provided with ozone individually or in different groups depending on the output capacity of the ozone generator and the system requirements.

The pulsed modes described above may provide additional advantages. For example, undissolved gas in the system may accumulate in particular parts of the system when the flow is interrupted, and recommencing the flow may push large plugs of gas through the system. The pulse flow regimes may also assist with dislodging materials which may accumulate on the wet surfaces of the flow conduits and/or the UV sources.

In variations to the system 2400, the valves 2461 are fully electronically controllable flow control valves, which are adjustable from a fully open position to a closed position and a range of intermediate flow positions. The valves may therefore enable flow regulation (including choking) and selective shut-off from the ozone generator to each individual apparatus 2410.

Figure 25:
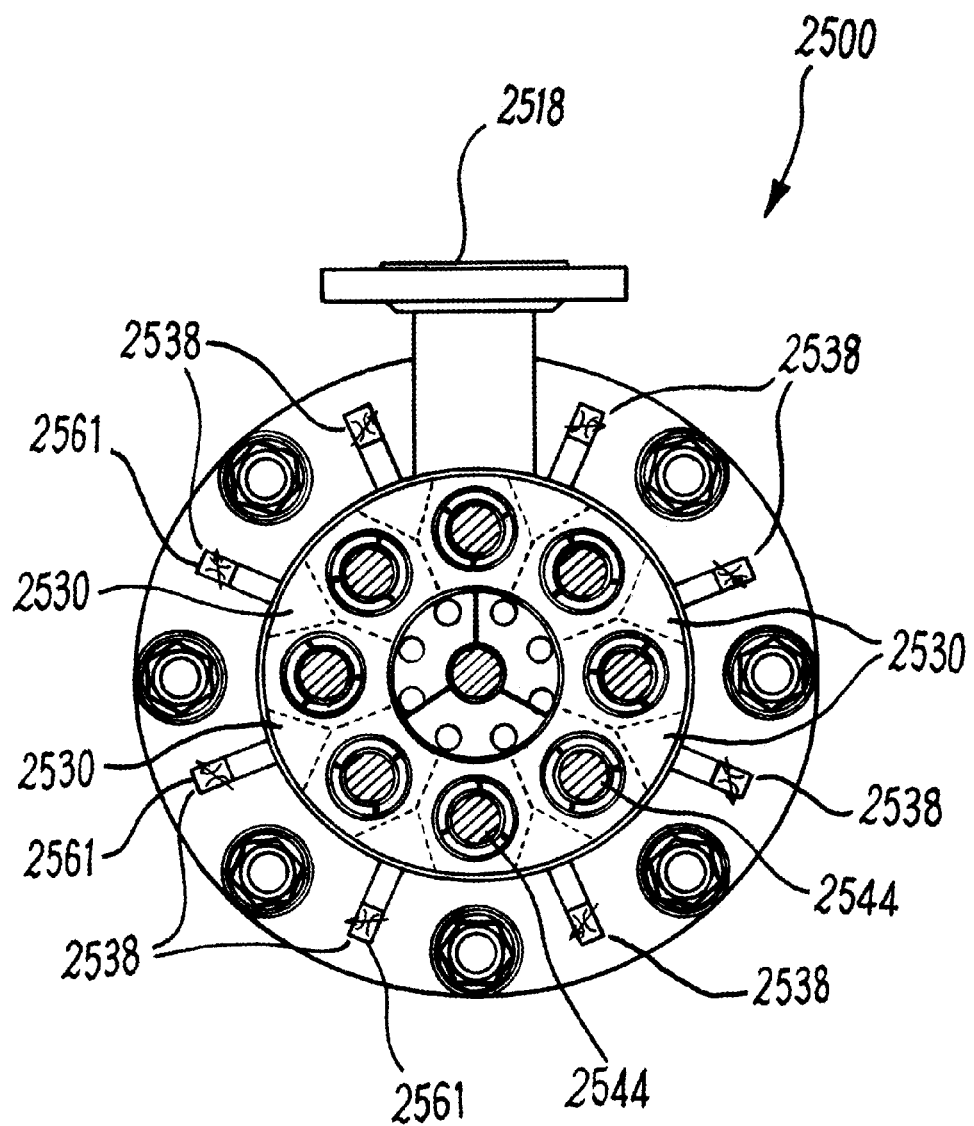
FIG. 25 is a sectional view through an apparatus according to an alternative embodiment of the invention.

A further variation is illustrated in FIG. 25, which is a sectional view through a water treatment apparatus according to an alternative embodiment of the invention. The apparatus, generally shown at 2500, is similar to the apparatus 10, and will be understood from FIGS. 1A and 1B and the accompanying description. However, there apparatus 2500 differs in the arrangement of gas injection supply lines 2538 for the injection assembly, and the internal configuration of gas chambers 2530. In the apparatus 2500, the gas chambers which receive gas from a gas source are discrete volumes, each isolated from one another and connected to an injection path leading to an injection port. In addition, the injection ports are isolated from one another (as opposed to being connected by an annular recess).

Each chamber, and therefore each injection path, has its own dedicated gas supply line 2538, which is connected to the ozone generation unit. Each gas supply line is provided with a fully electronically controllable flow control valve 2561, which is adjustable from a fully open position to a closed position and a range of intermediate flow positions. The valves 2561 may therefore enable flow regulation (including choking) and selective shut-off from the ozone generator to each individual injection port in the apparatus 2500.

Figure 26:
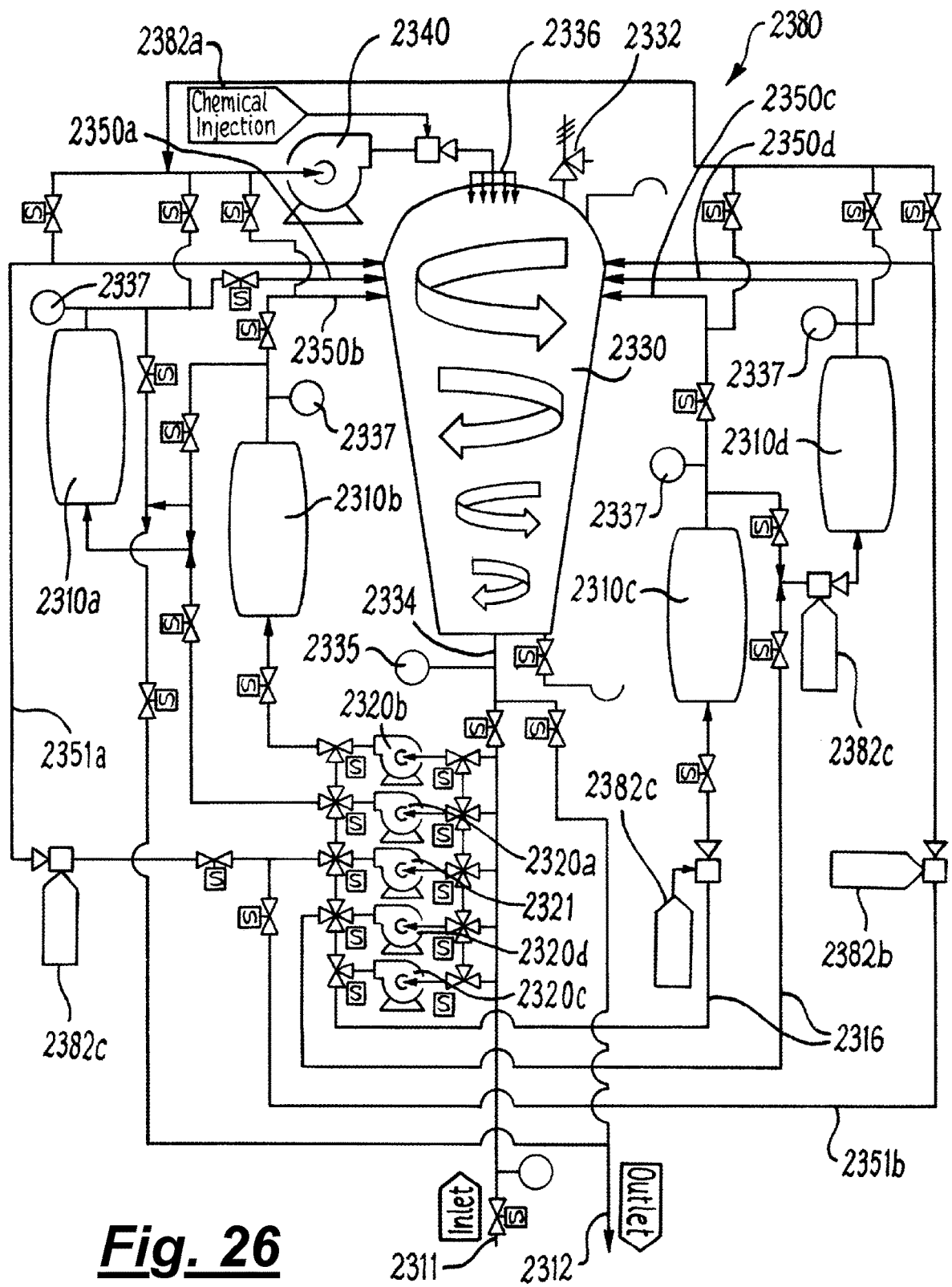
FIG. 26 is a schematic process and instrumentation diagram of a water treatment apparatus in a water treatment system in accordance with an alternative embodiment of the invention.

A variation to the configuration of FIG. 2300 is shown in FIG. 26, which is a schematic process and instrumentation diagram for a flow system according to a further alternative embodiment of the invention. The system, generally depicted at 2380, is similar to the system 2300, and will be understood from FIG. 23 and the accompanying description. Like features are indicated with like reference numerals. The system 2380 is provided with a number of injectors 2382 at various locations in the system. The injectors 2382 enable chemicals to be selectively injected into the fluid at a range of fluid locations. Injector 2382a is located upstream of the separator vessel 2330, disposed in the flow line between the pump 2340 and the spray inlet 2336. Injectors 2382b are located in the bypass flow lines 2351a, 2351b between the pump 2321 and the separator vessel 2330. Injectors 2382c are located upstream of the water treatment apparatus 2310c and 2310d. The injectors may be disposed in other locations in alternative embodiments of the invention.

Where an injector is placed upstream of a water treatment apparatus (e.g. injector 2382c and apparatus 2310c), there may be a reduction to the suction applied to an injection gas being introduced via the injector of the apparatus 2310c. In some embodiments of the invention, it may be desirable to inject a chemical through the injector during a treatment period in which gas (e.g. ozone) is not being injected, so that the normal injection parameters for the gas are not affected. Thus the chemical injectors may be used in conjunction with the pulsing modes described above with respect to FIG. 24. For example, the system may be used in a sequence of treatment modes, such as: Model, in which ozone is injected and the fluid is exposed to UV radiation in an advanced oxidation process reaction; Mode 2, in which the injector of the treatment apparatus operates in a Venturi cavitation mode as described above; and Mode 3, in which the a chemical is injected into the flow. This sequences or similar sequences may be repeated or varied as required.

One or more of the injectors 2382 may be used to introduce chemical treatments, such as peroxides (including hydrogen peroxide) which may enhance an advanced oxidation treatment process reaction. Other chemicals may be introduced into the flow system, including but not limited to chemicals or compounds for treating the flow system itself. Examples of such chemicals include oleophobic and/or hydrophobic chemicals which may coat the interior surfaces of the flow system to prevent adherence or other accumulation of oil- and/or water-based materials to the flow surfaces respectively. This may assist with keeping the flow surfaces clean and clear of materials which may impede operation or may adversely affect the reaction. The use of such materials may also have the benefit of reducing maintenance costs and/or increasing average maintenance intervals. Examples of such materials include the photocatalytic primer marketed by ECI Products Limited under the OXISHIELD brand and the photocatalytic coating marketed by ECI Products Limited under the OXIGUARD brand.

It will be appreciated that although oleophobic and/or hydrophobic chemicals may be introduced to the system via chemical injectors as described above, they may alternatively be introduced upstream of the treatment system. Alternatively, or in addition, the system or components of the system may be treated with oleophobic and/or hydrophobic materials prior to operation of the system and/or prior to manufacture. For example, internal components may be painted, sprayed, brushed, dipped or otherwise applied to flow surfaces of the system or a water treatment apparatus. In preferred embodiments, the oleophobic and/or hydrophobic materials are selected and/or applied in a way that enables transmission of UV radiation, including radiation at wavelengths of 185 nm and 253.7 (or 254) nm. The oleophobic and/or hydrophobic materials may therefore be applied to glass and/or other transparent surfaces of the equipment to prevent fouling.

The embodiment of FIGS. 1A, 1B and 3 (as particularly described with reference to FIGS. 10A to 10D) incorporate a cleaning system which is operative to rotate the UV emission surfaces of the thimbles with respect to wiper elements. Such configurations offer certain advantages with respect to simplicity of the drive mechanism, but require a relatively high number of dynamic seals between the rotating thimbles and the static components. In some embodiments of the invention, active rotary seals such as those which comprise combinations of energizing elements and contact elements may be used. For example, active rotary seals which comprise an o-ring energizing element and a rotary ring, such as the seal configurations marketed by PolyMod® Technologies Inc. under the RotoGlide and FluorFlex brands may be used.

Figure 27:
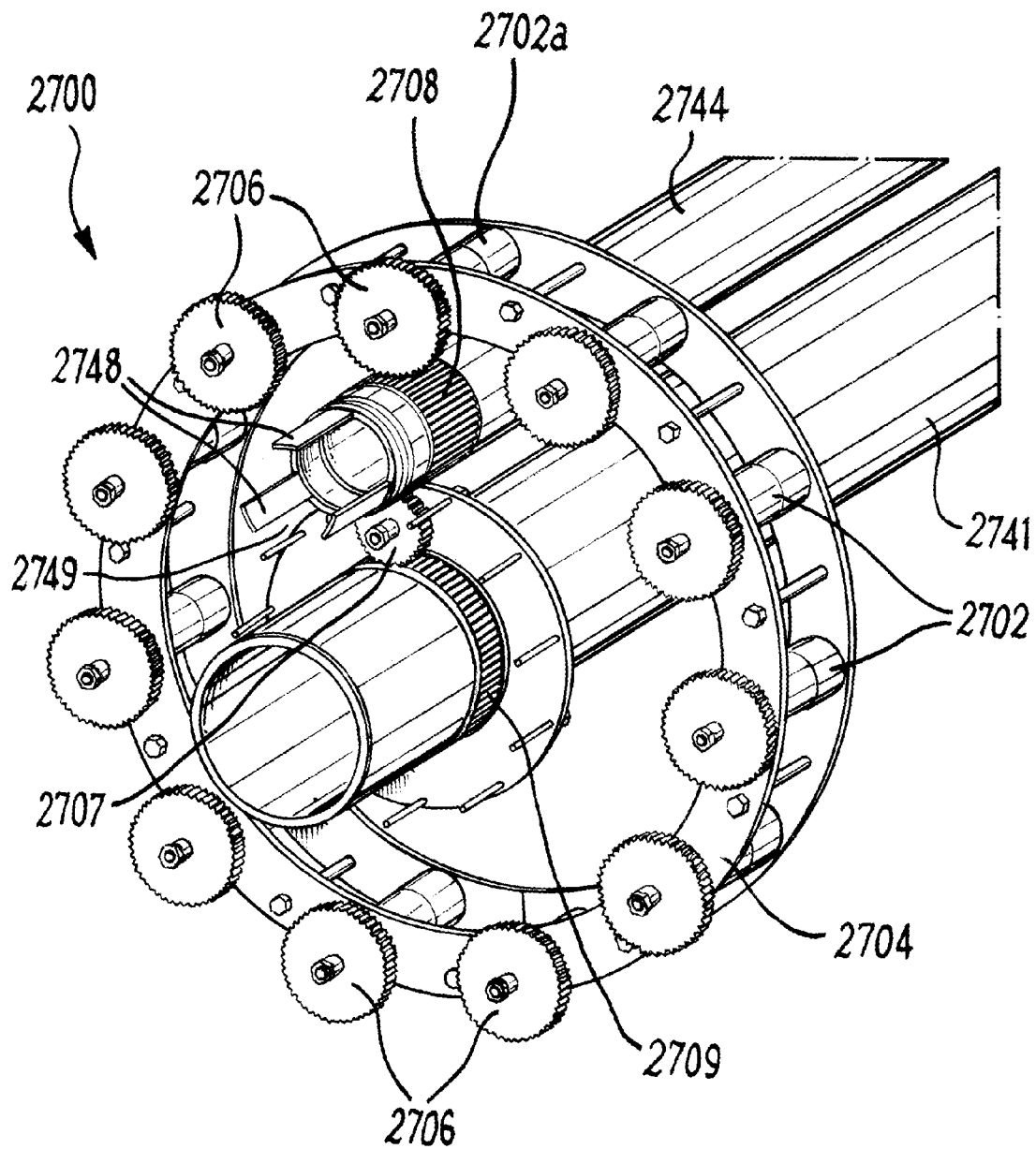
FIG. 27 is a schematic view of a drive mechanism according to an embodiment of the invention.
Figure 28:
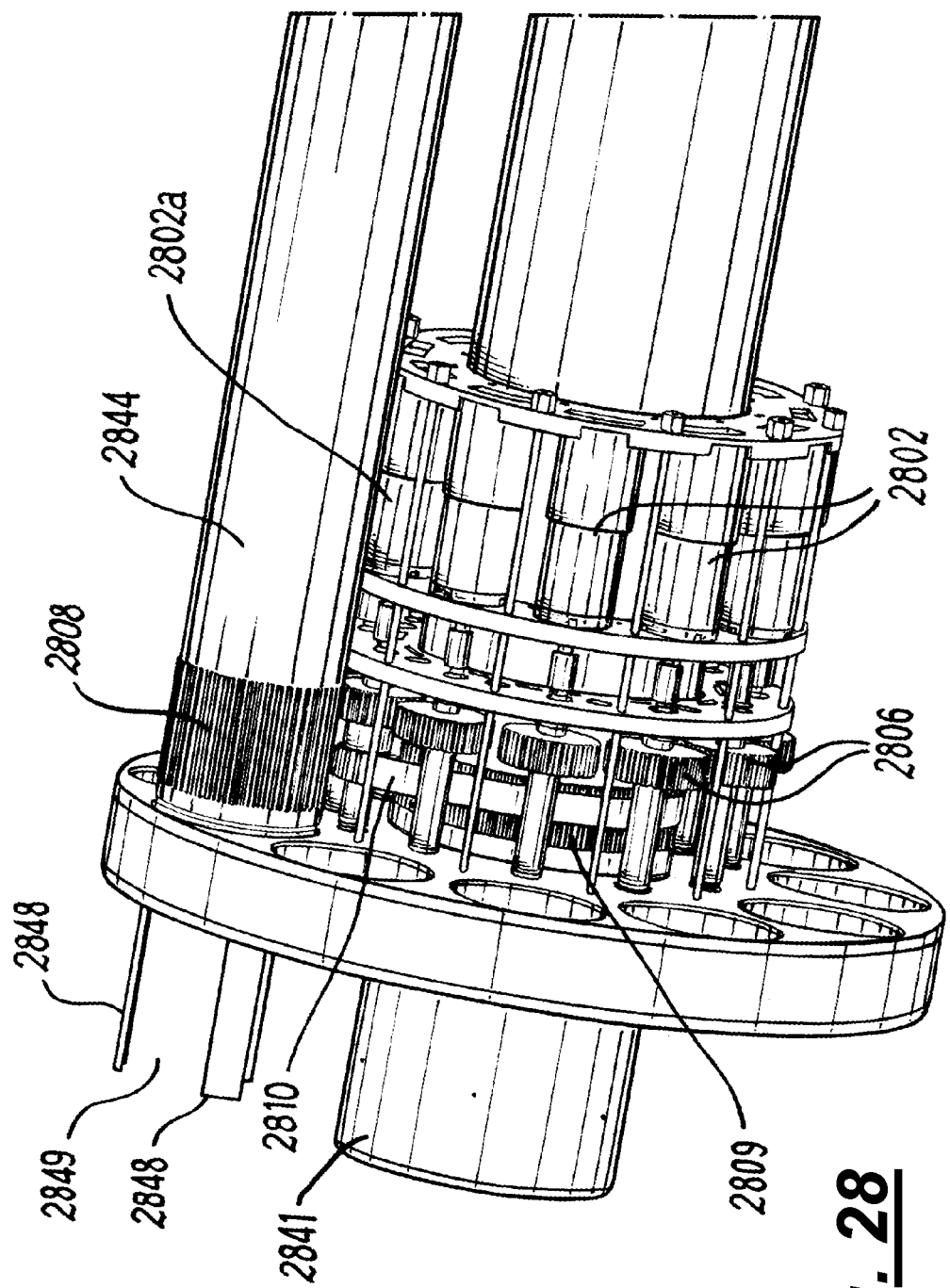
FIG. 28 is a schematic view of a drive mechanism according to an alternative embodiment of the invention.

FIGS. 27 and 28 illustrate further alternative embodiments of the invention in which a cleaning system is operated to rotate wiper elements with respect to static UV emission surfaces. FIG. 27 is a schematic view of a drive mechanism, generally shown at 2700, according to an embodiment of the invention. The drawing omits several parts of the apparatus so that the features of the drive mechanism can be clearly seen. In particular, the housing 12, the flange assemblies 22a, 22b, and the first and second shroud ends 42a, 42b are not shown. The UV lamps are omitted and the drawing shows only a single inner barrel 2744 with the inner mandrel 2741. However, in the assembled apparatus, eleven barrels 2744 would be provided for the return thin film flow.

The drive mechanism of this embodiment comprises a number of electric motors 2702 mounted around an exterior of the apparatus on a support frame 2704. The motors are circumferentially disposed around the apparatus, and one motor is provided for each of the inner barrels. Each motor comprises a drive gear 2706 which is configured to extend through a slot in the main housing of the apparatus. Each barrel 2741 is provided with an arrangement of teeth 2708 on its outer surface which engage with the drive gear 2706 of the respective motor, such that the barrel is driven to rotate by operation of the motor.

The interior of the barrel 2741 is provided with integral or unitary formed elongated wiper elements of the type shown in FIGS. 15 to 17. The wiper elements extend along the length of the apparatus in the conduit defined by the inner mandrel 2741 and the annular spaces defined by the inner barrels, oriented parallel to the longitudinal axes of the UV sources 50, 54, and contact the emission surfaces of the thimbles. In this embodiment, three wiper elements are provided for each thimble, and are arranged circumferentially around the surface at 120 degree spacing. The wiper elements therefore provide a linear contact point along the UV emission surfaces.

The ends of the barrels 2744 open into the flow collection manifold 70, between the shroud end 42a and the injector assembly 30. To facilitate cleaning of the thimbles of the UV sources in the collection manifold 70, the barrels are provided with lugs 2748 which are arranged at 120 degree spacings and extend into the collection manifold to the injector plate 502. Spaces 2749 between the lugs enable fluid to flow into the manifold 70. The lugs 2748 are part-cylindrical and support the integral or unitary wiper, enabling cleaning of the thimble in the manifold region.

A secondary drive gear 2707 is arranged between the arrangement of teeth 2708 on one of the barrels 2744 and an arrangement of teeth 2709 on the inner mandrel, and causes the inner mandrel to be driven to rotate on operation of the motor 2702a. Motor 2702a is preferably capable of generating a higher torque than the other motors 2702 to enable it to drive this additional load.

An alternative configuration of drive mechanism is illustrated in FIG. 28. The drive mechanism, generally depicted at 2800, is similar to the mechanism 2700, and will be understood from FIG. 27 and the accompanying description. However, in this embodiment, the drive mechanism 2800 comprises a number of electric motors 2802 mounted on a support frame 2804 around an exterior of the inner mandrel 2841, but within the main housing of the apparatus. As before, the motors are circumferentially disposed around the apparatus, and one motor is provided for each of the inner barrels. Each motor comprises a drive gear 2806 which is configured to extend through a slot in the main housing of the apparatus. Each barrel 2841 is provided with an arrangement of teeth 2808 on its outer surface which engage with the drive gear 2806 of the respective motor, such that the barrel is driven to rotate by operation of the motor.

In this embodiment, the drive shaft of the motor 2804a is coupled to a belt 2810, which passes around and engages an arrangement of teeth 2809 on the inner mandrel, and causes the inner mandrel to be driven to rotate on operation of the motor 2802a. Motor 2802a is preferably capable of generating a higher torque than the other motors 2802 to enable it to drive the additional load.

In both of the arrangements 2700 and 2800, the thimbles of the UV sources are held static and the surrounding conduits (barrels or mandrel) are driven to rotate and move integrated or unitary wiper assemblies around the surfaces of the thimbles. These configurations have the advantage that fewer seals are necessary in the overall assembly of the apparatus. In addition, the manufacturing tolerances of the barrels and the mandrel are more easily controlled than those for the glass thimbles. This means that are wider range of dynamic o-ring seals (including less-sophisticated seals) may be used to seal the ends of the conduits with respect to static components of the assembly. In particular, the active rotary seals referred to above may not be necessary.

Preferred embodiments of the invention use conduits (including barrels and mandrels) formed from a non-stick material such as PTFE, and some embodiments include extruded materials for forming barrels, mandrels, and/or integrated wiper elements. Where the teeth arrangements of the barrels and/or mandrel are formed from an extrudable material or plastic (including extrudable thermoplastics such as PTFE or PVDF), drive gears and secondary gears may also be formed from a material with similar mechanical properties (such as hardness and resilience) to mitigate wear on the teeth arrangements. For example, the drive gears and/or secondary gears may be formed from a thermoplastic material, or may comprise teeth or tips of thermoplastic.

Further variations or modifications to the cleaning mechanisms of embodiments of the invention include the use of stranded or filamented elements such as brushes or filamented wipers. Examples include spiral wound or strip brushes which extend along an elongate axis and are mounted in the annular space defined between a UV emission surface and a conduit. Rotation of the brush around the UV emission surface, or rotation of the UV emission surface with respect to the brush, effects cleaning of the emission surface. In the case of a strip brush, the bristles or filaments may be mounted in a channel, which is received in a groove or recess formed (for example by extrusion) into the inner surface of the conduit. In the case of a spiral wound brush, the brush core may be mounted on axially separated support elements.

The bristles or filaments of the brush may be formed from a plastic, composite, or metal material, for example stainless steel. An advantage of using brush elements is that the bristles or filaments have high surface area, and may be coated with a photocatalyst material such as a metal oxide (e.g. titanium dioxide). As the liquid to be treated passes through the conduit it will flow through and around the brush elements, and the mass transfer with the photocatalyst will enhance the advanced oxidation process reaction. In addition, movement of the liquid through the brush element will cause the liquid to be disrupted, and the brush therefore acts as a diffuser which promotes the shearing, mixing and dissolution of injected gas.

Alternatively, the bristles or filaments themselves may be partially or fully constructed from a photocatalytic material (rather than being formed from a non-catalytic material which is subsequently coated). The material may, for example, be a composite of a polymeric material and a photocatalytic metal oxide.

Figure 36:
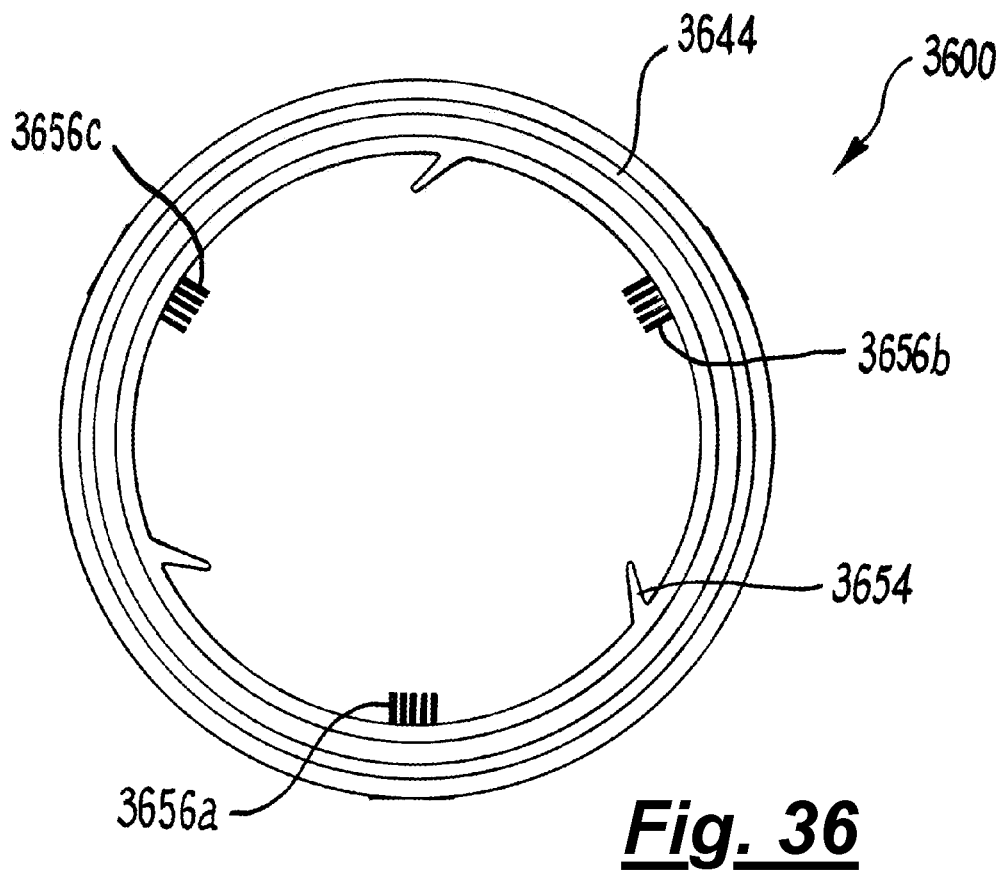
FIG. 36 is a cross-sectional views of a barrel that may be used in an alternative embodiment of the invention.

Further alternative embodiments of the cleaning mechanisms which may be used in embodiments of the invention are described with reference to FIGS. 36 to 38. FIG. 36 is a cross section through a barrel 3644 as may be used in an alternative embodiment of the invention, generally shown at 3600. The barrel 3644 is similar to the barrel 1744, and will be understood from FIG. 17 and the accompanying description. In this embodiment, the barrel 3644 differs in that in addition to the wiper blade elements 3654 being unitarily formed with the barrel, the barrel comprises a number of longitudinally extending brush elements 3656 which form additional cleaning elements which contact a radiation emitting surface of the UV source that extends through the source in the assembled water treatment apparatus.

Figure 37:
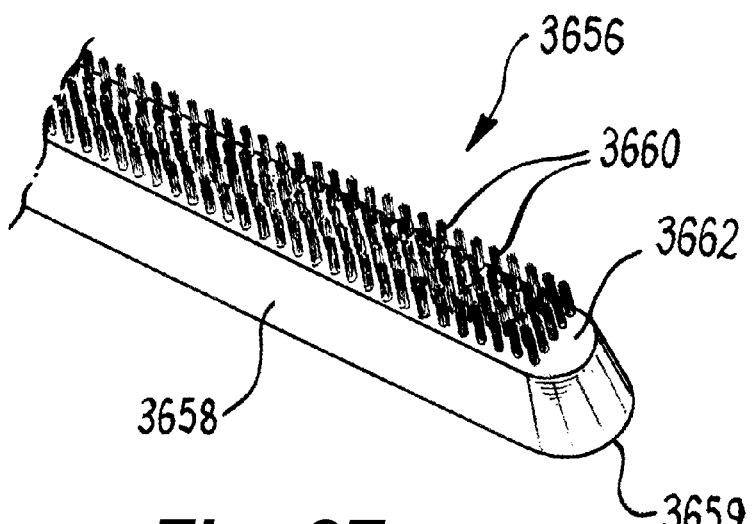
FIG. 37 is an isometric view of a brush element of the embodiment of FIG. 36.

A part of a brush element 3654 of this embodiment is shown more clearly in FIG. 37. The brush element comprises a body with a tapered side wall that decreases in width from its base to an upper face. Bristles extend from the upper face of the body, and are arranged in a regular array across the upper face. In this case the bristles are unitarily moulded with the base from a polymer combined with a photocatalytic metal oxide. The brush elements are assembled with the barrel from the outside of the barrel, by insertion of the elements through a corresponding aperture, such that the bristles extend into the inner volume of the barrel sufficiently far to contact the thimble of the UV source in the barrel. In this case, multiple brush elements are provided in the assembly, and are arranged at 120 degree rotational separation. In this embodiment, the brush elements 3656 do not extend along the entirety of the length of the barrel, and do not axially overlap with one another. Instead, the first brush element 3656a extends over a first axial region of the barrel, and the second brush element 3656b extends over a second axial region of the barrel, adjacent the first axial region. The third brush element 3656c extends over a third axial region of the barrel, adjacent the second axial region. The pattern is repeated over additional axial regions, so that the entirety of the length of a UV source is covered by the set of brush elements. It will be appreciated that alternative configurations of brush elements are within the scope of the invention, including fewer or more brush elements, with different rotational spacing and/or different degrees of axial overlap.

In use, relative rotation of the barrel and the thimbles of the UV sources moves the wiper blade elements 3554 and the brush elements 3556 across the surface of the thimble. In addition, as the liquid to be treated passes through the barrel it will flow through and around the brush elements, and the mass transfer with the photocatalyst will enhance the advanced oxidation process reaction. In addition, movement of the liquid through the brush elements will cause the liquid to be disrupted, and the brush therefore acts as a diffuser which promotes the shearing, mixing and dissolution of injected gas.

Figure 38:
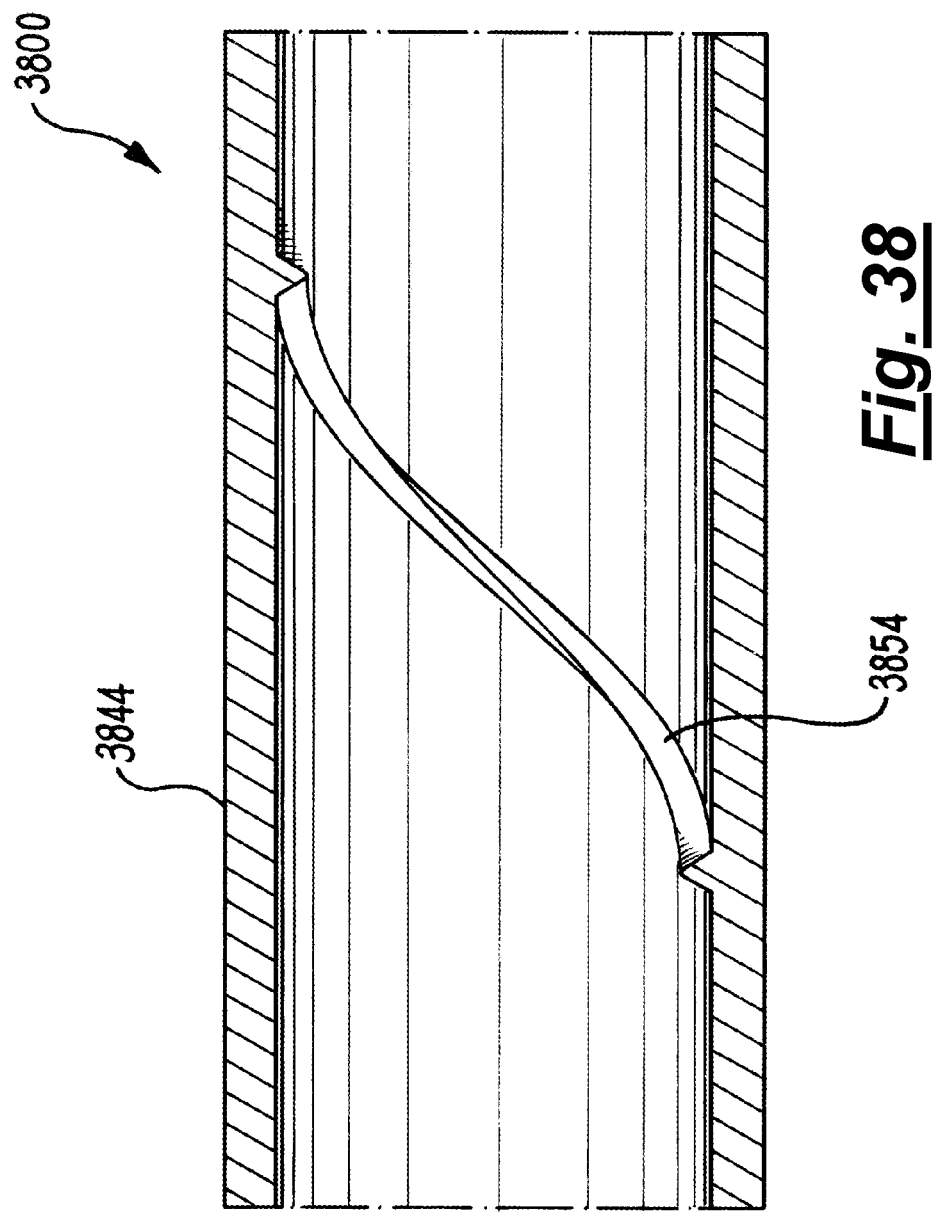
FIG. 38 is a part-sectional view of a barrel that may be used in an alternative embodiment of the invention.

A further alternative embodiment of a cleaning system is shown in FIG. 38, which is a part-sectional view through a barrel 3800. Like the barrels 1544, 1644, 1744, and 3544, the barrel 3800 comprises a wiper elements in the form of a blade 3854 which extends longitudinally in the barrel. In this case, the wiper blade 3854 is unitarily formed with the barrel, similarly to the barrel 1744. However, in this embodiment, the wiper blade is not oriented parallel to the main axis of the barrel 3800 in the same circumferential position. Instead, the wiper blade is helically oriented in the barrel around the central axis of the barrel. In this embodiment, a single wiper blade extends along the length of the barrel to clean the entire length of the thimble, and the pitch of the helix and the rotational speed are selected according to the desired frequency of cleaning. In alternative embodiments, multiple blades (helical or straight) may be provided which extend partially along the length of the barrel, and may be positioned at rotationally offset positions. Double or multiple helical blades may be provided, and/or the pitch may vary along the length of the barrel.

Certain UV lamps are sensitive to operating temperature, particularly in the region of the electrical contacts with the bulb. In order to facilitate effective operation of the UV sources for prolonged periods, it is desirable to provide assemblies which provide for the cooling of the UV sources or related components of the apparatus.

Figure 29:
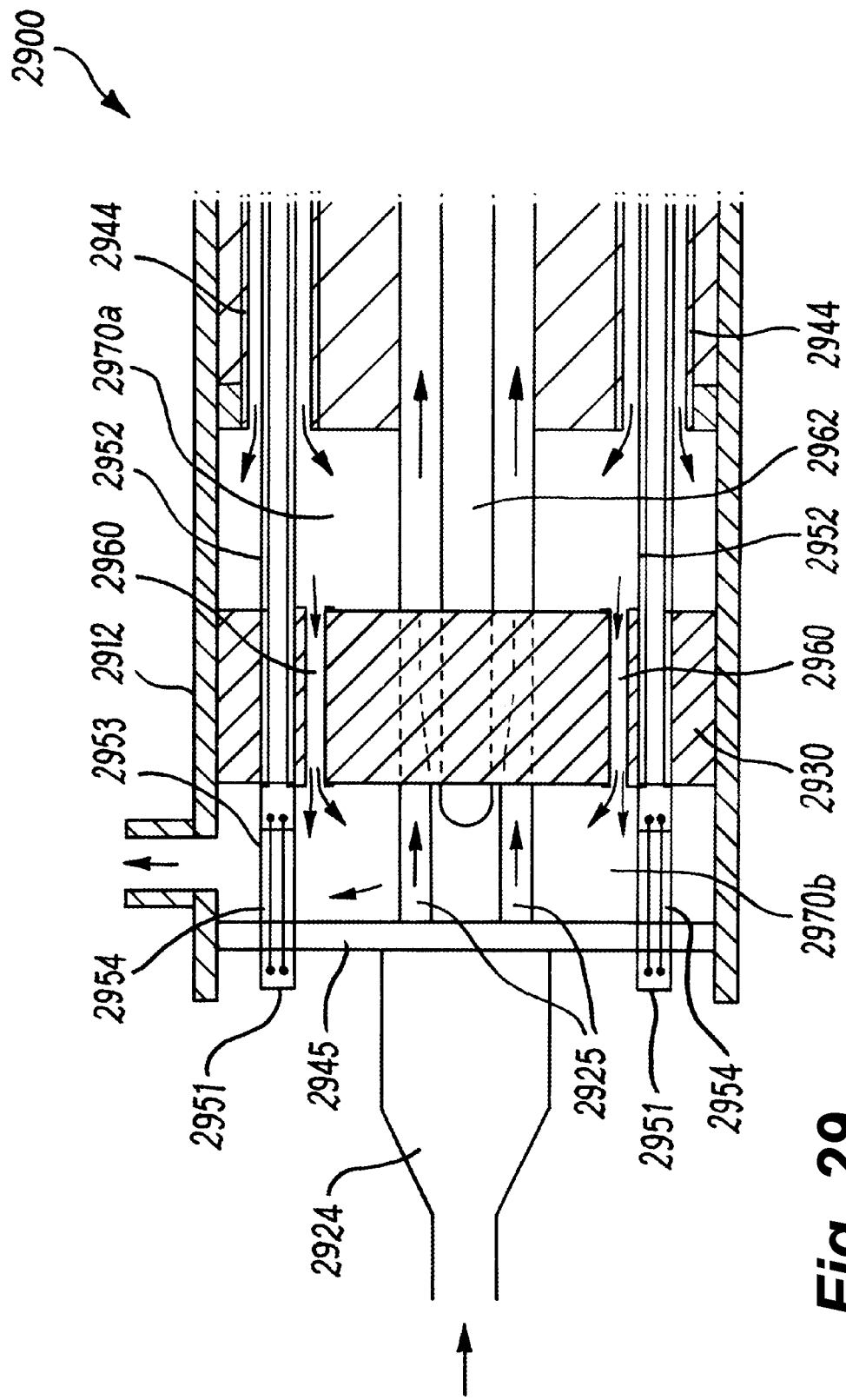
FIG. 29 is a sectional view through an apparatus according to an alternative embodiment of the invention.

FIG. 29 is a sectional view through an alternative assembly in accordance with an embodiment of the invention. The assembly, generally depicted at 2900, comprises a flow inlet manifold 2924, an injector assembly 2930, and liquid treatment vessels in the form of conduit 2940 and barrels 2944, which accommodate UV sources. The general configuration is similar to the configuration of the apparatus 10, and will be understood from the foregoing description: the liquid to be treated flows into the apparatus through the inlet manifold 2924, through the injector 2930, and into the conduit 2940 defined by the mandrel. Return flow from the barrels is directed to the outlet 2918 via a manifold.

However, in this embodiment, the injector assembly 2930 is positioned between a pair manifold regions 2970a and 2970b. The inlet manifold outlet tubings 2925 extend through the manifold to the injector assembly 2930. In this embodiment, the outlet tubings are formed from an SFS glass or other material transparent to UV radiation.

The thimbles 2952 of the UV lamps 2951 extend from the barrels 2944 through the first manifold region 2970a to the injector 2930, and extend through the injector assembly into the second manifold region 2970b. A connector 2953 of the UV lamp, which is generally sensitive to operating temperature, extends out of the injector into the part of its thimble which is located in the manifold region 2970b. Bulb connection extensions 2954 are provided in the thimble so that electrical connection may be made up on the exterior of the plate 2945.

Return flow from the barrels 2944 opens into the manifold portion 2970a, and passes through the injector assembly to the manifold portion 2970b via bores 2960. Bores 2960 are provided with sleeves 2961. In this case, the sleeves 2961 are metallic and have a highly polished outer surface which reflects UV radiation towards the injection ports of the injector assembly. However, it will be appreciated that the sleeves (where present) may be UV transmissive and/or may have reflective inner surfaces. In one example, a reflective silver oxide coating or a similar material may be used on the inner surface to reflect UV radiation towards the injection ports.

An advantage of the configuration of is that liquid is able to flow around the thimble adjacent the temperature critical part of the UV lamps, conducting thermal energy away from the bulbs and improving their performance, longevity or reliability.

Alternative features may be introduced into the apparatus to provide temperature management and/or cooling effects. For example, in some embodiment, one or more UV sources may be mounted from the opposing end of the device, so that the temperature critical parts of the UV lamps are exposed to liquid at the intermediate return manifold, or ambient conditions external to the apparatus. For example, FIG. 29 shows the UV lamp 2962 of the conduit 2940 arranged in a thimble which is terminated in the manifold region 2970b, and which has its connections made up at the opposite end of the apparatus.

Alternatively, or in addition, passive cooling may be provided by including heat sink elements on the surface of or partially embedded into the injector assembly, or by including cooling fins or spikes which increase the surface area of the injector assembly and promote thermal conduction away from the UV lamps and into the fluid.

Figure 30:
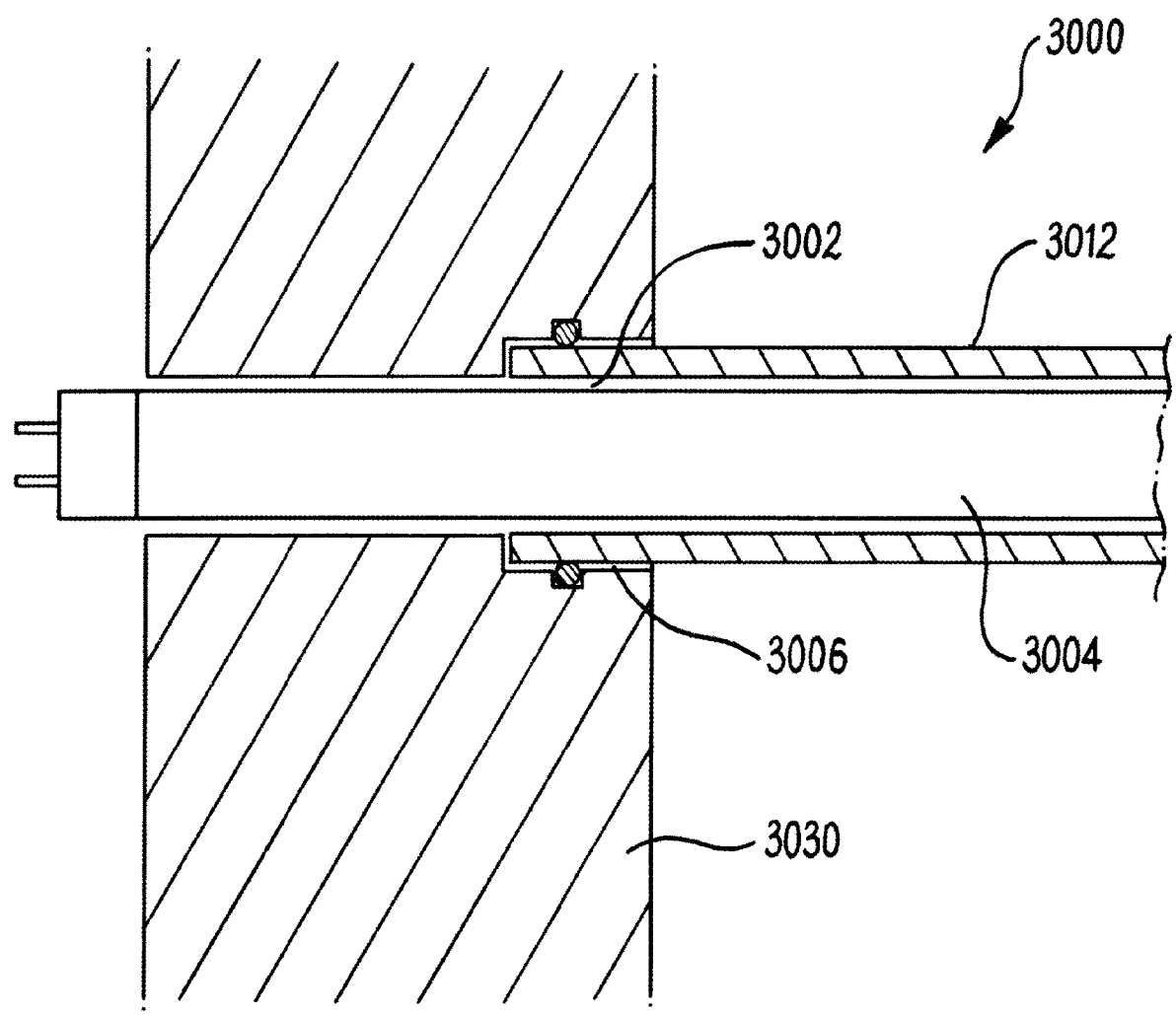
FIG. 30 is a sectional view through an assembly detail according to an alternative embodiment of the invention.

FIG. 30 is an illustration of a further alternative embodiment of the invention, in which the assembly of the thimbles and the injector assembly differs from previously described embodiments. In this apparatus, generally shown at 3000, the injector assembly 3030 is formed from a UV transmissive material such as SFS glass, and comprises a main throughbore 3002 formed to a first inner diameter sized to accommodate a UV lamp 3004. The assembly 3030 also has a counter bore 3006, formed in the face 3010 to a second inner diameter which is greater than the first inner diameter of the main bore. The counter bore is coaxial with the main bore, and is formed to a depth which penetrates a short distance into the injector assembly. The counter bore is sized and shaped to receive an end of a thimble 3012 of the UV lamp. An o-ring seal is provided between the outer surface of the thimble 3012 and the inner surface of the counter bore 3006.

The counter bore permits the thimble to be made up with and sealed against the injector assembly, so that the part of the UV lamp that extends through the assembly remains isolated from liquid to be treated. This configuration has the advantage of improved optical/UV coupling between the injector assembly and the UV lamp: UV radiation from the lamp is not required to pass through a thimble and into the injector assembly in the main bore region. This reduces the potential for UV losses that would be liable to occur as the radiation propagates through a thimble and into the injector assembly via an annular space between the interface of the thimble and the assembly.

Figure 31:
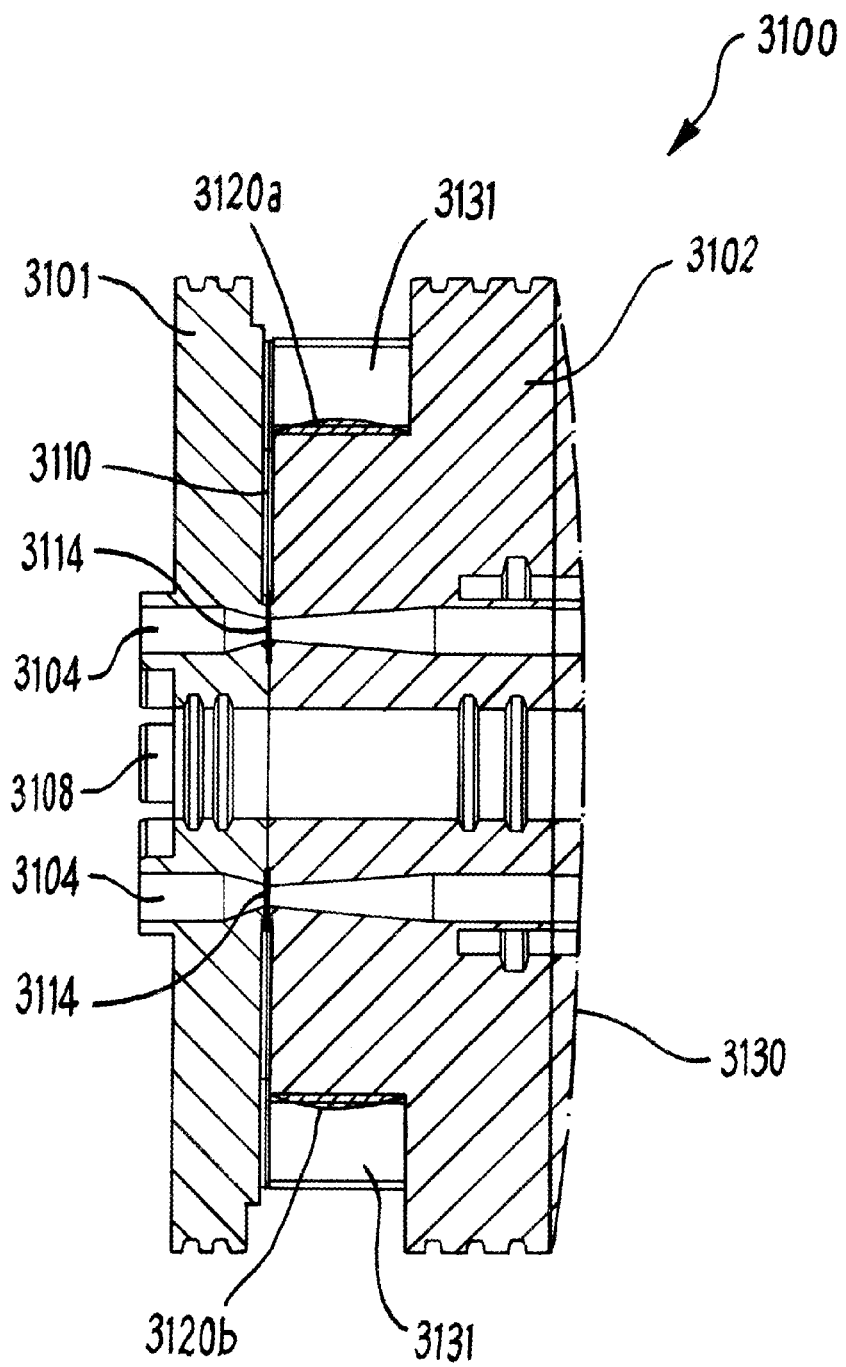
FIG. 31 is a longitudinal section through an injector assembly according to an alternative embodiment of the invention.

FIG. 31 is a sectional view through an injector assembly according to an alternative embodiment of the invention. The assembly, generally depicted at 3100, is similar to the injector assembly 30 and will be understood from FIGS. 6A and 6B and the accompanying description. The injector assembly 3100 comprises first and second injector plates 3101 and 3102. The injector plates comprise a plurality of throughbores (not shown) circumferentially arranged around a central axis of the assembly to accommodate UV sources. A central throughbore 3108 receives a thimble and its UV source, and o-rings seal the bore against the surface of the thimble. A first, inner ring 3104 of throughbores is arranged to receive and seal the outlet tubings of the inlet manifold assembly 424 of FIGS. 4A to 4C. The first and second injection plates 3101, 3102 are assembled together to form a plurality of radially oriented injection paths 3110 for the injection of gas into liquid flowing through the injector flow channels 3104.

The assembly 3100 differs from the assembly 30 in that it is provided with optical lenses 3120a, 3120b and 3130. The lenses 3120a and 3120b are convex lenses which are shaped to focus UV radiation which is propagating in the injector assembly towards the injection ports 3114. In this embodiment, lenses 3120a and 3120b are reflecting lenses formed on the outer cylindrical surface of the gas chambers 3131. The lenses 3120a, 3120b direct light towards a respective injection port, to improve the UV intensity in the locality of the ozone injection. Similarly, lens 3130 is formed by shaping the face of the plate 3102 into a form which promotes reflection of UV radiation which is propagating in the injector assembly towards the injection ports 3114. In this embodiment, lenses 3130 is shaped as a single convex reflector, but in alternative embodiments the surface may have localized convex regions that promote reflection of UV radiation to different injection ports within the assembly.

In further alternative embodiments of the invention, one or more surfaces of the injector plates may be configured to focus UV radiation which is incident on the surface from an exterior UV source towards one or more focal points within the volume of the injector assembly. Optical properties may also be enhanced through the use of optical coatings, which may include anti-reflective coatings to minimise reflection of incident UV radiation, such as magnesium fluoride.

Internal surfaces of the apparatus 10 or its components may be provided with highly reflective or mirrored finish surfaces, to effectively capture UV radiation propagating within the apparatus and direct it to locations at which it is most effective in the context of the reaction process. For example, the internal surfaces of the intermediate manifold 60, flow collection manifolds 70, 3170a or 3170b could optionally be coated with a highly reflective material to direct UV radiation back towards the flow of liquid being treated. Parts of the surfaces may comprise parabolic or concave profiles which enhance reflection to preferred regions of the flow system.

Figure 32A:
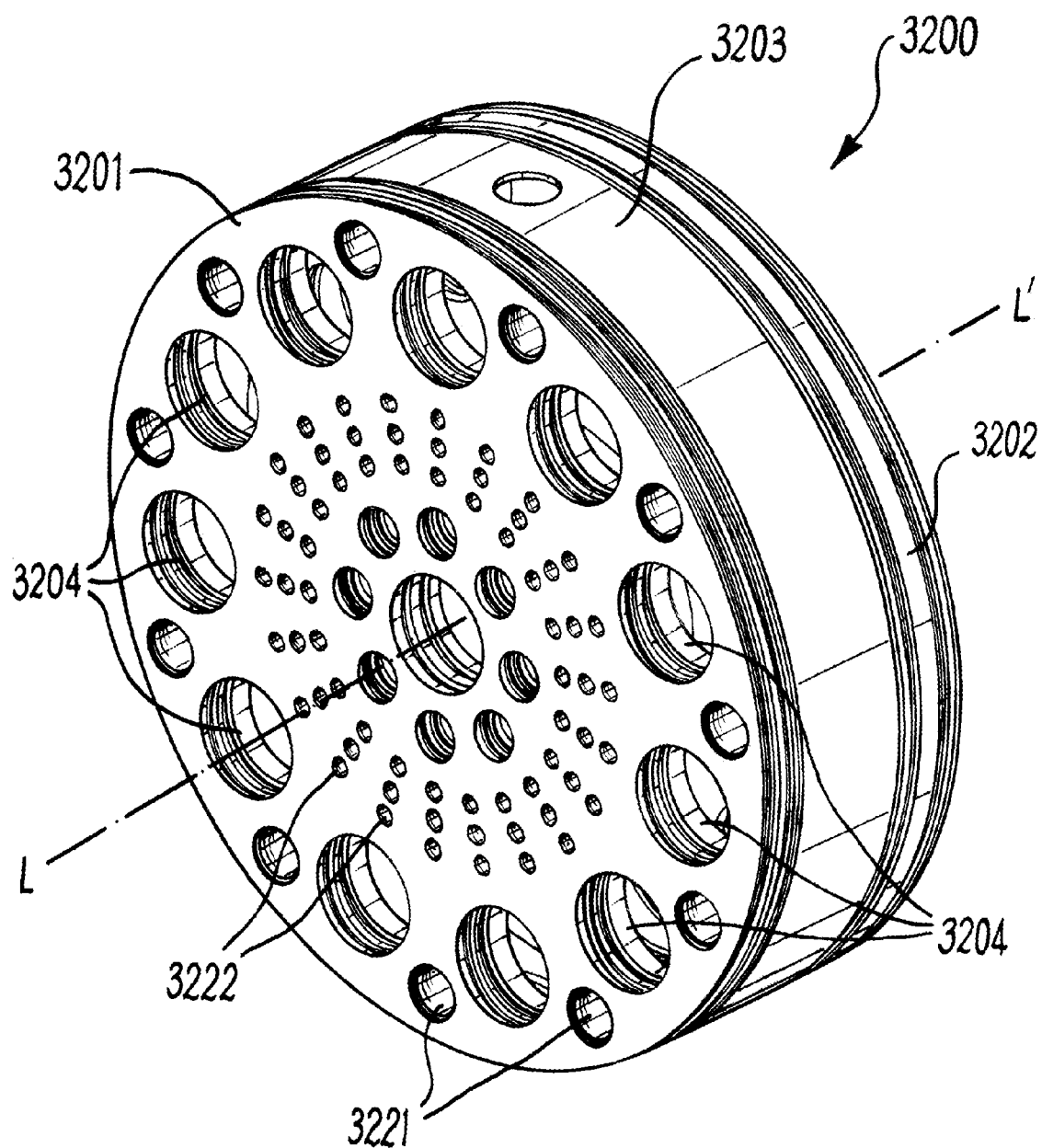
FIGS. 32A and 32B are respectively isometric and isometric sectional views of an injector assembly according to a further alternative embodiment of the invention.
Figure 32B:
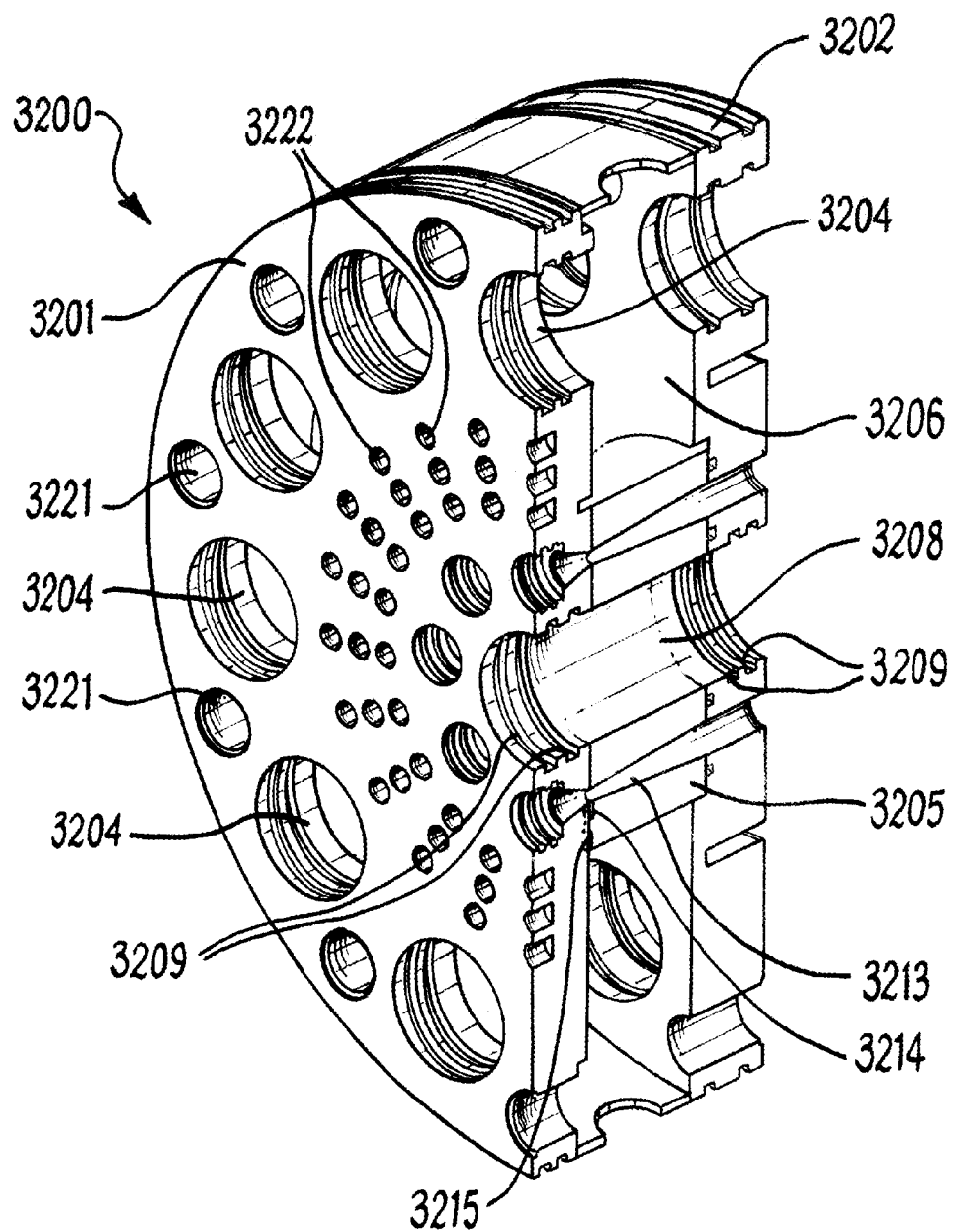
Figure 33:
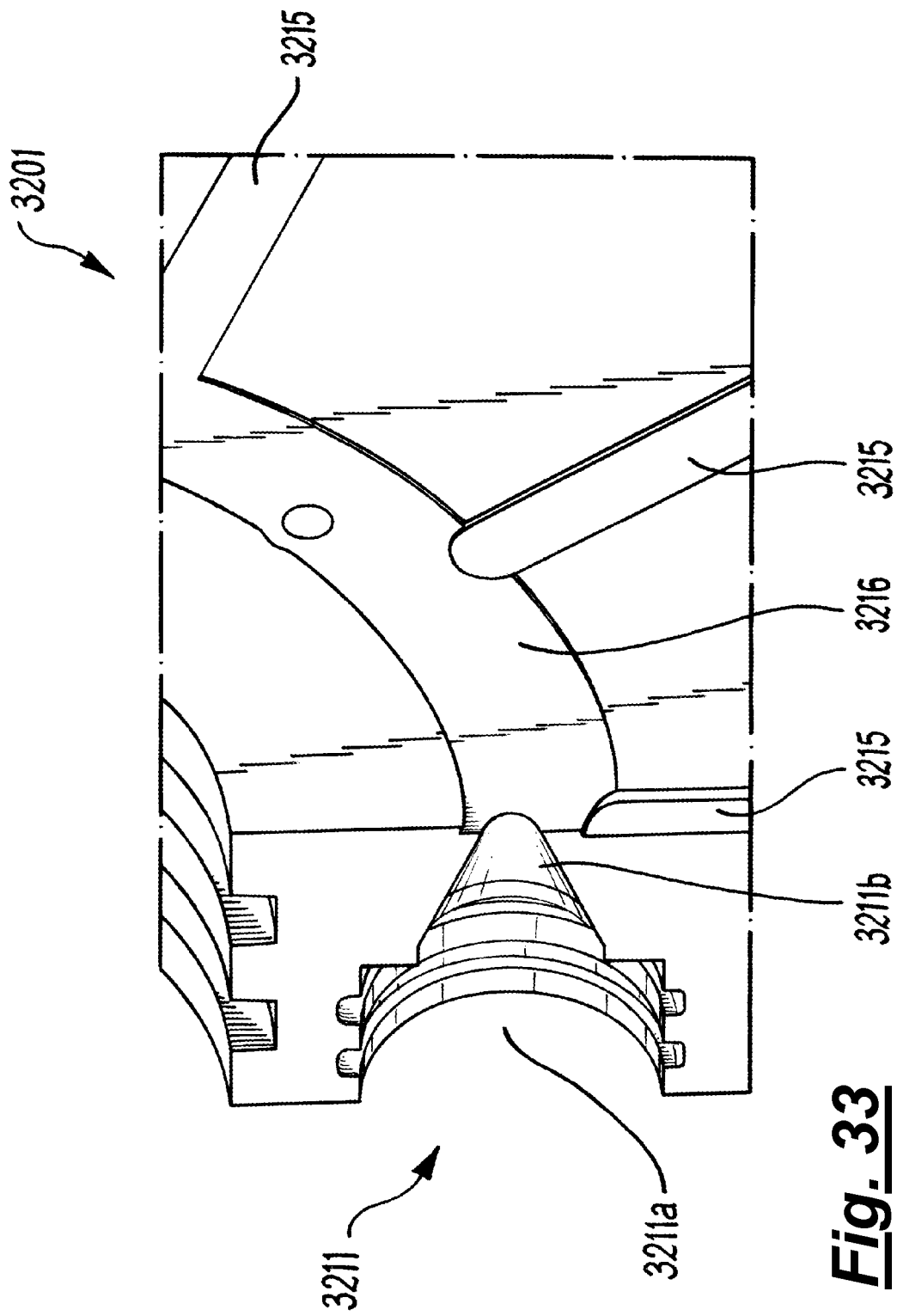
FIG. 33 is a close-up view of a component of the injector assembly of FIGS. 32A and 32B.

A further embodiment of the invention will now be described with reference to FIGS. 32 to 34. FIGS. 32A and 32B are respectively isometric and isometric sectional views of an injector assembly that may be used in the apparatus and methods of the invention. The injector assembly, generally shown at 3200, is similar to the injector assemblies 30 and 3100, and its function and operation will be generally understood from FIGS. 6A, 6B and 31 and their corresponding descriptions.

The injector assembly 3200 differs from the injector assemblies of previous embodiments in details of its construction. The injector comprises first and second injector plates 3201 and 3202, which comprise a plurality of throughbores 3204 circumferentially arranged around a central axis L-L' of the assembly to accommodate UV sources (not shown). The injector plates 3201, 3202 are substantially planar, and define the outer faces of the injector assembly 3200. However, in contrast with previous embodiments, the injector plates 3201, 3202 are not in direct abutment or contact with one another, and instead are separated along the axis of the injector assembly to define an internal volume between their inner surfaces. A substantially tubular injector sheath 3203 is joined at a first end to the first injector plate 3201, and at a second end to the second injector plate 3202, to define the circumferential perimeter of the internal volume of the injector assembly 3200. Additional bores 3221 are provided for receiving bolts to secure the injector assembly together. Recesses 3222 are provided in the outer surfaces of the first plate to increase its surface area and aid cooling in use.

The injector plates 3201, 3202 and injector sheath 3203 are in this embodiment formed from stainless steel, and their internal surfaces are coated with material which is highly reflective of ultraviolet radiation, such as an enhanced aluminium coating. Protective transparent coatings such as magnesium fluoride are optionally provided over the highly reflective surfaces. In alternative embodiments, the injector plates 3201, 3202 and/or injector sheath 3203 may be formed from aluminium with highly reflective (and optionally protected) inner surfaces.

Figure 34A:
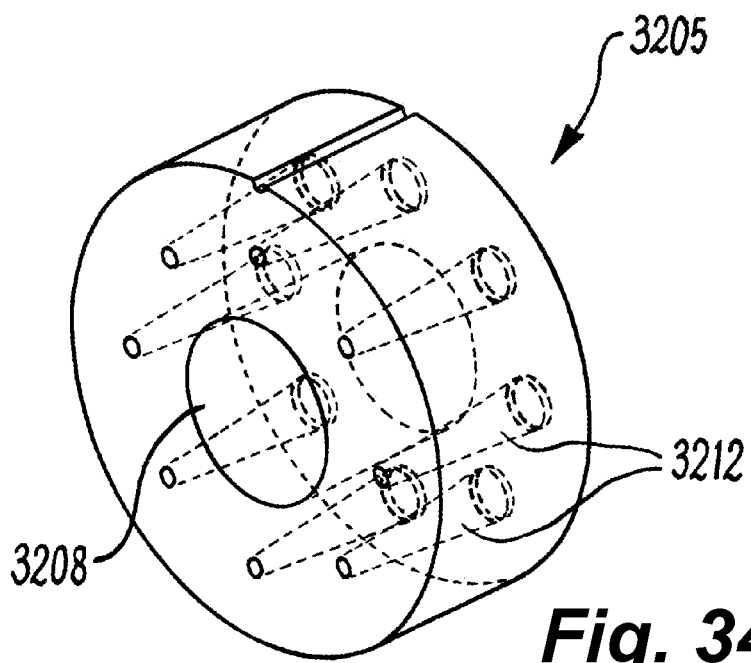
FIGS. 34A, 34B and 34C are respectively isometric, front, and sectional views of a component of the injector assembly of FIGS. 32A and 32B.
Figure 34B:
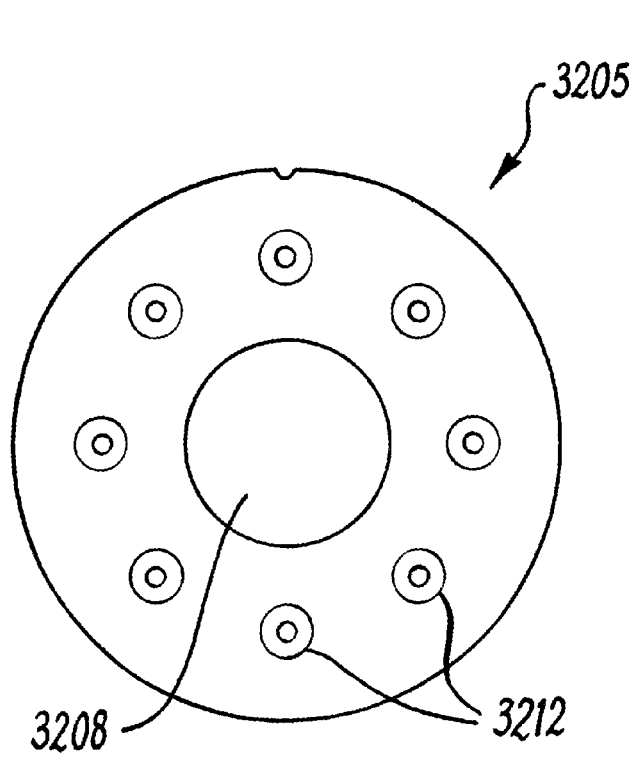
Figure 34C:
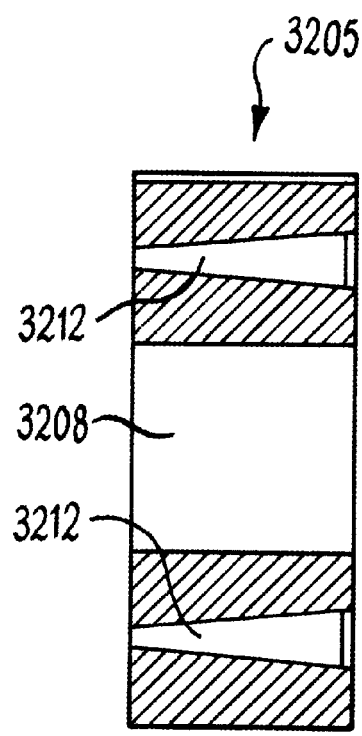

Inside the injector assembly, and disposed between the first and second plates, is an injector member in the form of a cylindrical injector body 3205, shown in more detail in FIGS. 34A to 34C. The injector body 3205 is a substantially cylindrical volume of a material that is transmissive to UV radiation (in this case, synthetic fused silica glass), and is arranged concentrically in the injector assembly. The injector body 3205 is joined to the first injector plate and the second injector plate.

The outer diameter of the injector body 3205 is less than the inner diameter of the injector sheath 3203, such that an annular space 3206 is defined between the injector body and the injector sheath, bound by the first and second plates. One or more of the outer surfaces of the injector body are optionally provided with an anti-reflective coating such as magnesium fluoride coatings (or similar) to reduce reflection of incident UV radiation.

A central throughbore 3208 extends through the first and second plates and the injector body. When assembled to form a water treatment apparatus, the throughbore 3208 receives a thimble and its respective UV source, and o-rings (not shown) are provided in recesses 3209 to seal the throughbore against the surface of the thimble.

A first, inner ring 3210 of injector throughbores 3211 extend through the first plate and are continuous with corresponding injector throughbores 3212 in the injector body, to provide the injector flow channels 3213. A first section 3211*a* of the throughbores 3211 is shaped to receive and seal the outlet tubings of an inlet manifold assembly, such as the assembly 424 of FIGS. 4A to 4C. A second section 3211*b* is tapered towards the interface 3213 between the injector plate 3201 and the injector body 3205, to provide flow convergence. The corresponding bore injector throughbores 3212 in the injector body are tapered away from the interface 3214, and provide flow divergence, such that the interface 3213 defines Venturi throats 3217 between the throughbores 3211 and 3212.

The first injection plates 3201, and the injector body 3205 assembled together to form a plurality of radially oriented injection paths 3215 for the injection of gas into liquid flowing through the injector flow channels 3214. In this embodiment, the injection paths 3215 are grooves machined in the inner face of the first injector plate 3201. A circular groove machined in the inner surface of the first injector plate, shown in FIG. 33 at 3216, connects the multiple injector flow channels together. Together the injection paths 3215 and the groove 3216 provide a flow path for the injection gas between the annular space 3206 to the Venturi throats 3217 of each injector.

An advantage of the injector assembly 3200 is that it is assembled from multiple parts which individually are relatively simple to manufacture, while still providing the enhanced UV exposure of the injection sites of the assembly. In particular, the relatively complex shapes and features required to define the injection paths to the Venturi throats may be formed in the injector plates, rather than the transmissive injector body. In the described embodiment, the grooves for accommodating seals for the UV sources and flow tubes are also formed in the injector plates. Apart from the benefit that fewer components are required to be machined or otherwise formed into complex shapes, the injector plates need not be transmissive to UV radiation and therefore may be formed from a metallic material that is easier to machine that a transmissive materials such as SFS glass. In use, UV sources (not shown) extend through the bores 3204 into the annular space 3206, and flood the space with UV radiation. The annular space 3206 is connected to a source of ozone gas, which is pre-exposes the gas to UV radiation prior to injection into the liquid to be treated. This may have a beneficial effect on the creation of hydroxyl radicals, and therefore positively affects an advanced oxidation process. In particular, pre-exposure of an ozone/oxygen gas mixture prior to injection may increase the proportion of ozone in the mixture, therefore increasing the potential for hydroxyl radical creation at the point of gas injection into a treatment liquid.

The UV radiation is incident on the injector body, and propagates to the points of injection of the ozone gas into the liquid to be treated (i.e. the Venturi throats and tail cones of the Venturi injectors). Radiation is therefore incident on the liquid before, at the point of, and immediately after and before the injection of the gas.

In further alternative embodiments of the invention, a group of injector members may be provided in place of the injector body. Each injector member may define a single injection flow channel through the assembly, each with its own injector port. The injector members may be formed from UV transmissive tubes, which are spaced apart and extend through the injector assembly between the first and second plates. Alternatively, each injector member may be a body which defines a subset of the injection flow channels through the assembly.

The invention provides a water treatment apparatus and method of use. The apparatus comprises an inlet configured to be connected to a source of liquid to be treated, and at least one liquid treatment vessel arranged to expose liquid in the vessel to ultraviolet radiation in an advanced oxidation process reaction. An injector device injects at least one gas into a liquid flowing between the inlet and the at least one liquid treatment vessel, and defines a plurality of parallel flow streams between the inlet of the apparatus and the at least one liquid treatment vessel. The injector device comprises an injection port for each of the plurality of parallel flow streams. In another aspect, the injector device is at least partially formed from a material that is transmissive to ultraviolet radiation.

The water treatment apparatus and method of use improves the efficiency, effectiveness, or capacity of an advanced oxidation process reaction by providing improved gas injection configurations and/or control and improving the effectiveness of UV radiation at one or more treatment locations.

Variations to the above-described embodiments are envisaged within the scope of the invention. In particular, one or more of the wet flow surfaces of the apparatus may be provided with a surface treatment which reduces the tendency of the apparatus to become dirty. Example surface treatments include treating the wet flow surfaces with a water repellent or hydrophobic material. Another example is to treat the wet flow surfaces in order to modify the surface energy, for example by performing a corona discharge treatment method, or other electrical treatment to the surfaces.

The foregoing embodiments are primarily described with reference to advanced oxidation processes which utilise injection of ozone gas in conjunction with exposure of the liquid to be treated to UV radiation. It will be appreciated that the methods described above are compatible with photocatalytic advanced oxidation processes. Alternative embodiments of the invention may therefore apply photocatalytic materials to enhance the reaction processes. In one example, photocatalytic compounds such as powdered titanium dioxide or liquid hydrogen peroxide are added to the liquid to be treated such that they are present in the flow unit as it is exposed to UV radiation. Known mechanisms can be used to recover photocatalytic particles or compounds present in the flow liquid.

In other variations, photocatalytic materials may be used to coat and/or construct components of the apparatus which are within the liquid treatment flow path. For example, barrels and/or redirection volumes may be coated with photocatalytic materials such as titanium dioxide or aluminium oxide.

In further alternatives, one or more sacrificial anodes, which may be passive or active, may be provided within the wet flow conduits of the apparatus. For example, passive or active anodes of aluminium oxide or titanium oxide may preferentially oxidise, reducing build up of corrosion or other scales on wet flow components.

In further alternative embodiments of the invention, aluminium components may be used. These may preferentially oxidise to form aluminium oxide which has a photocatalytic benefit to the reaction system.

Figure 35:
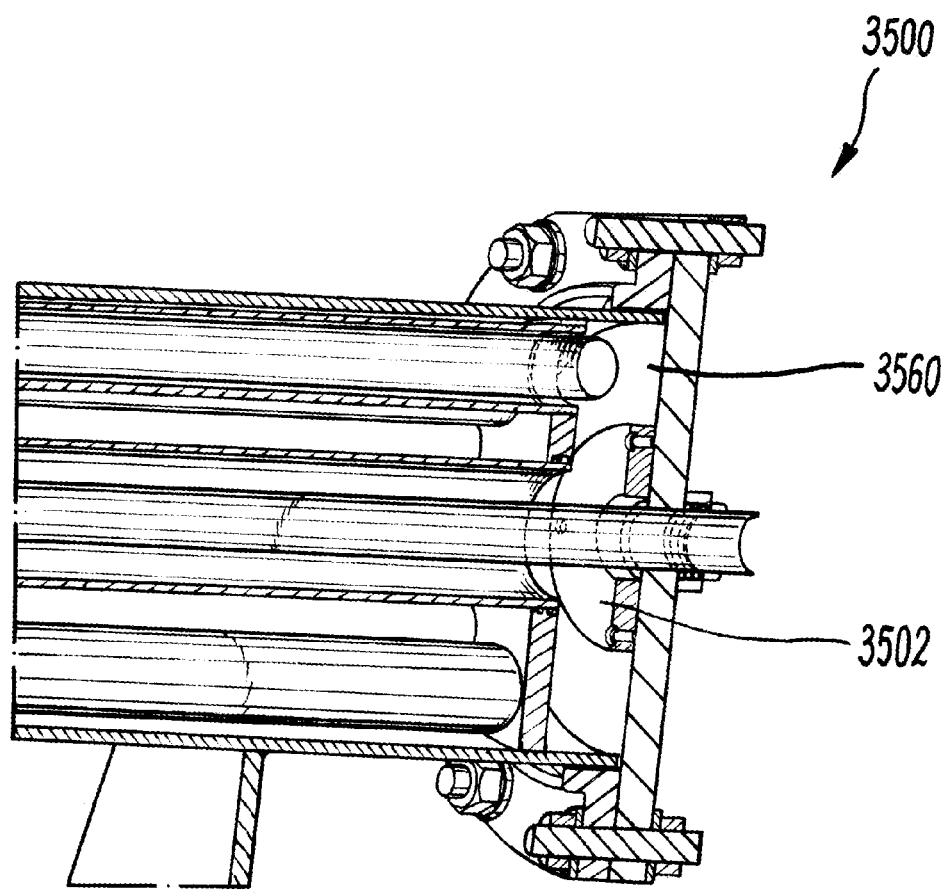
FIG. 35 is a cut-away isometric view of a detail of an apparatus according to a further alternative embodiment of the invention.

In one example, shown in FIG. 35, an anode 3502 is provided in apparatus 3500 in the intermediate return manifold 3560. In this example, the anode is formed from multiple materials, including aluminium or an alloy of aluminium. The anode is directly in the flow path of liquid being treated in the vessel of the conduit, and as such flow from the conduit direct impinges on the anode. Reactive species in the liquid, which includes undissolved oxygen and/or ozone gas, come into contact with the anode and metal elements in the anode are preferentially oxidised to create metal oxides. These metal oxides have a photocatalytic benefit to the process reaction. In certain flow systems, interaction of the anode with the fluid (in particular due its location directly downstream of the flow in the reversing manifold) causes small particles of metal oxide to be precipitated into the flow stream, in which they provide a photocatalytic benefit to the process reaction.

The sacrificial anode may be formed from any metal or metal alloy which is has a more negative electrochemical potential than other metals or materials present in the flow system. Examples include zinc, magnesium, aluminium, or alloys thereof. In embodiments of the invention the anode may be made active by applying a voltage to the anode. This may permit a wider range of materials to be used which may have additional reaction benefits. For example, in one embodiment, an active iron anode is used to stimulate a Fenton process in the presence of hydrogen peroxide.

Various (non-illustrated) embodiments of the invention may be provided with ultrasonic transducers, coupled to one or more of the components which are exposed to the flow of liquid. Application of current to the transducers causes ultrasonic acoustic vibration modes with the apparatus, which may assist in a reduction of scale or the build-up of materials on the wet flow components, and may also assist with the movement of undissolved gas through the system. The placement and operation of ultrasonic transducers may also reduce friction between moving components (such as the wipers and the thimbles of particular embodiments of the invention). In particular, ultrasonic transducers may be coupled to plastic, synthetic silica, or metal components of the treatment apparatus. In an example, one or more ultrasound or other high frequency acoustic transducers are coupled to a flow conduit, such as a barrel 1544 having unitarily or integrally formed cleaning elements contacting a UV emission surface. When activated, the transducers excite the flow conduit and the cleaning elements vibrate and/or oscillate in the flowing liquid and against the UV emission surface. Such a configuration may be particularly advantageous where the cleaning elements comprise bristles or filaments of photocatalytic material. The vibration and/or oscillation enhances the mechanical cleaning effect during relative rotation of the cleaning elements and the UV emission surface, and in addition, improves the mass transfer of flowing liquid with the photocatalyst material.

It will be appreciated that although the invention and its various aspects and embodiments are described in connection with the treatment of water, the principles of the invention may also be applied to the treatment of other liquids or liquid mixtures.

The invention extends to combinations of features other than those expressly described herein and those defined in the appended claims.

What is claimed is:

1. An injector device for a water treatment apparatus, the injector device comprising:
   a first coupling for fluid connection to a source of liquid to be treated; and a second coupling for fluid connection to at least one liquid treatment vessel arranged to expose liquid in the vessel to ultraviolet radiation in an advanced oxidation process reaction;

at least one injection flow channel, in which is disposed at least one injection port for injecting at least one gas into a liquid flowing through the injector device;

wherein the injector device comprises an injector assembly configured for the extension of at least one source of ultraviolet radiation therethrough;

wherein the injector assembly is formed from a material that is transmissive to ultraviolet radiation, and the at least one injection flow channel passes through the material that is transmissive to ultraviolet radiation;

and wherein the injector assembly comprises at least one transmission path through the material that is transmissive to ultraviolet radiation, between the at least one source of ultraviolet radiation and the at least one injection port.

2. The injector device according to claim 1, comprising one or more optical elements configured to direct ultraviolet radiation towards the at least one injection port.

3. The injector device according to claim 1, comprising a plurality of injection paths disposed between a source of at least one gas to be injected and the at least one injection port.

4. The injector device according to claim 1 comprising a synthetic fused silica (SFS) material.

5. The injector device according to claim 1 comprising a first injector member and a second injector member, wherein the first and second injector members have at least one injection flow channel therethrough.

6. The injector device according to claim 5 wherein the first and second injector members are assembled together in abutment with one another, and define a profile of the at least one injection flow channel.

7. The injector device according to claim 6 wherein at least one injection port is defined at an interface between the first injector member and the second injector member.

8. The injector device according to claim 5, wherein:
the first injector member is a first plate;
the second injector member is disposed between the first plate and a second end plate;
wherein at least one flow channel is provided through the second injector member, wherein the injector device is configured to accommodate at least one source of ultraviolet radiation;
and wherein the second injector member is formed from a material transmissive to ultraviolet radiation, to provide a transmission path for ultraviolet radiation from the source of ultraviolet radiation to an injection port.

9. The injector device according to claim 1, comprising:
an inlet configured to be connected to a source of liquid to be treated;
at least one liquid treatment vessel arranged to expose liquid in the vessel to ultraviolet radiation in an advanced oxidation process reaction;
the injector device coupled to the inlet and the at least one liquid treatment vessel such that a liquid to be treated flows through the injector device.

10. The injector device according to claim 9, comprising at least one source of ultraviolet radiation extending into the injector device.

11. The injector device according to claim 10, comprising a plurality of parallel injection flow channels arranged around a first source of ultraviolet radiation.

12. The injector device according to claim 9, comprising comprising a radiation guide formed from a material that is transmissive to ultraviolet radiation;
wherein the radiation guide extends into the flow path towards the inlet and away from the vessel, and transmits ultraviolet radiation to a liquid flowing in the flow path upstream of the vessel.

13. The injector device according to claim 9, comprising an injection diffuser disposed in a flow path downstream of the injector device, wherein the injection diffuser comprises at least one surface comprising a photocatalyst material.

14. The injector device according to claim 1 comprising a plurality of parallel injection flow channels.

15. The injector device according to claim 14 wherein each of the plurality of injection flow channels comprises an injection port.

16. The injector device according to claim 1 wherein the at least one injection flow channel comprises a venturi injector.

17. A method of treating water in an advanced oxidation process reaction, the method comprising:
providing a water treatment apparatus comprising:
a first coupling for fluid connection to a source of liquid to be treated;
a second coupling for fluid connection to at least one liquid treatment vessel arranged to expose liquid in the vessel to ultraviolet radiation in an advanced oxidation process reaction;
at least one injection flow channel, in which is disposed at least one injection port for injecting at least one gas into a liquid flowing through the injector device;
wherein the injector device comprises an injector assembly configured for the extension of at least one source of ultraviolet radiation therethrough; wherein the injector assembly is formed from a material that is transmissive to ultraviolet radiation, and the at least one injection flow channel passes through the material that is transmissive to ultraviolet radiation; and wherein the injector assembly comprises at least one transmission path through the material that is transmissive to ultraviolet radiation, between the at least one source of ultraviolet radiation and the at least one injection port; an inlet configured to be connected to a source of liquid to be treated;
at least one liquid treatment vessel arranged to expose liquid in the vessel to ultraviolet radiation in an advanced oxidation process reaction; and the injector device coupled to the inlet and the at least one liquid treatment vessel such that a liquid to be treated flows through the injector device;
flowing a liquid to be treated through the apparatus and the injector device;
injecting gas into the liquid via the injection port;
exposing liquid flowing through the injector device to ultraviolet radiation from an ultraviolet radiation source through a material of the injector device which is transmissive to ultraviolet radiation.

18. An injector device for a water treatment apparatus, the injector device comprising:
a first coupling for fluid connection to a source of liquid to be treated; and
a second coupling for fluid connection to at least one liquid treatment vessel arranged to expose liquid in the vessel to ultraviolet radiation in an advanced oxidation process reaction;

wherein the injector device defines a plurality of parallel flow streams between the source of liquid to be treated and the at least one liquid treatment vessel and comprises an injection port for each of the plurality of parallel flow streams.

19. The injector device for a water treatment apparatus of claim 18, further comprising:
   an inlet configured to be connected to a source of liquid to be treated;
   at least one liquid treatment vessel arranged to expose liquid in the vessel to ultraviolet radiation in an advanced oxidation process reaction;
   the injector device coupled to the inlet and the at least one liquid treatment vessel such that a liquid to be treated flows through the injector device.

20. The injector device according to claim 18 wherein each of the plurality of parallel flow streams comprises a venturi injector.

21. A method of treating water in an advanced oxidation process reaction, the method comprising:
   providing a water treatment apparatus comprising
   an inlet configured to be connected to a source of liquid to be treated; at least one liquid treatment vessel arranged to expose liquid in the vessel to ultraviolet radiation in an advanced oxidation process reaction; an injector device coupled to the inlet and the at least one liquid treatment vessel such that a liquid to be treated flows through the injector device;
   wherein the injector device further comprises a first coupling for fluid connection to a source of liquid to be treated; and a second coupling for fluid connection to at least one liquid treatment vessel arranged to expose liquid in the vessel to ultraviolet radiation in an advanced oxidation process reaction;
   wherein the injector device defines a plurality of parallel flow streams between the source of liquid to be treated and the at least one liquid treatment vessel and comprises an injection port for each of the plurality of parallel flow streams
   flowing a liquid to be treated through the apparatus and the injector device;
   injecting gas into the liquid via an injection port in each of the plurality of parallel flow streams.

* * * * *